(12) United States Patent
Ishida et al.

(10) Patent No.: US 7,496,121 B2
(45) Date of Patent: Feb. 24, 2009

(54) LASER MODULATING AND DRIVING DEVICE AND IMAGE REPRODUCING APPARATUS USING THE SAME

(75) Inventors: Masaaki Ishida, Kanagawa (JP); Yasuhiro Nihei, Kanagawa (JP); Atsufumi Omori, Kanagawa (JP); Dan Ozasa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 426 days.

(21) Appl. No.: 10/803,042

(22) Filed: Mar. 18, 2004

(65) Prior Publication Data

US 2004/0183891 A1 Sep. 23, 2004

(30) Foreign Application Priority Data

| Mar. 20, 2003 | (JP) | 2003-077457 |
| Mar. 20, 2003 | (JP) | 2003-077458 |
| Mar. 20, 2003 | (JP) | 2003-077459 |
| Aug. 29, 2003 | (JP) | 2003-307554 |

(51) Int. Cl.
*H01S 3/00* (2006.01)

(52) U.S. Cl. .................. 372/38.02; 372/38.07

(58) Field of Classification Search .......... 372/38.02, 372/38.07
See application file for complete search history.

(56) References Cited

U.S. PATENT DOCUMENTS

| 5,138,623 | A | | 8/1992 | Ema et al. | |
| 5,237,579 | A | | 8/1993 | Ema et al. | |
| 5,258,780 | A | | 11/1993 | Ema et al. | |
| 5,444,728 | A | * | 8/1995 | Thompson | 372/38.02 |
| 5,784,091 | A | | 7/1998 | Ema et al. | |
| 5,946,334 | A | * | 8/1999 | Ema et al. | 372/38.01 |
| 6,118,798 | A | | 9/2000 | Ema et al. | |
| 6,246,705 | B1 | * | 6/2001 | Kasai | 372/24 |
| 6,498,617 | B1 | | 12/2002 | Ishida et al. | |
| 6,618,406 | B1 | * | 9/2003 | Kaminishi | 372/38.02 |
| 6,731,317 | B2 | | 5/2004 | Ema et al. | |
| 2003/0091076 | A1 | * | 5/2003 | Fischer | 372/38.02 |

FOREIGN PATENT DOCUMENTS

JP 11-105336 4/1999

(Continued)

OTHER PUBLICATIONS

Trotter et al. ("A CMOS low voltage high performance interface" Trotter, J.D. Rekhi, S. Chava, V. Kale, P.C.; Microsyst. Prototyping Lab., Mississippi State Univ., MS, USA; ASIC Conference and Exhibit, 1994. Proceedings. Seventh Annual IEEE International ;Sep. 19-23, 1994; pp. 44-48, Rochester, NY.*

(Continued)

*Primary Examiner*—Minsun Harvey
*Assistant Examiner*—Tod T Van Roy
(74) *Attorney, Agent, or Firm*—Oblon, Spivak, McClelland, Maier & Neustadt, P.C.

(57) ABSTRACT

A laser modulating and driving device comprises a modulation signal generating unit configured to generate a laser modulation signal consisting of a pair of small swing differential signals based on pixel data, and a driving unit configured to drive a laser according to the laser modulation signal supplied from the modulation signal generating unit.

27 Claims, 58 Drawing Sheets

FOREIGN PATENT DOCUMENTS

| | | | |
|---|---|---|---|
| JP | 11105336 A | * | 4/1999 |
| JP | 3283256 | | 5/2002 |
| JP | 2003-37484 A | | 2/2003 |
| WO | WO 90/13965 | | 11/1990 |

OTHER PUBLICATIONS

Canright (Practical design for controlled impedance Canright, R.E., Jr. Martin Marietta Electron. Orlando, FL, USA; Electronic Components and Technology Conference, 1991. Proceedings. 41st : May 11-16, 1991; pp. 370-377; Atlanta, GA).*

"Differential Amplifier" from http://www.wikapedia.org, accessed on Jun. 28, 2006.*
U.S. Appl. No. 08/253,322, filed Jun. 3, 1994.
U.S. Appl. No. 10/183,748, filed Jun. 28, 2002, Nihei et al.
U.S. Appl. No. 10/214,559, filed Aug. 9, 2002, Ishida et al.
U.S. Appl. No. 10/259,769, filed Sep. 30, 2002, Omori et al.
U.S. Appl. No. 10/323,837, filed Dec. 20, 2002, Suzuki et al.
U.S. Appl. No. 10/409,143, filed Apr. 9, 2003, Ozasa et al.
U.S. Appl. No. 10/435,034, filed May 12, 2003, Nihei et al.
U.S. Appl. No. 10/803,042, filed Mar. 18, 2004, Ishida et al.

* cited by examiner

FIG.58
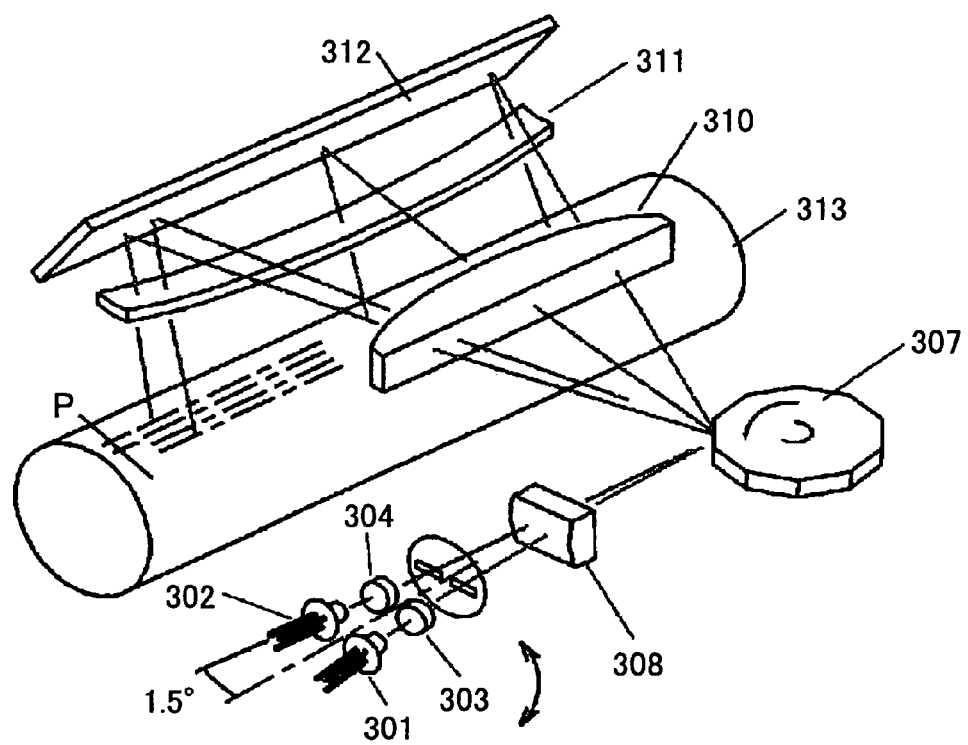
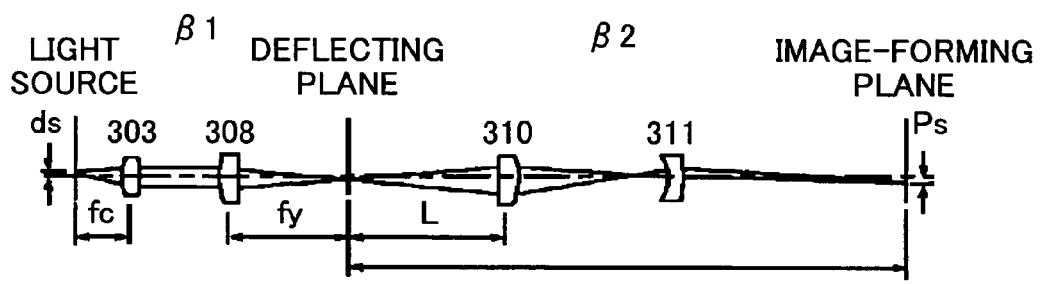

LASER MODULATING AND DRIVING DEVICE AND IMAGE REPRODUCING APPARATUS USING THE SAME

BACKGROUND OF THE INVENTION

1. Field of the Invention

The present invention generally relates to a laser driving technique used in an image reproducing apparatus, and more particularly, to a laser modulating and driving device that produces a pair of small swing differential modulation signals to drive a laser diode (LD) used as a light source in an image reproducing apparatus.

2. Description of Related Art

In general, a semiconductor laser (LD) or a semiconductor laser array (LD array) is used as a light source of image reproducing apparatuses, including laser printers, optical recorder/players, digital photocopying machines, and optical communication apparatuses.

There are several methods for modulating the optical output of a semiconductor laser. For instance, power modulation for modulating the light quantity itself, pulse width modulation for modulating the light emitting time, and a combination of the power modulation and the pulse width modulation are known. An example of pulse width modulation is generating a triangular wave or a sawtooth wave corresponding to a pulse period and comparing the generated wave to an analog video signal to produce a pulse-width modulated signal. Another example of pulse width modulation is generating a high-frequency clock, dividing the clock in a digital manner to produce a delayed pulse, and producing a pulse-width modulated signal by the logical sum or logical multiplication.

FIG. 1 illustrates a general structure of a conventional laser modulating and driving device used in a laser printer or other image reproducing apparatuses. The pixel data generating unit 1110 converts input data to pixel data suitable to image-forming factors, including the γ characteristic of the photosensitive drum. The LD modulation signal generating unit 1120 produces a modulation signal for power-modulating or pulse-width-modulating the optical output of the semiconductor laser 190 according to the pixel data. The LD driving unit 1170 drives the semiconductor laser 190 based on the modulation signal.

Conventionally, the LD modulation signal generating unit 1120 and the LD driving unit 1170 are arranged in a single block 1020. These elements are mounted on the same printed circuit board (PCB) or fabricated as the same integrated circuit (such as ASIC), and the block 1020 is separated from a block 1010 of the pixel data generating unit 1110. This is because the transmission rate of the modulation signal is higher than that of the pixel data, and therefore it is desired to arrange the LD modulation signal generating unit 1120 and the LD driving unit 1170 as close to each other as possible.

Japanese Patent No. 3283256 discloses an image forming apparatus proposed from the same viewpoint. In the publication, a PWM circuit corresponding to the LD modulation signal generating unit 1120 and a laser driver corresponding to the LD driving unit 1170 are mounted on the same circuit board, while the digital tone control circuit corresponding to the pixel data generating unit 1110 is mounted on a separate circuit board. Data and clocks are supplied from the digital tone control circuit to the PWM circuit by differential transmission.

Japanese Patent Laid-open publication No. 11-105336 discloses a semiconductor integrated circuit which is also proposed from the same viewpoint. In the publication, a pixel modulation circuit implemented as the PWM circuit, a laser driving circuit, and a connection circuit between them are mounted on a single chip. Signals transmitted between the pixel modulation circuit and the connection circuit, as well as signals transmitted between the connection circuit and the laser driving circuit, are differential signals.

However, demand for high-speed operation in image forming and/or reproducing apparatuses is growing more and more, and the number of lasers is increasing. To form a single color image, two, four, or eight (depending on the case) lasers, which may be arranged as an LD array, are used. In addition, photocopiers and printers have shifted from monochrome to color, and multiple LD modulation signal generating units and the corresponding number of LD driving units are required.

For example, in order to form a 4-color image using two semiconductor lasers based on 8-bit pixel data and a 1-bit LD modulation signal (pulse), then 64-bit pixel data and eight modulation signals are required. Using the conventional laser modulating and driving device shown in FIG. 1, 64-bit digital pixel signals have to be transmitted from the pixel data generating unit 1110 to the LD modulation signal generating unit 1120 at a high rate, although not required as fast as transmission of LD modulation signal. The number of data lines increases and the size and the structure of the data transmission part become large and complicated, which makes it difficult to realize high-speed transmission of 64 data signals. If such digital pixel signals are supplied from the pixel data generating unit 1110 to the LD modulation signal generating unit 1120 by differential transmission, the structure of the data transmission part and the transmission path becomes larger and more complicated.

Another problem is inconsistency in conditions of a supply voltage for laser driving and a supply voltage for generation of modulation signals. Along with the demand for high-speed operation, integralization of a device for generating modulation signal with other devices on a chip is advancing, and the supply voltage of such devices on the chip is becoming lower and lower. In contrast, the wavelength of the semiconductor laser becomes shorter and shorter for achieving high resolution, and the falling voltage (i.e., the potential drop between terminals) of the semiconductor laser tends to increase, causing the supply voltage for driving the semiconductor laser to be increased. Thus, inconsistency between the power supply voltage condition for laser driving and that for modulation signal generation becomes conspicuous.

SUMMARY OF THE INVENTION

In view of the above-described problems, it is an object of the invention to realize high-speed laser operation and precise LD signal control, while maintaining improved EMI and anti-noise characteristics, in an image forming/reproducing apparatus.

It is another object of the invention to supply appropriate supply voltages suitable to both the laser driving operation and generation of high-speed LD modulation signals.

It is still another object of the invention to eliminate the inconsistency between increased supply voltage for driving a laser and reduced supply voltage for generating LD modulation signals.

To achieve the object, a pixel data generating unit and a modulation signal generating unit are arranged together in the same substrate (such as PCB or in the same ASIC), while a laser driving unit is placed near a light source (such as a laser). This arrangement allows a plurality of pixel data signals to be transmitted in parallel on the PCB or ASIC. At the same time, the laser driving unit arranged near the laser can achieve a high-speed laser driving characteristic.

To transmit the modulation signal (e.g., a pulse-width modulation signal) to the laser driving unit at a high rate, the modulation signal generating unit produces and transmits a small swing differential modulation signal to the laser driving unit.

To be more precise, in one aspect of the invention, a laser modulating and driving device comprises a modulation signal generating unit configured to generate a small swing differential modulation signal according to pixel data, and a laser driving unit configured to drive a laser based on the small swing differential modulation signal.

The modulation signal generating unit and the laser driving unit are spatially separated from each other, and connected via a transmission line through which the small swing differential signal propagates.

The laser modulating and driving device further comprises a pixel data generating unit that generated the pixel data, and the pixel data generating unit and the modulation signal generating unit are arranged on the same block.

With this laser modulating and driving device, the modulation signals are transmitted, maintaining a precise pulse width, because the small swing differential signal has less energy change and more durability against disturbance. Accordingly, high-speed driving operation is achieved, while the EMI (electromagnetic interference) characteristic and the anti-noise characteristic are improved under the precise control of laser modulation.

Since the small swing differential modulation signal allows the distance between the modulation signal generating unit and the laser driving unit to be increased, the laser driving unit can be mounted on an independent circuit board, or formed as an independent integrated circuit, separately from the modulation signal generating unit. Consequently, a sufficient supply voltage can be supplied to the laser driving unit, while high-density and low-power devices can be used in the modulation signal generating unit to produce a high-speed modulation signal, regardless of the laser driving voltage.

In another aspect of the invention, an image forming and reproducing apparatus using the laser modulating and driving device is provided.

BRIEF DESCRIPTION OF THE DRAWINGS

Other objects, features, and advantages of the present invention will become more apparent from the following detailed description when read in conjunction with the accompanying drawings, in which:

FIG. 58 illustrates an example of a multi-beam scanning system used in an image reproducing apparatus to which the invention is applied;

DETAILED DESCRIPTION OF THE PREFERRED EMBODIMENT

Figure 1:
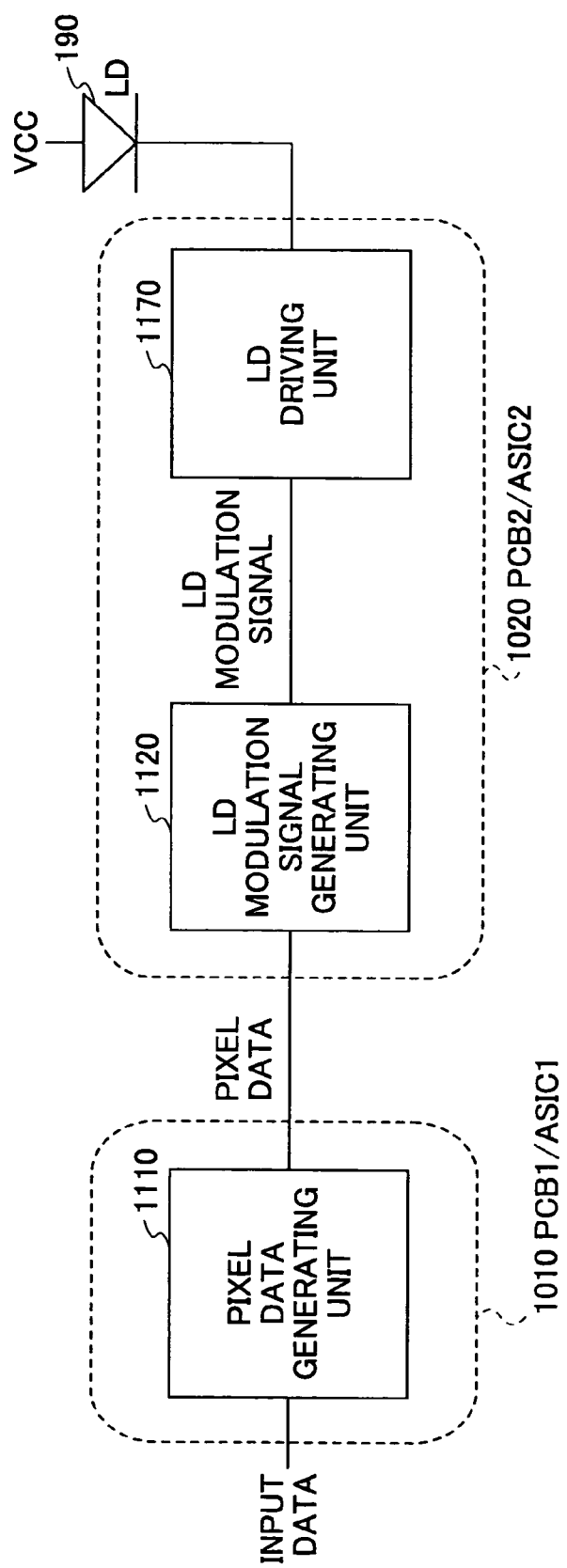
FIG. 1 illustrates a conventional laser modulating and driving device.
Figure 2:
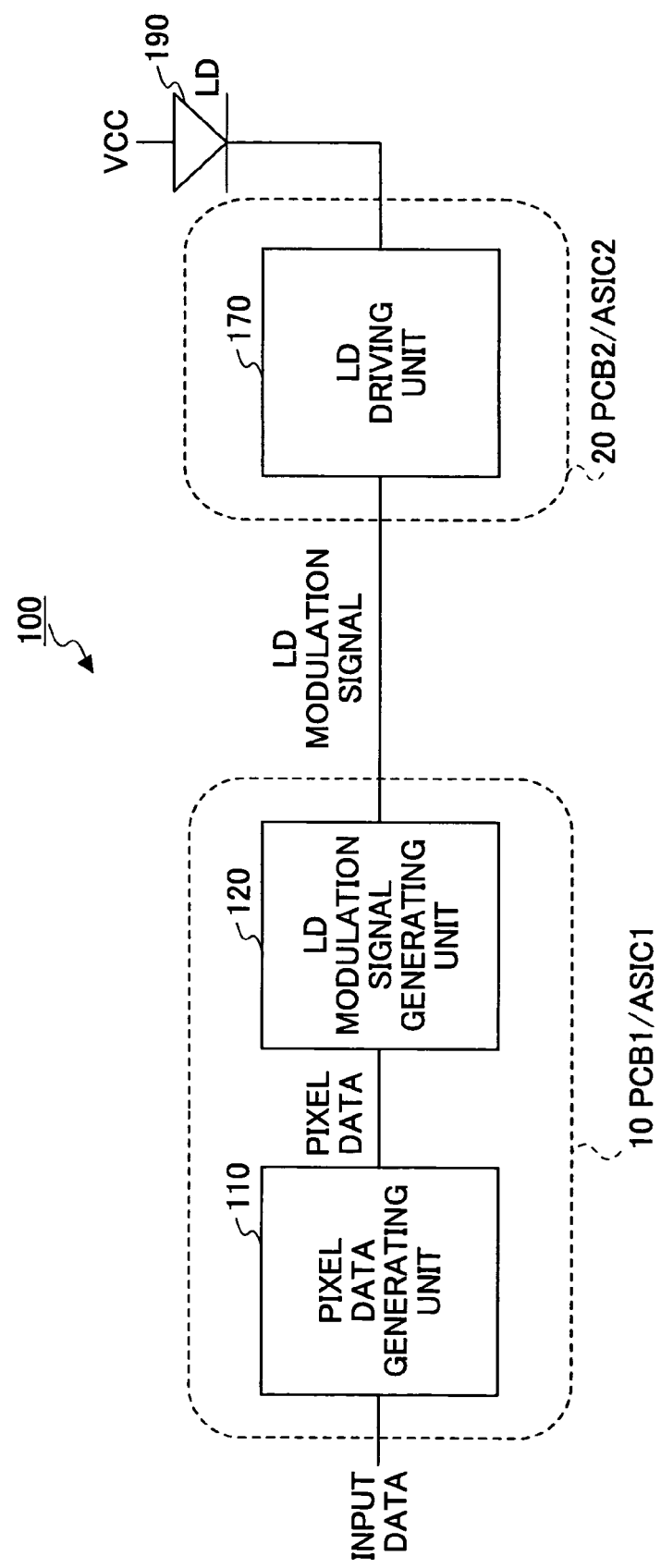
FIG. 2 is an example of the structure of the LD modulating/driving device according to an embodiment of the invention.

FIG. 2 is a schematic block diagram of the semiconductor laser modulating/driving device 100 according to an embodiment of the present invention. The semiconductor laser modulating/driving device 100 includes a first block 10 in which a pixel data generating unit 110 and an LD modulation signal generating unit 120 are arranged, and a second block 20 positioned near the semiconductor laser (LD) 190 and including an LD driving unit 170. In this example, the pixel data generating unit 110 and the LD modulation signal generating unit 120 are mounted on the same printed circuit board (PCB) 1, or formed in the same ASIC 1, while the LD driving unit 170 is mounted on or formed in a different PCB 2 or ASIC 2, separately from the PCB1/ASIC1.

The pixel data generating unit 110 converts the input data to pixel data. According to the pixel data, the LD modulation signal generating unit 120 produces and outputs a small swing LD modulation signal by a differential signaling technique. The LD driving unit 170 drives the semiconductor laser 190 based on the small swing differential modulation signal supplied from the LD modulation signal generating unit 120.

It is expected that the number of pixel data signaling lines will continue to increase over time along with the multi-channel structure of semiconductor lasers and the multi-color configuration of the image reproducing apparatus. By arranging the pixel data generating unit 110 and the LD modulation signal generating unit 120 on the same printed circuit board or incorporating the corresponding functions in the ASIC, multiple signals can be transmitted in parallel at a high rate, easily coping with increase in the number of signal lines. By arranging the LD driving unit 170 near the LD 190 (or an LD array), a high-speed and stable operation can be achieved. The LD driving unit 170 and the LD 190 (or the LD array) may be arranged on the same substrate.

Figure 3:
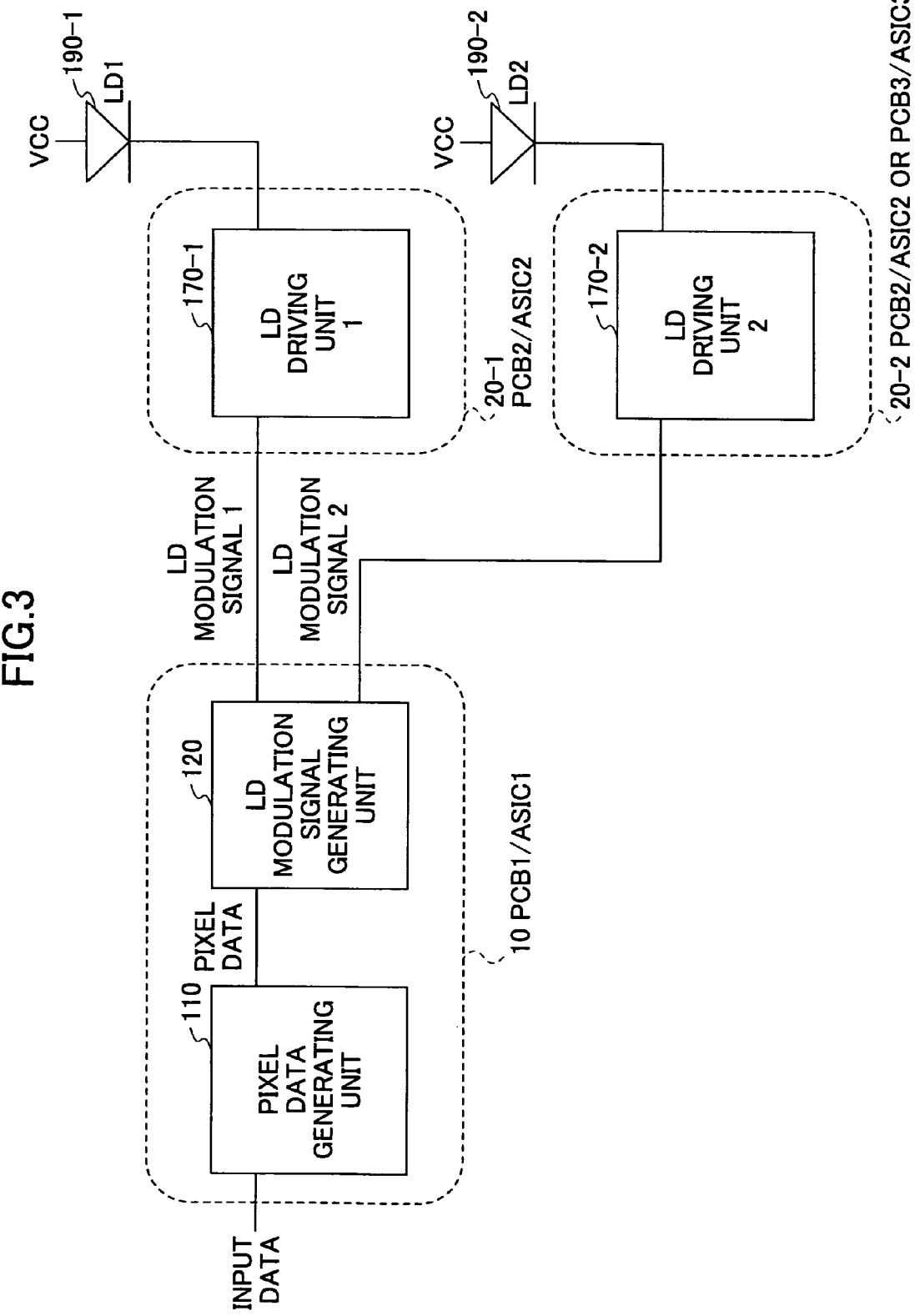
FIG. 3 is another example of the structure of the LD modulating/driving device with multiple channels according to an embodiment of the invention.

FIG. 3 illustrates a multi-channel laser modulating/driving device, in which a first LD driving unit 170-1 connected to the first light source (LD1) 190-1 and a second LD driving unit 170-2 connected to the second light source (LD2) 190-2 are arranged in parallel. The first LD modulating signal and the second LD modulating signal supplied to the first and second LD driving units 170-1 and 170-2, respectively, are small swing differential signals produced by the LD modulation signal generating unit 120. The LD modulation signal generating unit 120 and the pixel data generating unit 110 are arranged in the same block 10, which may be formed as the same PCB or ASIC. It is not necessary to provide an LD driving unit for each of the semiconductor lasers 190. A single LD driving unit 170 may be used to drive multiple semiconductor lasers 190. In this case, the LD driving unit 170 and semiconductor lasers 190 may be arranged on the same PCB or the ASIC.

As the number of light sources (e.g., the semiconductor lasers) 190 increases, two or more LD modulation signal generating units 120 may be used. In this case, the distance between the LD modulation signal generating unit 120 and the LD driving unit 170 may be further increased. In order to deal with the spatial separation between the LD modulation signal generating unit 120 and the LD driving unit 170, a small swing differential signal consisting of complementary signal pairs produced by a differential signaling method is transmitted as the LD modulation signal. Making use of the spatial separation, an appropriate supply voltage suitable for driving the semiconductor laser 190 is supplied to the LD driving unit 170, while a lower voltage is supplied to the LD modulation signal generating unit 120 so as to produce a high-speed LD modulation signal.

Figure 4:
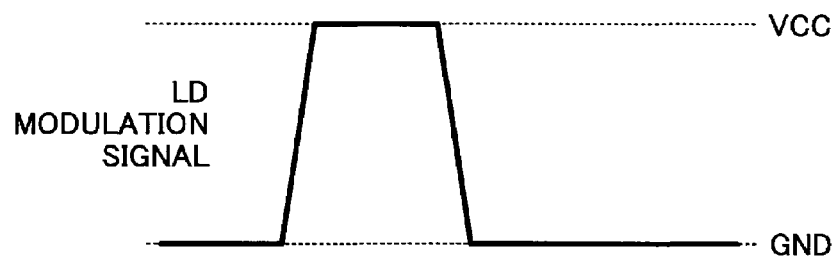
FIG. 4 illustrates a pulse shape of a conventional LD modulation signal.
Figure 5:
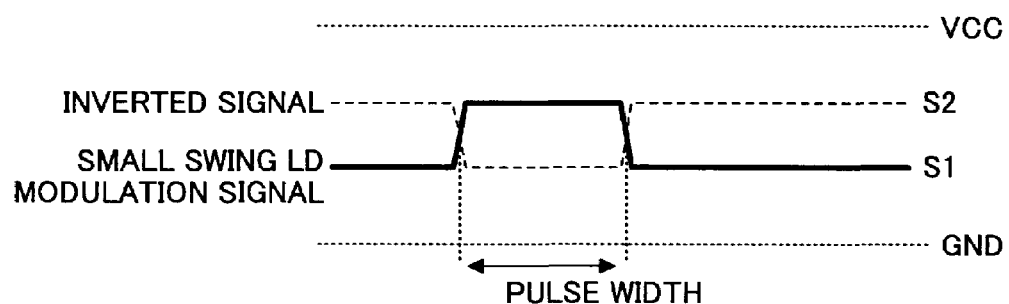
FIG. 5 illustrates a pulse shape of a small swing differential LD modulation signal according to an embodiment of the invention.

FIG. 4 illustrates a pulse shape of a conventional digital LD modulation signal, which is a full-swing modulation signal. In transmitting a full-swing signal through a single path, it is difficult to precisely propagate the pulse width or other signal characteristics. In contrast, by using a pair of small swing and differential signals (which is referred to as a "small swing differential signal") shown in FIG. 5, high-speed operation and precise control of LD modulation signal can be realized, while the EMI characteristic and anti-noise characteristic are improved. This is because the small swing differential signal has a small energy change, and is durable against disturbance. Consequently, information can propagate, while maintaining the precise pulse width.

Figure 6:
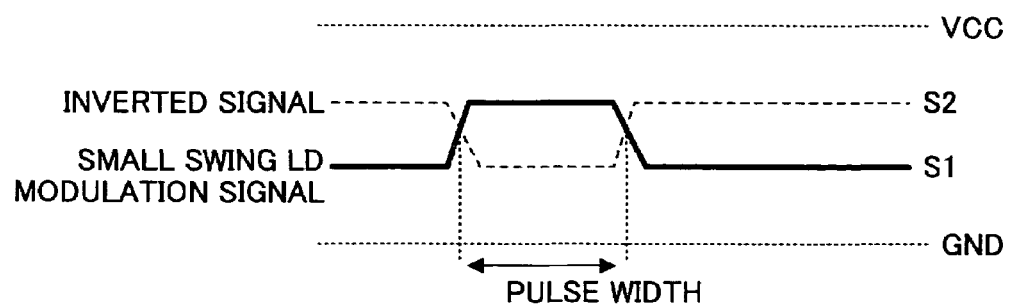
FIG. 6 illustrates a pulse shape of the small swing differential LD modulation signal having propagated through a long transmission path.

FIG. 6 illustrates how the pulse width is maintained even through a long transmission path. In general, as the transmission path lengthens, the rising time and the falling time of the pulse increases. In addition, the rising time and the falling time may differ from each other. However, a pair of differential signals allows the pulse to be transmitted as a precise pulse, even if the pulse shape of each of the signal pair degrades, as illustrated in FIG. 6. Accordingly, a pair of differential signals is suitable to signal transmission for pulse width modulation. A typical signaling scheme for pulse-width modulation is low voltage differential signaling (LVDS).

Figure 7:
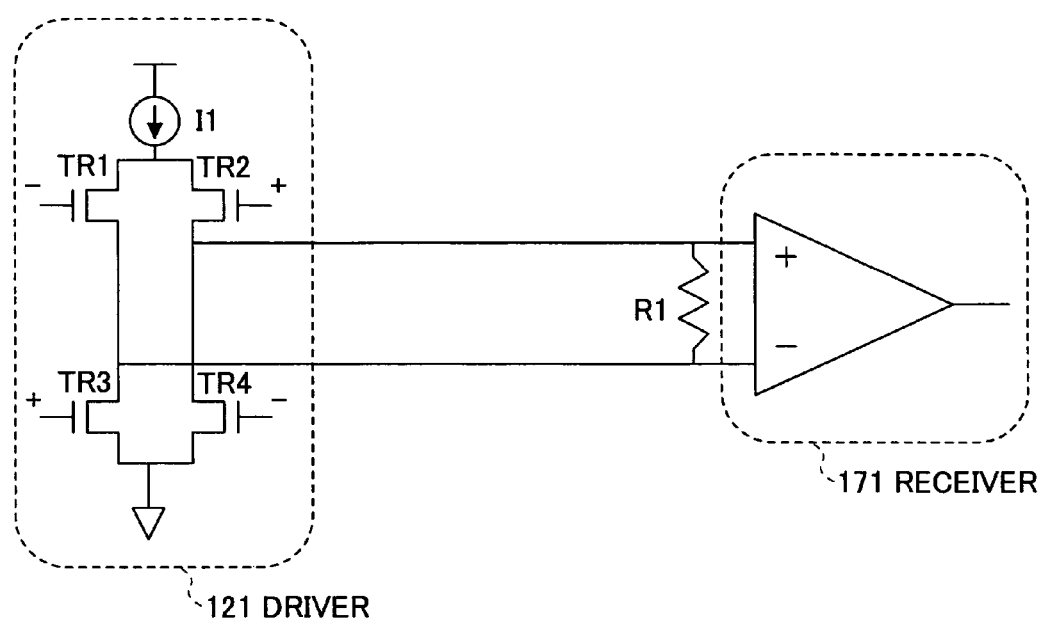
FIG. 7 shows an example of transmission of a small swing differential LD modulation signal based on the LVDS (Low Voltage Differential Signaling) technique.

FIG. 7 shows an example of producing a pair of small swing differential signal by LVDS. In the example shown in FIG. 7, CMOS transistors T2 and T3 of one conductivity type, and CMOS transistors T1 and T4 of the other conductivity type, are driven alternately to supply or draw electric current defined by the electric current source I1 of the driver 121 to or from the associated signal lines. A pair of small swing differential signals is transmitted by a potential difference between terminals of the resistor R1 of the receiver 171. As long as a small swing differential signal is transmitted, any methods other than LVDS may be used, which are described later.

Figure 8:
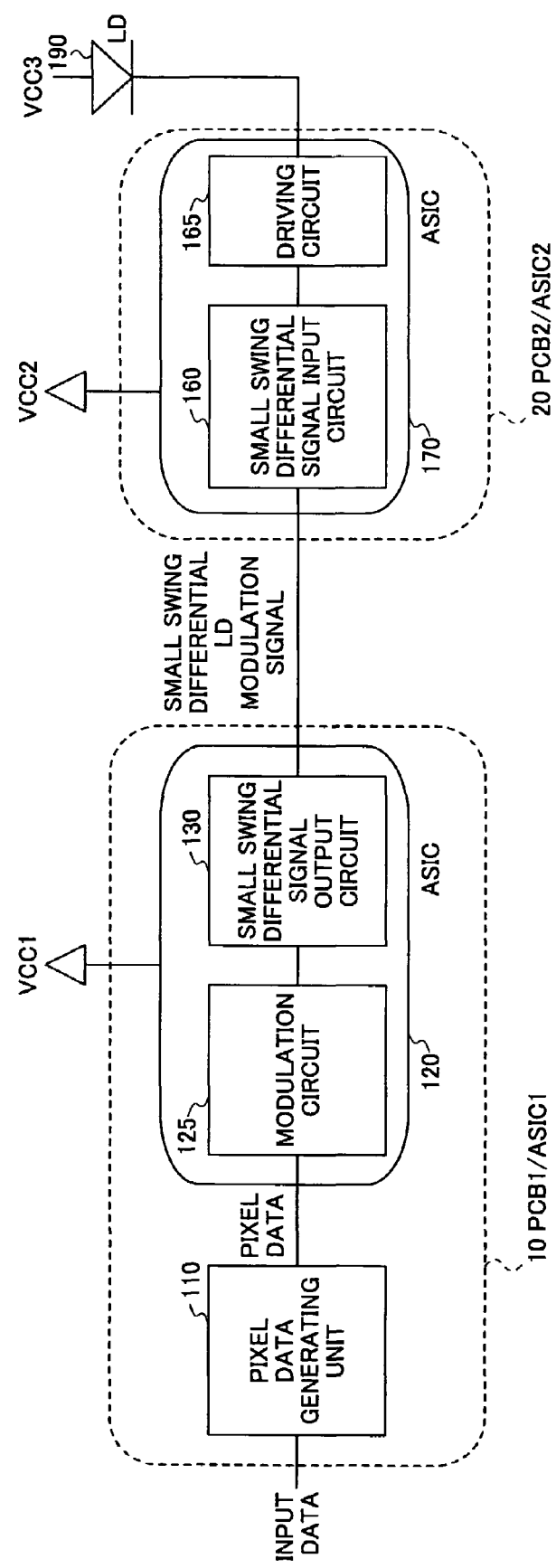
FIG. 8 shows still another example of the LD modulating/driving device according to an embodiment of the invention.

FIG. 8 illustrates the structures of the LD modulation signal generating unit 120 and the LD driving unit 170. The LD modulation signal generating unit 120 has a modulation circuit 125 and a small swing differential signal output circuit 130 functioning as the driver 121 shown in FIG. 7. The LD driving unit 170 has a small swing differential signal input unit 160 functioning as the receiver 171 shown in FIG. 7, and a driving circuit 165.

In FIG. 8, the ASIC mounting the LD modulation signal generating unit 120 is connected to the supply voltage VCC1, the ASIC mounting the LD driving unit 170 is connected to the supply voltage VCC2, and the LD 190 is connected to the supply voltage VCC3. By providing separate voltage sources, each block can operate in the optimum manner. For instance, the block (or the ASIC) of the LD modulation signal generating unit 120 mainly includes a digital circuit consisting of fine devices for producing an LD modulation signal, and has to satisfy high-speed operation. The supply voltage VCC1 connected to such a high-speed operative circuit is a low voltage. VCC1 is, for example, 1.2 V in the 0.13 µm process or 1.8 V in the 0.18 µm process. It is sufficient for VCC2 connected to the block of the LD driving unit 170 to have a potential required for the LD driving transistor plus the falling voltage of the LD 190. Assuming that the typical falling voltage of the LD 190 is 2.5 V and that the required potential of the LD driving transistor is at least 1 V, then VCC2 is at least 3.5 V. The other voltage VCC3 connected to the LD 190 may be in common with VCC2. However, since there is limitation due to the device structure in setting a supply voltage for an ASIC, VCC3 may be set lower than VCC2, for the purpose of reducing power consumption of the associated ASIC. For example, VCC2 may be set to 5 V, while VCC3 is set to 3.5 V to reduce the power consumption.

Figure 9A:
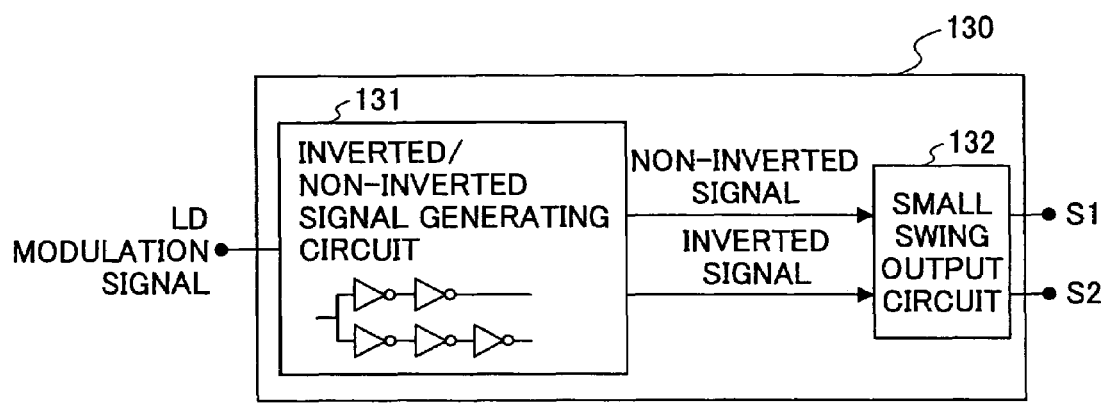
FIG. 9A shows the detailed structure of the small swing differential signal output unit.
Figure 9B:
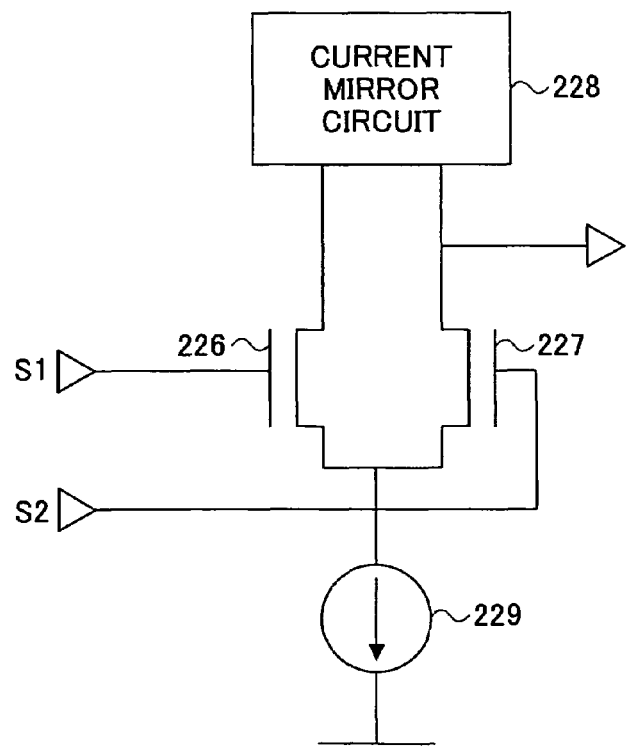
FIG. 9B shows the detailed structure of the small swing differential signal input unit shown in FIG. 8.

FIG. 9A illustrates the structure of the small swing differential signal output circuit 130 arranged on the output side of the LD modulation signal generating unit 120, while FIG. 9B illustrates the structure of the small swing differential signal input circuit 160 arranged on the input side of the LD driving unit 170.

As illustrated in FIG. 9A, the small swing differential signal output circuit 130 includes an inverted/non-inverted signal generating circuit 131 and a small swing output circuit 132. The inverted/non-inverted signal generating circuit 131 receives an LD modulation signal from the modulation circuit 125, and outputs a non-inverted signal with the same phase as the LD modulation signal (which is referred to as a "non-inverted LD modulation signal"), and an inverted signal with the phase shifted by 180 degrees with respect to the non-inverted signal (which is referred to as an "inverted LD modulation signal"). The small swing output circuit 132 receives the non-inverted and/or inverted signals, and outputs a small swing differential LD modulation signal consisting of a non-inverted small swing LD modulation signal and an inverted small swing LD modulation signal with the phase shifted by 180 degrees with respect to the non-inverted small swing LD modulation signal.

FIG. 9B illustrates a circuit used in the small swing differential signal input unit 160 of the LD driving unit 179. This circuit includes transistors 226 and 227, a current mirror circuit 228 for providing load on both transistors, and a constant current circuit 229. If the transistor 226 is a CMOS circuit, the LVDS circuit described above with reference to FIG. 7 is realized. If the transistor 226 is a bipolar transistor, an emitter coupled logic (ECL) circuit or a current mode logic (CML) circuit is realized. There are several circuit structures for receiving a small swing differential signal pair. In general, the same circuit scheme as that of the small swing differential signal output circuit 130 is used. However, since the supply voltage for the small swing differential signal input circuit 160 is different from that for the small swing differential signal output circuit 130 in this example, high-speed signal transmission is possible without using the same circuit scheme.

Figure 10:
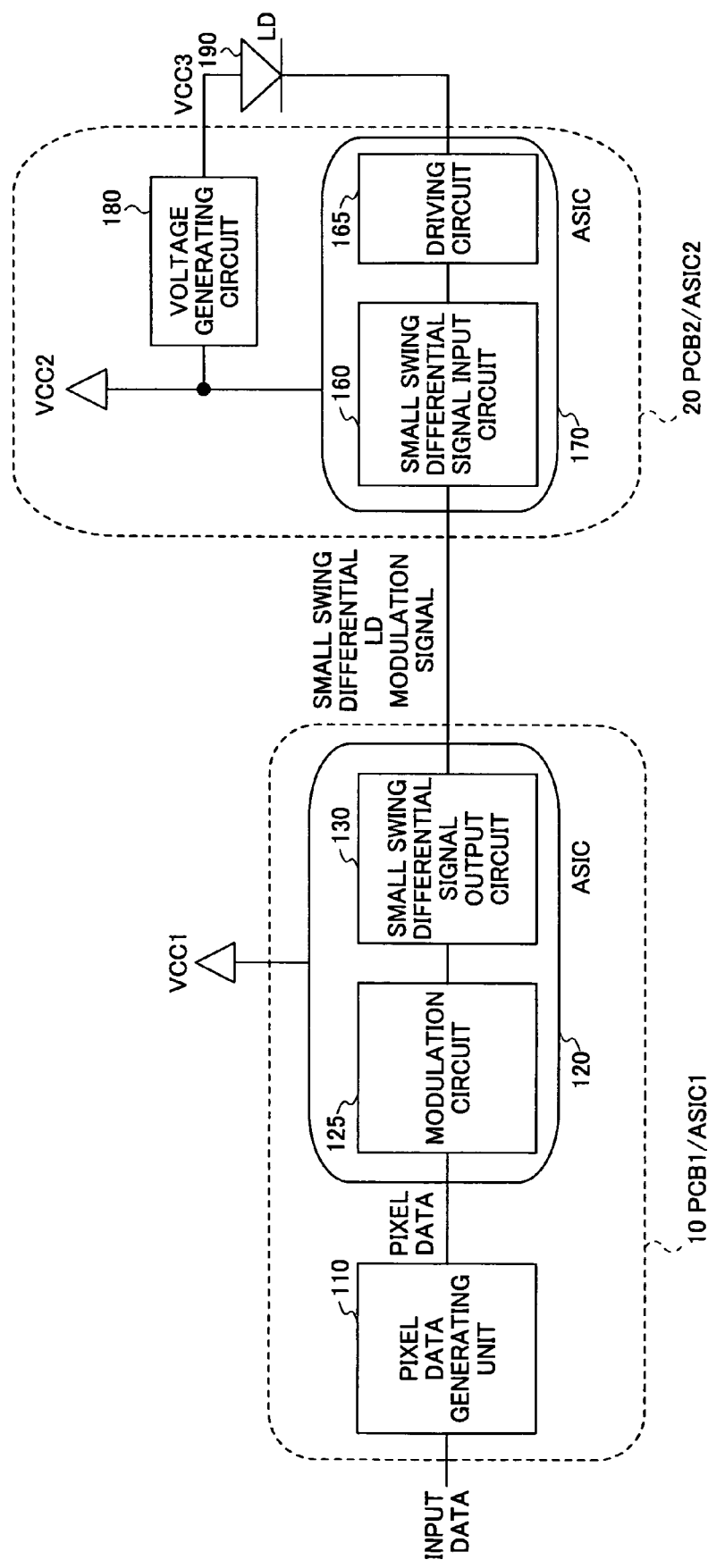
FIG. 10 shows still another example of the LD modulating/driving device according to an embodiment of the invention.

FIG. 10 illustrates the structure for varying VCC2 and VCC3. In the example shown in FIG. 10, VCC3 used for the LD 190 is generated from VCC2 used in the LD driving unit 170 having the small swing differential signal input circuit 160, via a voltage generating circuit 180 (VCC3<VCC2).

Figure 11:
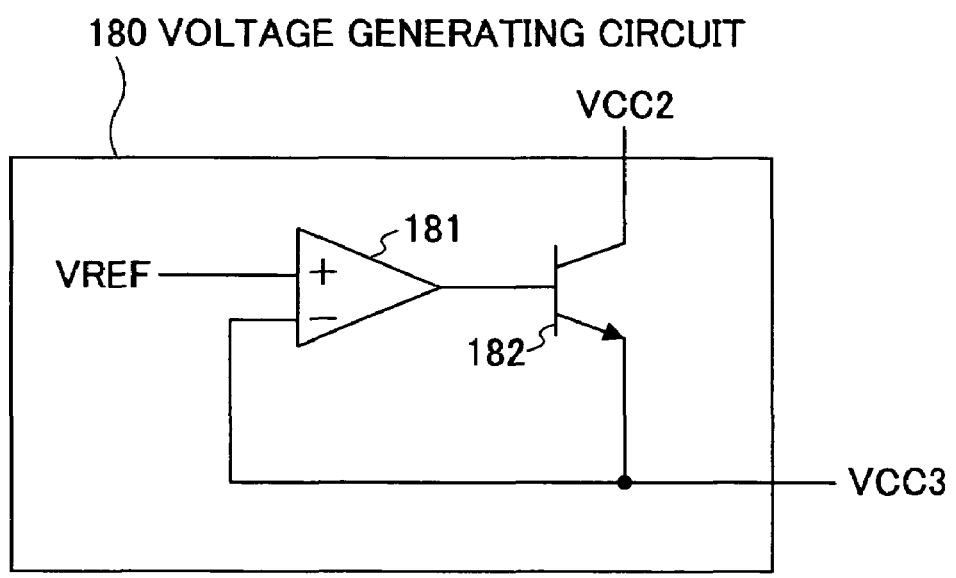
FIG. 11 is circuit diagram of an example of the voltage generator for generating VCC3 shown in FIG. 10.

FIG. 11 shows the structure of the voltage generating circuit 180. In this circuit 180, the voltage drop of the transistor 182 is controlled by the output of the differential amplifier 181. In order to set VCC3 to 3.5 V with VCC2 of 5V, a reference voltage of 3.5 V is input to the reference voltage input terminal. By designing the circuit 180 such that the reference voltage Vref is set externally and freely, any type of laser diode may be connected. The optimum levels of VCC2 and VCC3 suitable to both the power consumption and the driving operation of the LD driving unit 170 can be selected according to the actually used laser diode (LD) 190. The voltage generating circuit 180 may be incorporated in the ASIC of the LD driving unit 170, or alternatively, it may be arranged outside the ASIC of the LD driving unit 170, as illustrated in FIG. 10.

Figure 12:
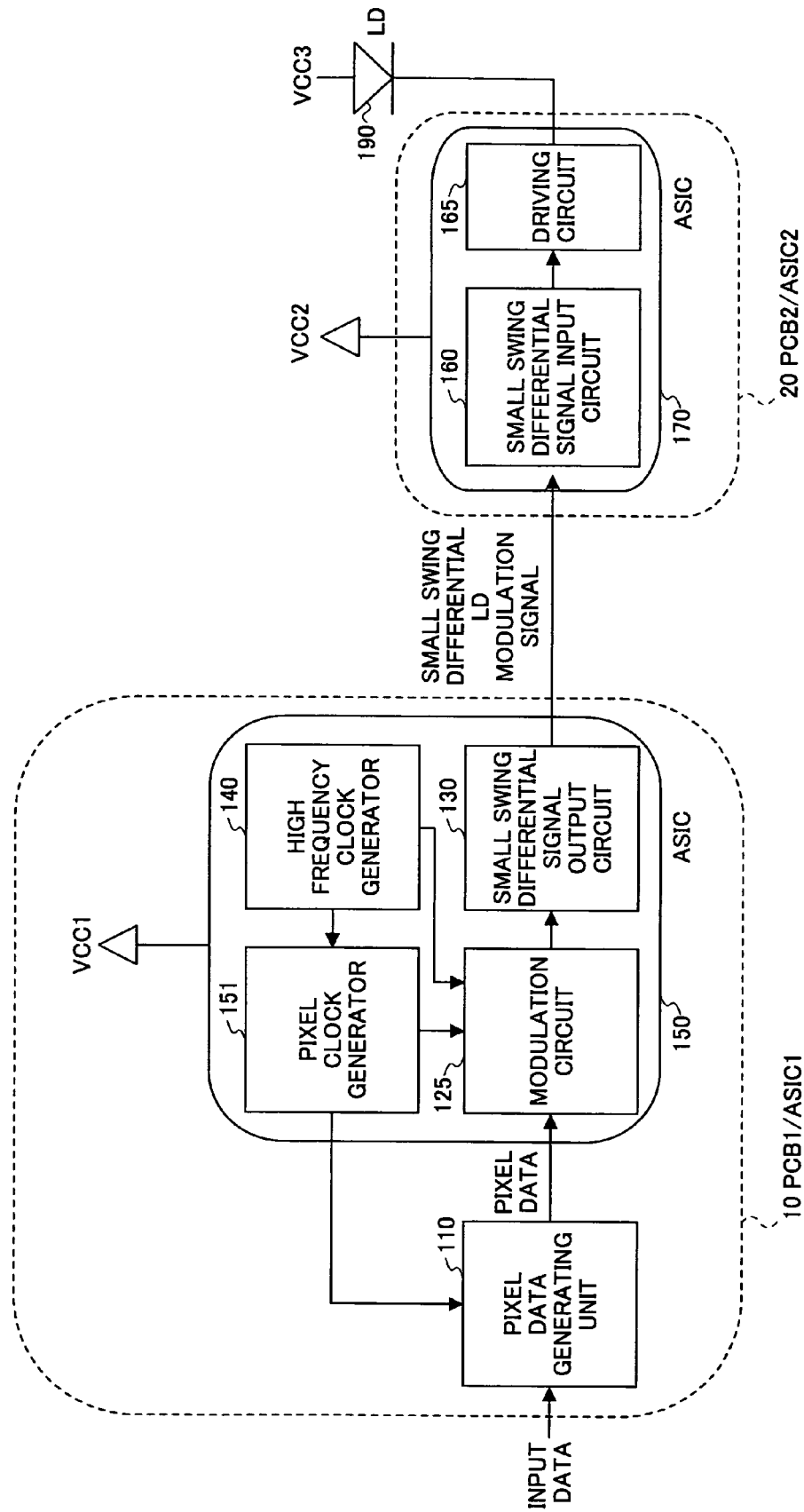
FIG. 12 shows still another example of the LD modulating/driving device according to an embodiment of the invention.

FIG. 12 illustrates another example of the semiconductor laser modulating/driving device according to an embodiment of the invention. In this example, the modulation circuit 125 and the small swing differential signal output circuit 130, which form the LD modulation signal generating unit 120, are incorporated in ASIC 150 together with a pixel clock generator 151 and a high frequency clock generator 140. Although in this example the pixel data generating unit 110 is excluded from the ASIC 150, it may also be incorporated in the ASIC 150. The pixel data generating unit 110 and the ASIC 150 are mounted on the same block (PCB1 or ASIC1) 10, while the LD driving unit 170 is mounted on a separate block (PCB2 or ASIC2) 20.

Figure 13:
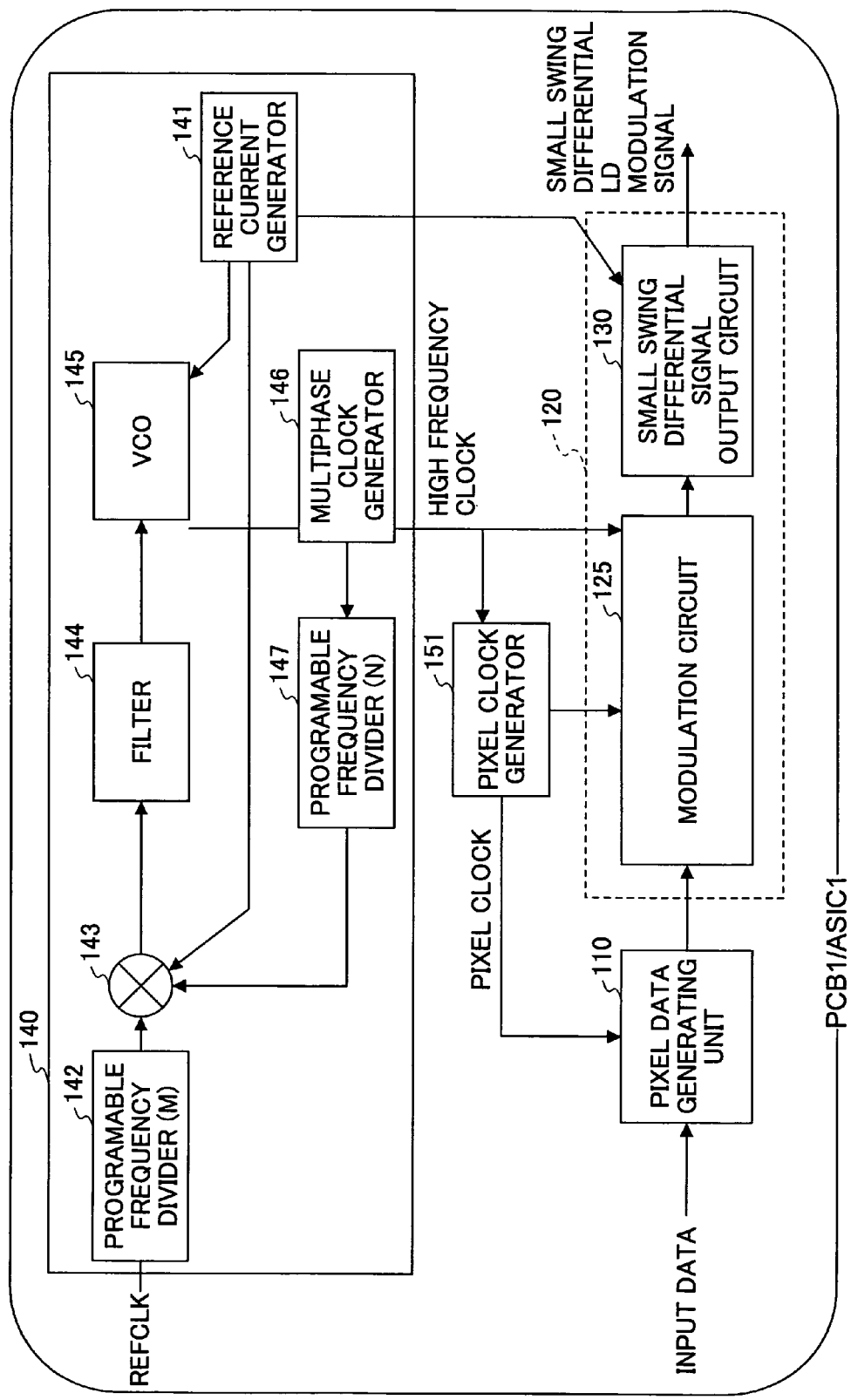
FIG. 13 illustrates a part of the LD modulating/driving device shown in FIG. 12.

FIG. 13 illustrates the detailed structure of the high frequency clock generator 140 and the data flow in the block (PCB1/ASIC1) 10. The high frequency clock generator 140 includes a reference current generator 141, a programmable frequency divider (M) 142, a phase comparator 143, a filter 144, a voltage control oscillator (VCO) 143, a multiphase clock generator 146, and a programmable frequency divider (N) 147. The reference current generator 141 generates and supplies a reference current to the phase comparator 143 and the VCO 145 of the high frequency clock generator 140, as well as to the small swing differential signal output circuit 130. The programmable frequency divider (M) 142 divides the reference clock REFCLK by M.

The phase comparator 132, the filter 144, the VCO 145, the multiphase clock generator 146, and the programmable frequency divider (N) 147 form a so-called phase locked loop (PLL) circuit. The PLL circuit produces a multiphase high-frequency clock whose phase is adjusted to the output of the programmable frequency divider (M) 142 and whose frequency is set by multiplying the output of the programmable frequency divider (M) 142 by N. In general, the produced high frequency clock is several to several tens times the pixel clock. The high frequency clock is supplied to the pixel clock generator 151 and the modulation circuit 125 of the LD modulation signal generating unit 120. The structure of the high frequency clock generator 140 is not limited to the PLL circuit, and any structure can be employed as long as a high frequency clock is produced. The reference current generator 141 may be formed separately from the high frequency clock generator 140.

The pixel clock generator 151 divides the high frequency clock supplied from the high frequency clock generator 140 to produce a pixel clock, which is used as a reference when a photocopier or a printer reproduces an image. Although the detailed explanation is omitted here, the pixel clock generator 151 produces a sync clock from a synchronized signal for aligning the writing position for a raster type laser printer. When applied to a photocopier or a color printer, the pixel clock generator 151 needs to have a function of adjusting a clock scanning time for each clock. The pixel clock produced by the pixel clock generator 151 is supplied to the pixel data generating unit 110 and the LD modulation signal generating unit 120.

The pixel data generating unit 110 receives image data output from a printer or read by a scanner, and produces pixel data at a timing of the pixel clock in accordance with the γ characteristic of the photosensitive drum so as to allow the image to be output from a laser printer. The produced pixel data are, for example, 8-bit data per pixel per color.

The modulation circuit 125 produces a bit-serial LD modulation signal from the pixel data, based on the pixel clock and the high frequency clock. A pulse modulation signal generating circuit suitable to high speed operation of the LD modulation signal generating unit 120 was proposed by the inventors of the present patent application, which is disclosed in JPA 2003-103831. However, any suitable known structure may be employed for the LD modulation signal generating unit 120.

The LD modulation signal produced by the modulation circuit 125 is converted to a small swing differential LD modulation signal by the small swing differential signal output circuit 130, which is then transmitted to the small swing differential signal input circuit 160 of the LD driving unit 170 mounted on the different ASIC or PCB block 20.

There are several ways of producing a small swing differential signal pair. One method is the above-described low voltage differential signaling (LVDS) technique. Alternatively, current mode logic (CML), emitter coupled logic (ECL), or other methods may also be used to produce a small swing differential signal. In general, the LD driving unit that receives the small swing differential signal pair employs the same method as that used on the output side. However, if the supply voltage differs between the small swing differential signal output side and the input side, then different techniques may be used on the output side and the input sides, without preventing high speed signal transmission.

Next, the first embodiment that uses CML or ECL for producing a small swing differential signal is explained with reference to FIG. 14 through FIG. 44. In the following examples, a small swing output is produced by a single inverter; however, the same applies to the structure using multiple inverters or a buffer.

Figure 14:
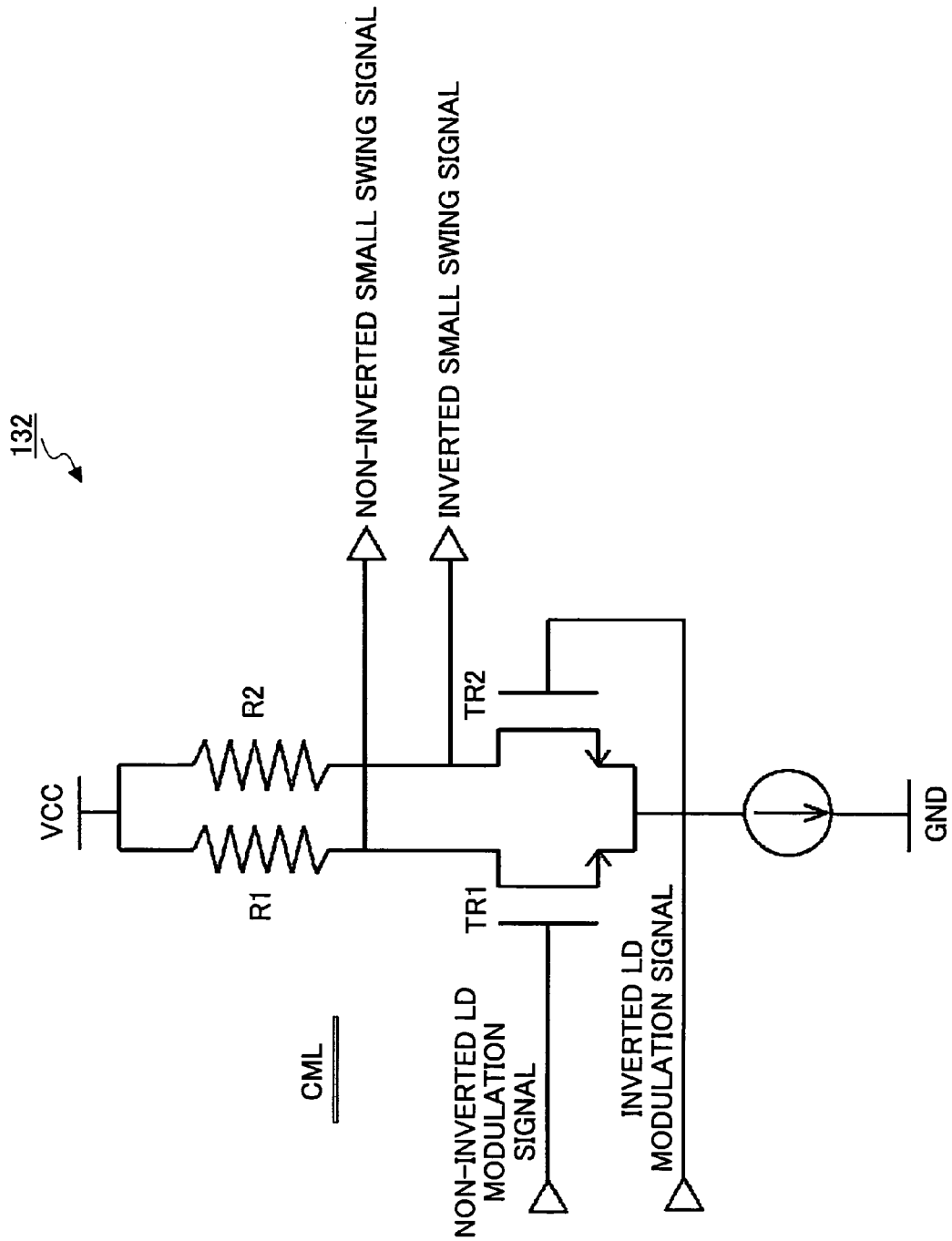
FIG. 14 is a circuit diagram showing an example of producing a small swing differential signal according to the first embodiment of the invention.

FIG. 14 is a circuit diagram of current mode logic (CML) used in the small swing output circuit 132 shown in FIG. 9A. A pair of differential signals consisting of a non-inverted LD modulation signal and an inverted LD modulation signal are input to the gates of transistors TR1 and TR2, respectively, and load resistors R1 and R2 are inserted in the CML. This arrangement makes the amplitude of the output of the CML smaller than VCC. The output level of the small swing signal can be regulated by adjusting the resistance values of the resistors R1 and R2.

Figure 15:
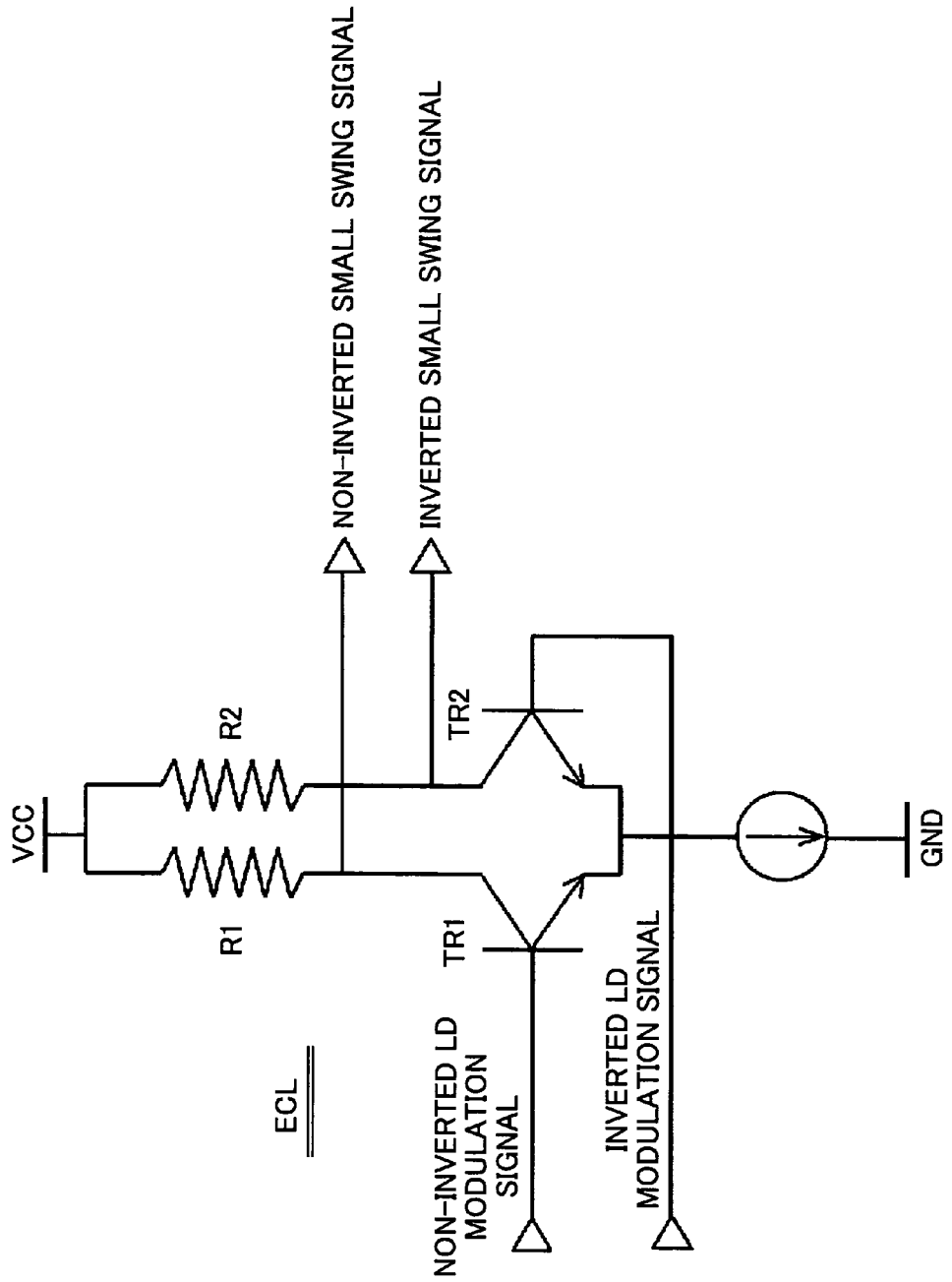
FIG. 15 is a circuit diagram showing another example of producing a small swing differential signal according to the first embodiment of the invention.

FIG. 15 shows another example of producing a small swing signal pair, in which emitter coupled logic (ECL) is employed. This circuit has the same structure as that of FIG. 14, except that bipolar transistors are used as transistors TR1 and TR2 and that the non-inverted and inverted differential signals are input to the bases of the bipolar transistors.

Figure 16:
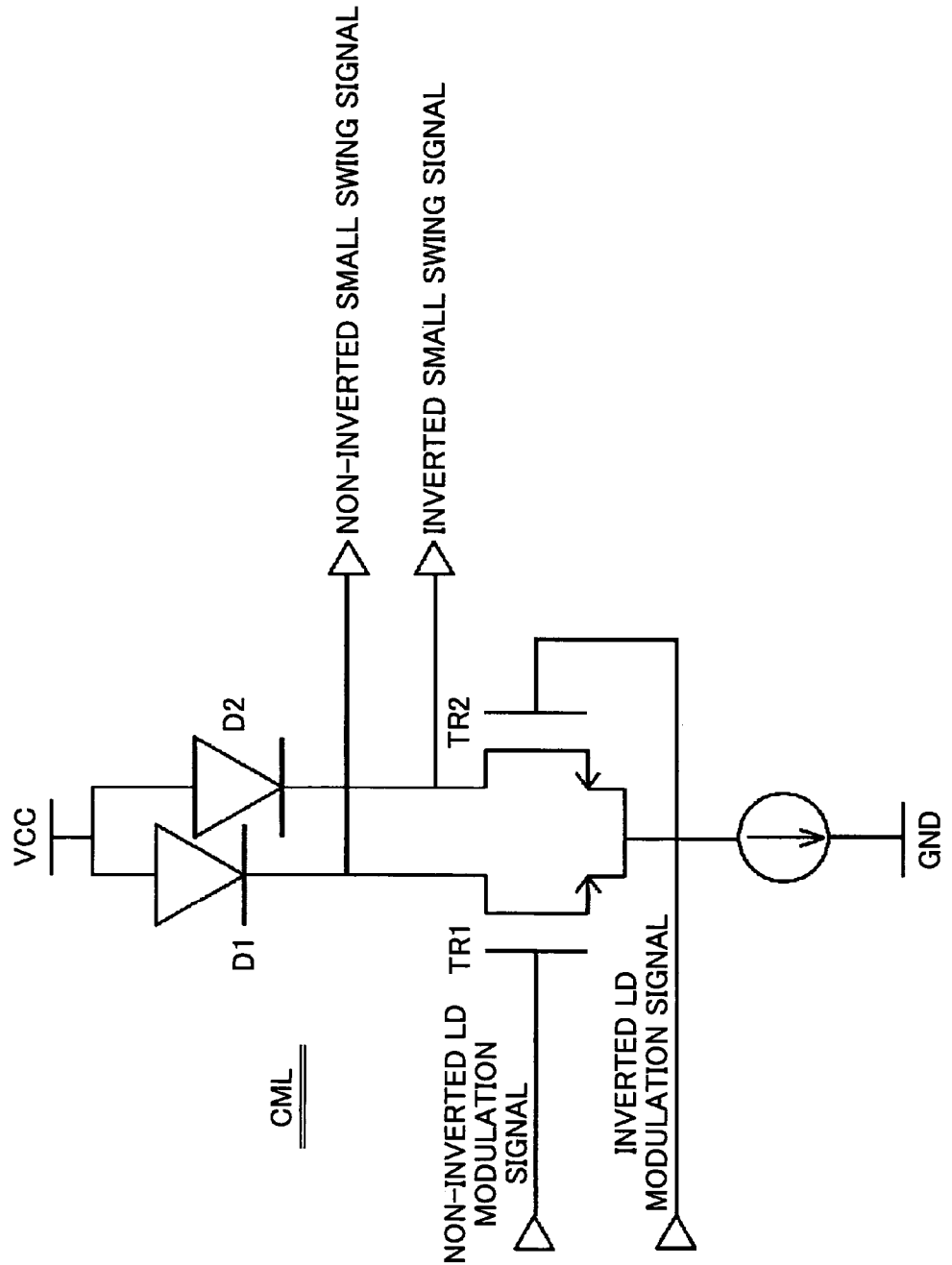
FIG. 16 is a circuit diagram showing still another example of producing a small swing differential signal according to the first embodiment of the invention.

FIG. 16 shows still another example of producing a pair of small swing signals by CML. In this circuit, diodes D1 and D2 are used in place of resistors R1 and R2 to produce load on the CML. A pair of differential signals consisting of the non-inverted LD modulation signal and the inverted LD modulation signal are input to the gate of transistors TR1 and TR2, respectively. The output swing of the CML is smaller than VCC by a voltage difference equal to the falling voltage of the diodes D1 and D2. By adjusting the size of the diodes D1 and D2, the output swing level is regulated. Similarly to FIG. 15, the arrangement can be applied to ECL by replacing transistors TR1 and TR2 with bipolar transistors.

Figure 17:
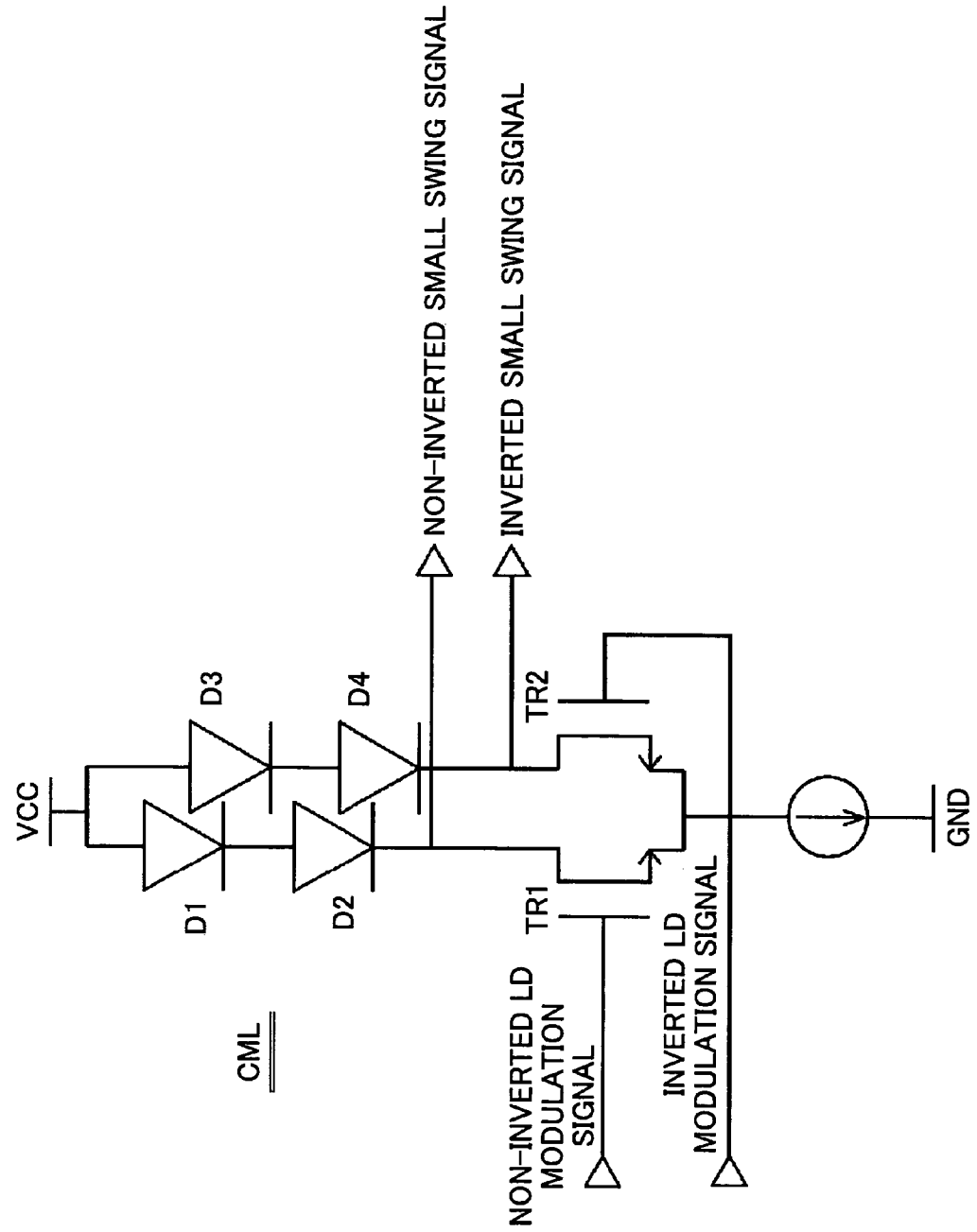
FIG. 17 is a circuit diagram showing still another example of producing a small swing differential signal according to the first embodiment of the invention.

FIG. 17 shows still another example of producing a small swing signal pair by CML. In this example, two diodes D1 and D2 are inserted in series for outputting the non-inverted small swing signal, and two diodes D3 and D3 are inserted in series for outputting the inverted small swing signal. The output swing of the CML can be made smaller than VCC by the falling voltage of the two diodes. By adjusting the size of each diode, the output swing level can be adjusted. By replacing the TR1 and TR2 with bipolar transistors, an ECL circuit can be formed.

Figure 18:
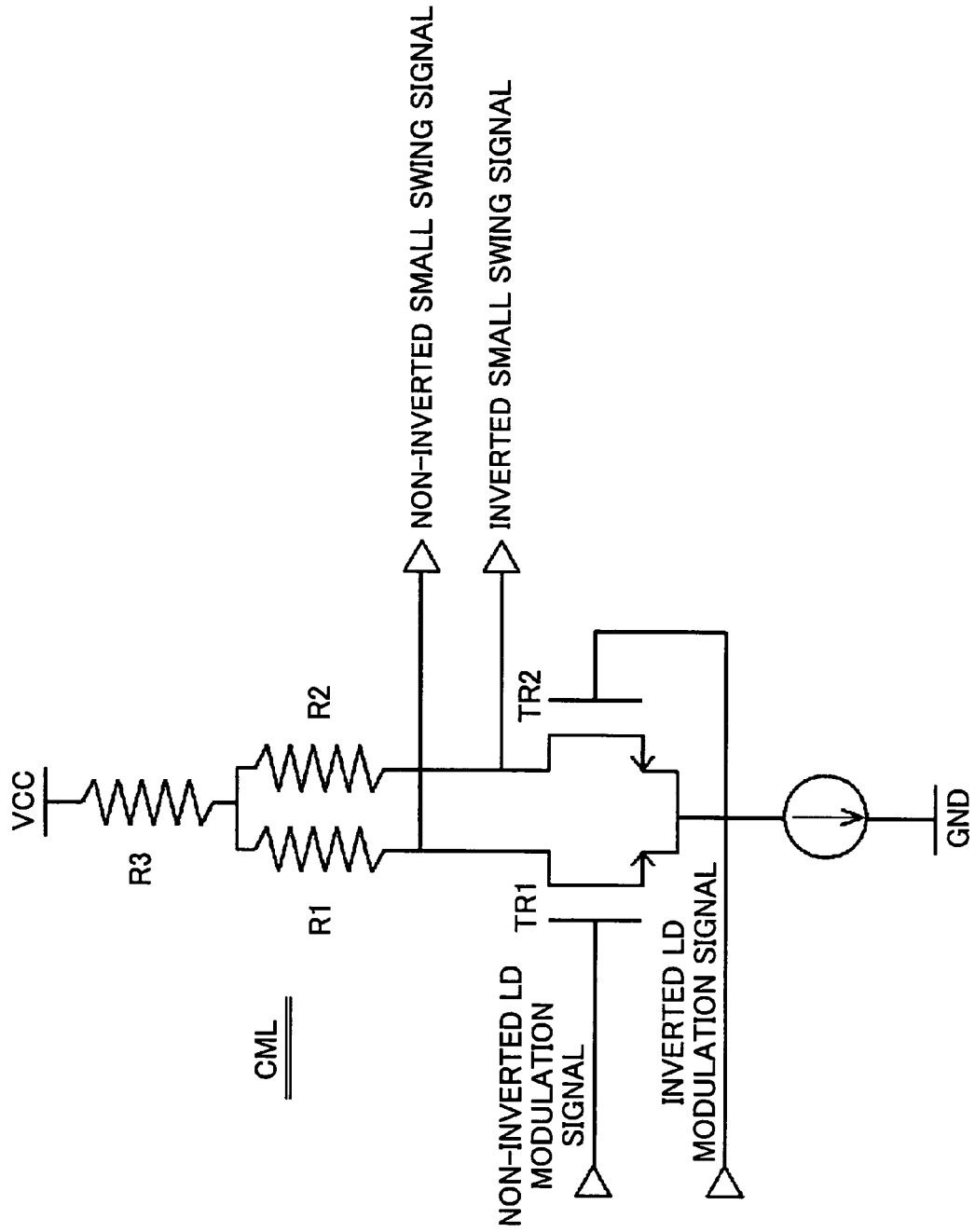
FIG. 18 is a circuit diagram showing still another example of producing a small swing differential signal according to the first embodiment of the invention.

FIG. 18 shows still another example of producing a small swing signal pair by CML. In this example, the third resistor R3 is inserted between VCC and the resistors R1 and R2. This arrangement can make the reference electric potential lower than VCC, and make the output swing of the CML smaller. By adjusting the resistance values of resistors R1, R2, and R3, the amplitude or the swing of the output of the CML can be regulated. The same structure can be applied to ECL.

Figure 19:
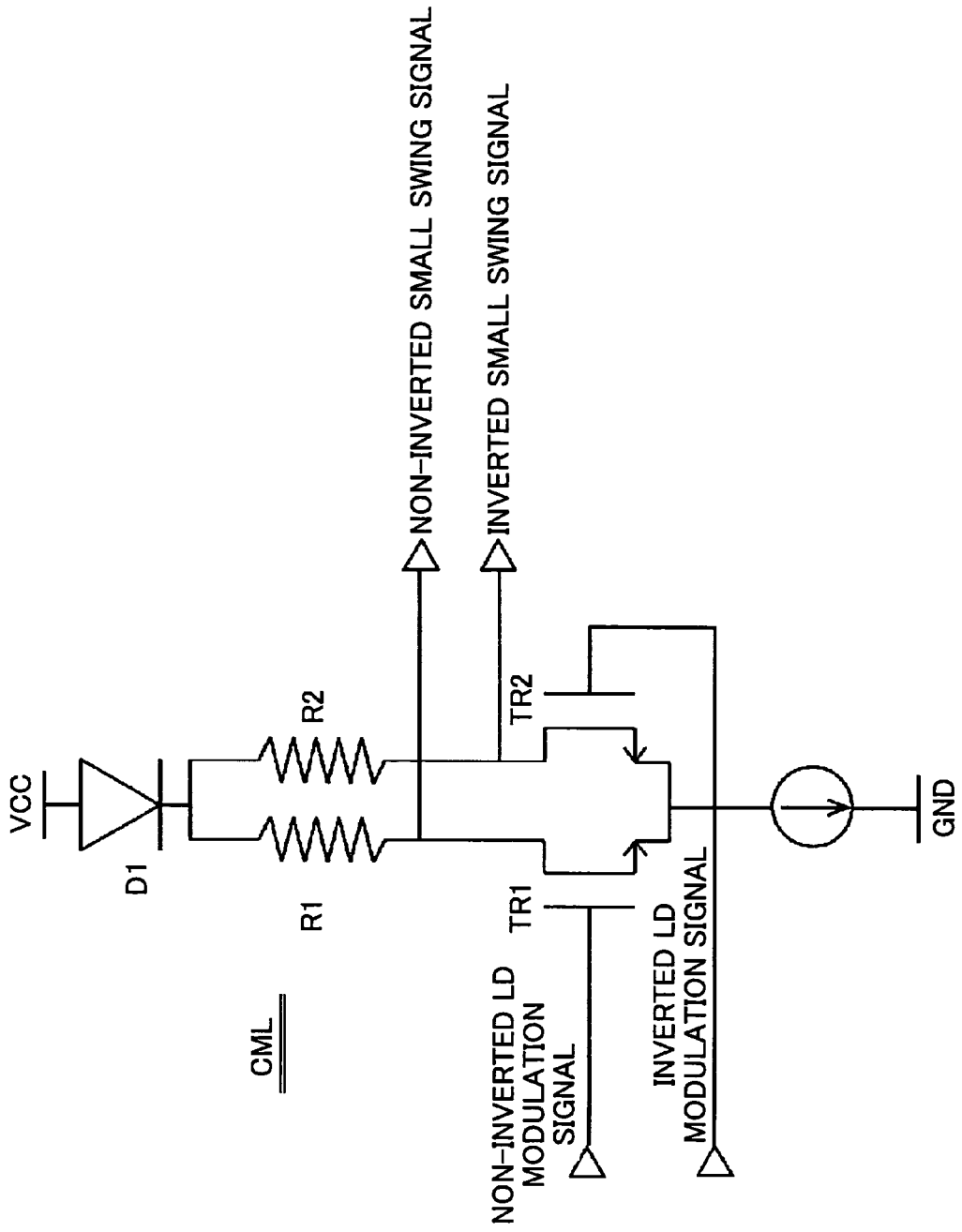
FIG. 19 is a circuit diagram showing still another example of producing a small swing differential signal according to the first embodiment of the invention.

FIG. 19 shows still another example of producing a small swing signal pair by CML. In this example, a diode D1 is inserted between VCC and the resistors R1 and R2. The reference electric potential can be made lower than VCC by a voltage difference equal to the falling voltage of diode D1, and consequently, the output swing of the CML can be made smaller. By adjusting the size of the diode D1, the swing level of the output of CML can be regulated. The same arrangement applies to ECL.

Figure 20:
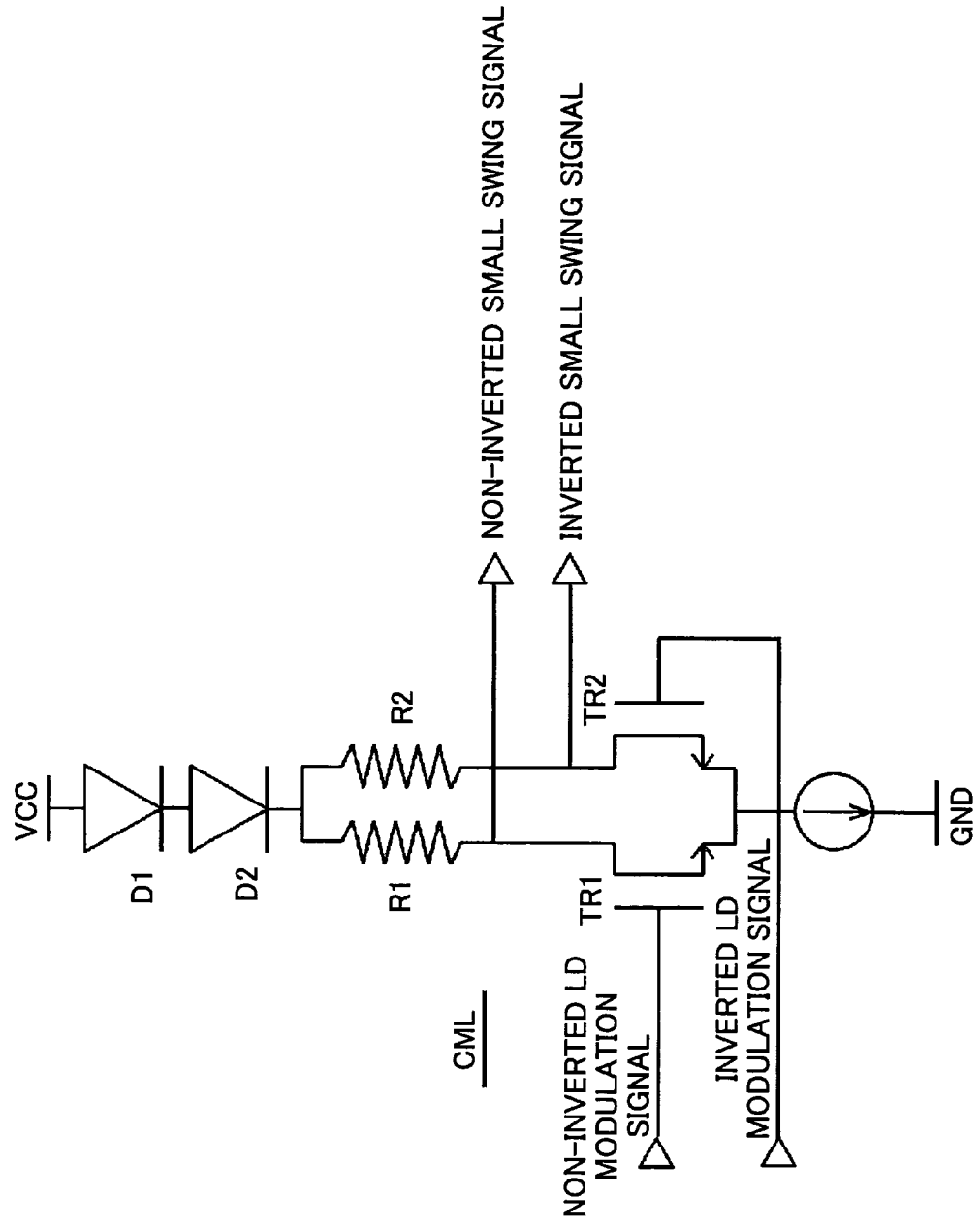
FIG. 20 is a circuit diagram showing still another example of producing a small swing differential signal according to the first embodiment of the invention.

FIG. 20 shows still another example of producing a small swing signal pair by CML. In this example, serially connected diodes D1 and D2 are inserted between VCC and the resistors R1 and R2. The reference electric potential is made smaller than VCC by a voltage difference equal to the falling voltage of the two diodes, and consequently, the swing or the amplitude of the output of the CML can be made smaller. By adjusting the size of the diodes D1 and D2, the swing level of the output of CML can be regulated. The same arrangement applies to ECL.

Figure 21:
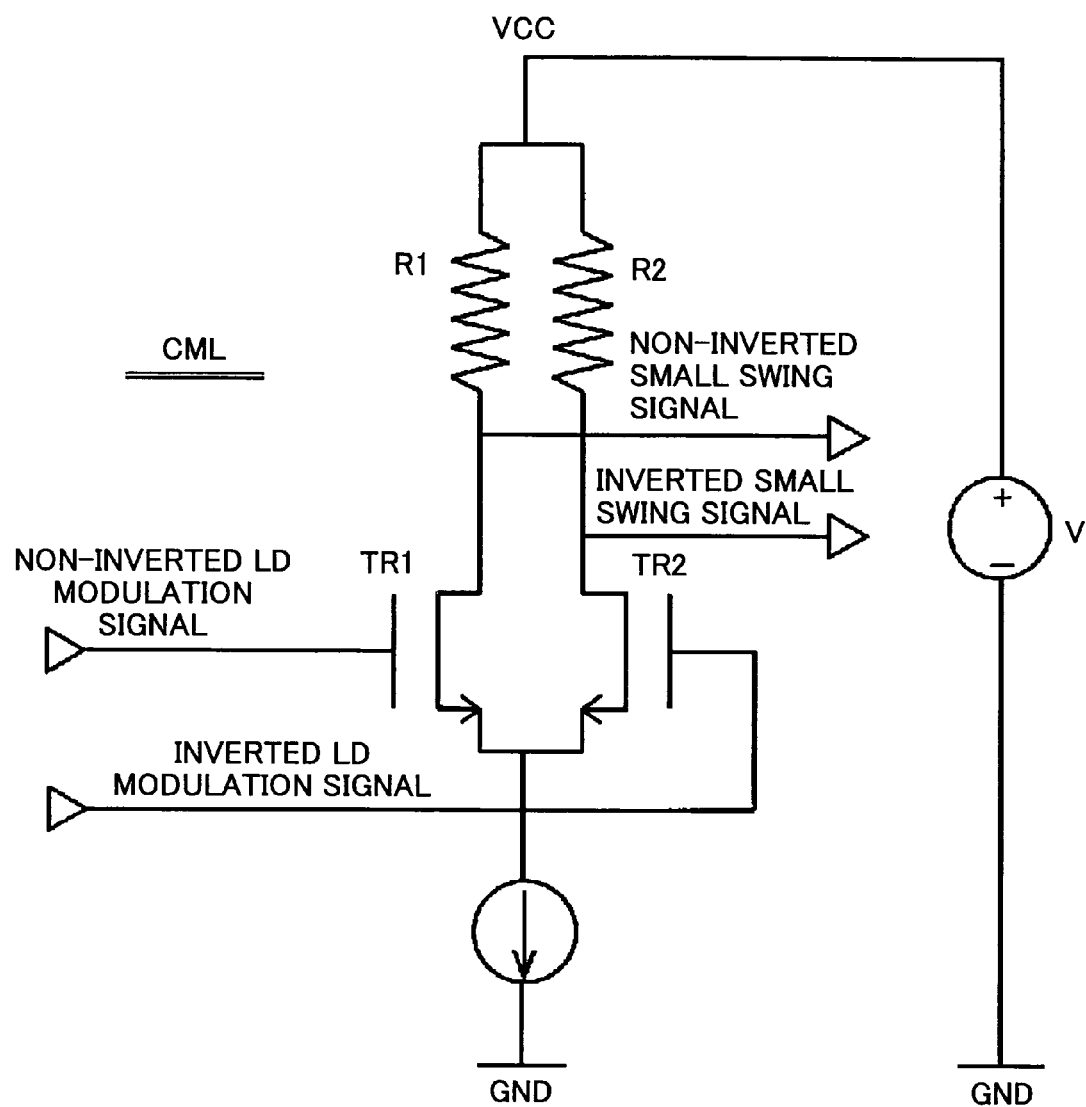
FIG. 21 is a circuit diagram showing still another example of producing a small swing differential signal according to the first embodiment of the invention.

FIG. 21 shows still another example of producing a small swing signal pair by CML. In this example, VCC is connected to the voltage source V. This arrangement allows the reference electric potential to be set to a desired level, and therefore, the output swing of the CML can be regulated to a desired level. The same applies to ECL.

Figure 22:
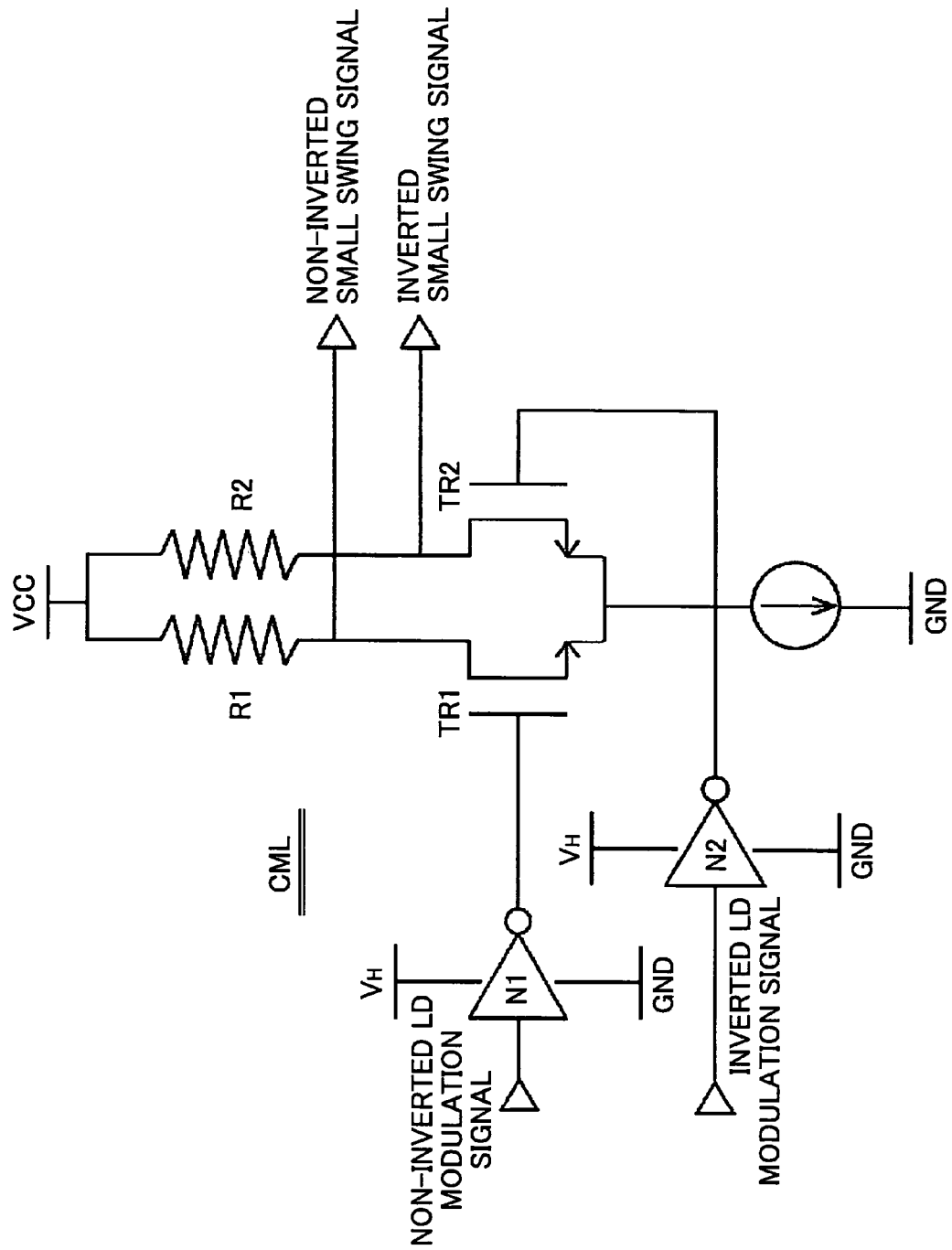
FIG. 22 is a circuit diagram showing still another example of producing a small swing differential signal according to the first embodiment of the invention.

FIG. 22 shows still another example of producing a small swing signal pair by CML. In this example, the swing of the non inverted and inverted modulation signals has already been made smaller prior to being input to the CML having the structure shown in FIG. 14. The outputs of inverters N1 and N2 are connected to the gates of transistors TR1 and TR2, respectively. Supply voltage $V_H$, which is lower than VCC, is applied to supply terminal of inverter N1 and N2, such that the swing height of the modulation signal input to the CML becomes lower than VCC. This arrangement can reduce fluctuation of the electric current source due to switching, while increasing the switching speed. The same arrangement can apply to ECL.

Figure 23:
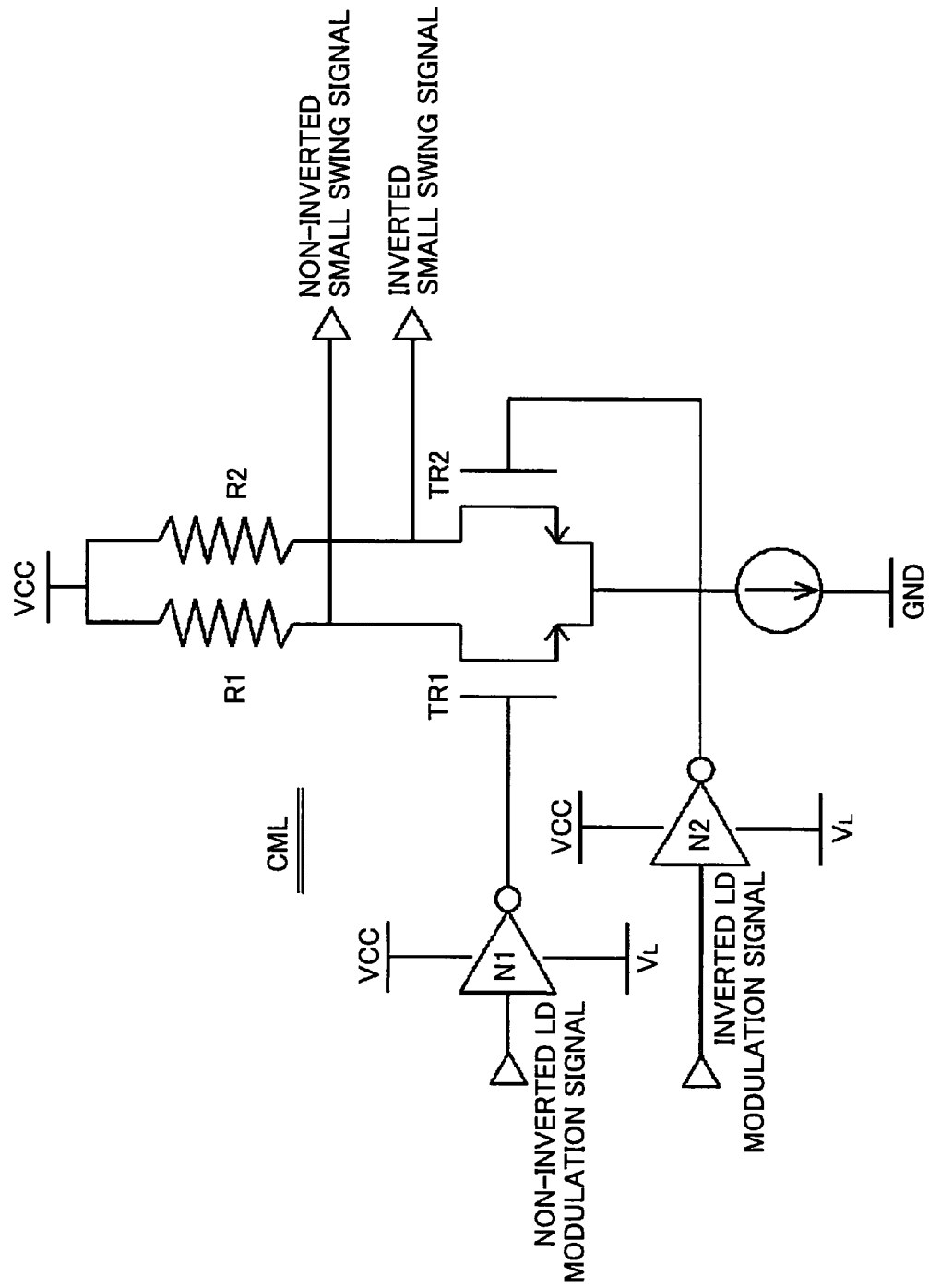
FIG. 23 is a circuit diagram showing still another example of producing a small swing differential signal according to the first embodiment of the invention.

FIG. 23 shows another example of reducing the swing of the modulation signals input to CML, as in the example shown in FIG. 22, but setting the ground potential of inverters N1 and N2 to $V_L$, which is higher than GND. With this arrangement, the swing height of the input signal to CML becomes VCC-$V_L$, and therefore, the fluctuation of the electric current source due to switching can be reduced, while allowing the switching speed to be increased. The same arrangement can apply to ECL.

Figure 24:
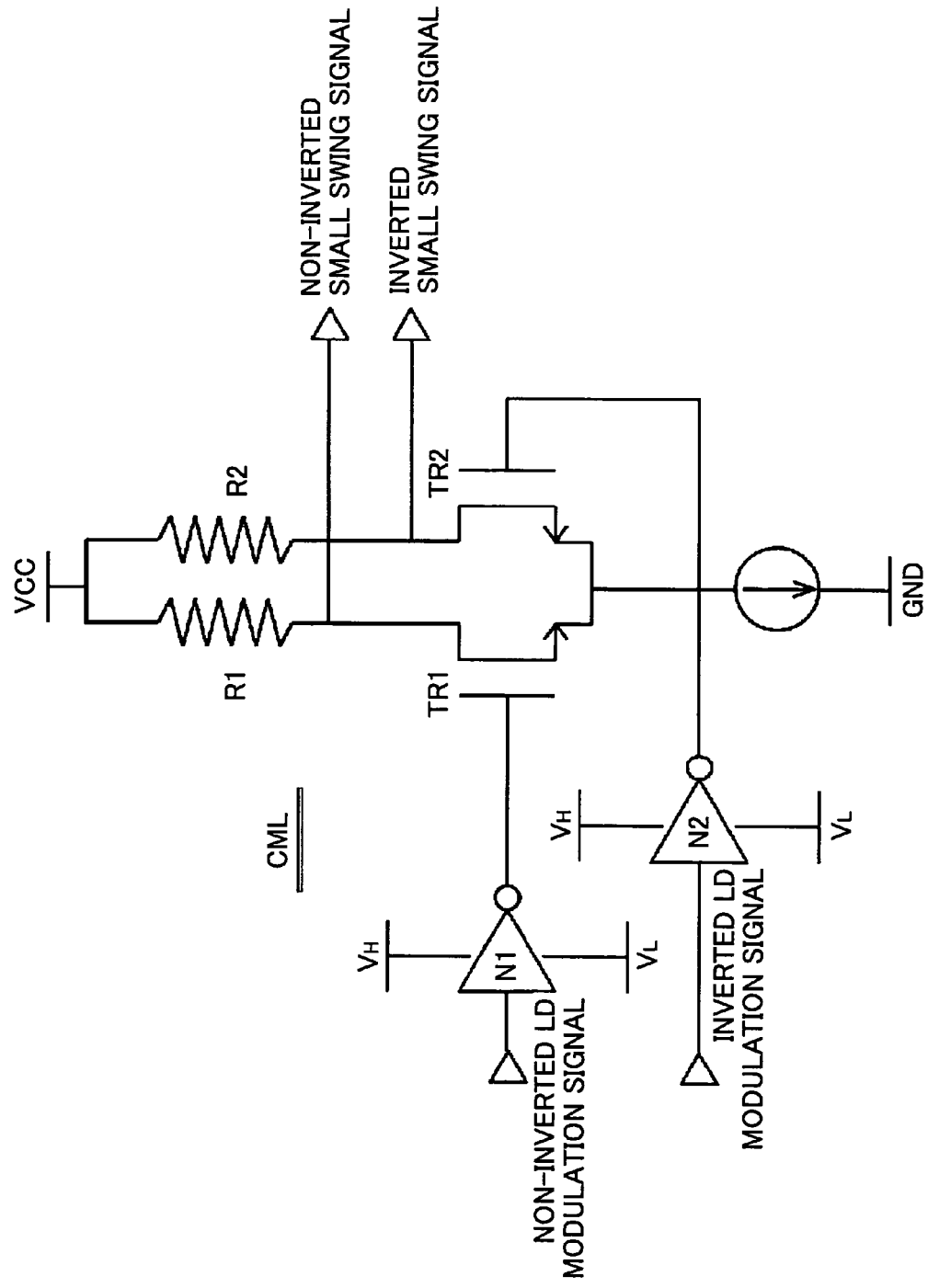
FIG. 24 is a circuit diagram showing still another example of producing a small swing differential signal according to the first embodiment of the invention.

FIG. 24 shows still another example of reducing the swing of the modulation signals input to CML, as in the examples shown in FIG. 22 and FIG. 23. In this example, the supply voltage of inverter N1 and N2 is set to $V_H$, which is lower than VCC, and the ground potential of inverters N1 and N2 is set to $V_L$, which is higher than GND. With this arrangement, the swing of the input signal to CML becomes $V_H$-$V_L$, which is much smaller than VCC. Consequently, fluctuation in the electric current source due to switching can be prevented, while increasing the switching speed. The same arrangement applies to ECL.

Figure 25B:
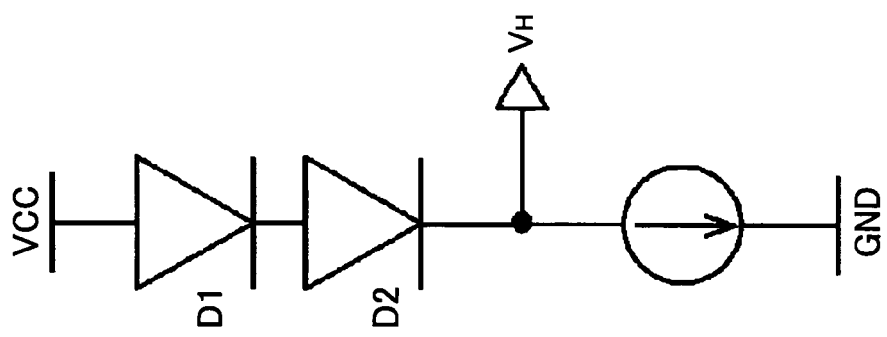
FIG. 25 shows an example of producing a high voltage shown in FIG. 22 and FIG. 24, which is used when producing a small swing differential signal
Figure 25A:
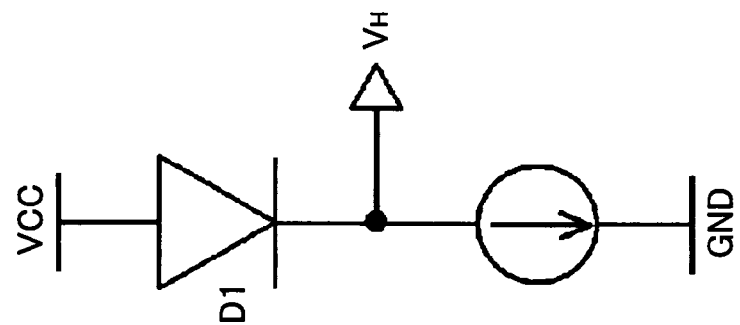

FIG. 25A and FIG. 25B show circuits for producing high voltage $V_H$ applied to the power supply terminal of inverters N1 and N2 shown in FIG. 22 and FIG. 24. In FIG. 25A, the anode of diode D1 is connected to the supply voltage VCC, and the cathode is connected to the current source. With this arrangement, a voltage $V_H$ which is smaller than VCC by a voltage difference equal to the falling voltage of the diode D1 can be extracted in a stable manner. By adjusting the size and the diode D1 and by regulating the level of the current source, $V_H$ can be set to a desired level.

In FIG. 25B, two diodes D1 and D2 are connected in series, and a voltage $V_H$ which is smaller than VCC by a voltage difference equal to the falling voltage of the diode D1 and D2 can be extracted in a stable manner. The voltage $V_H$ produced by the circuit of FIG. 25B is smaller than that of FIG. 25A using a single diode. By adjusting the size of each diode and by regulating the level of the current source, desired level of $V_H$ can be produced.

Figure 26B:
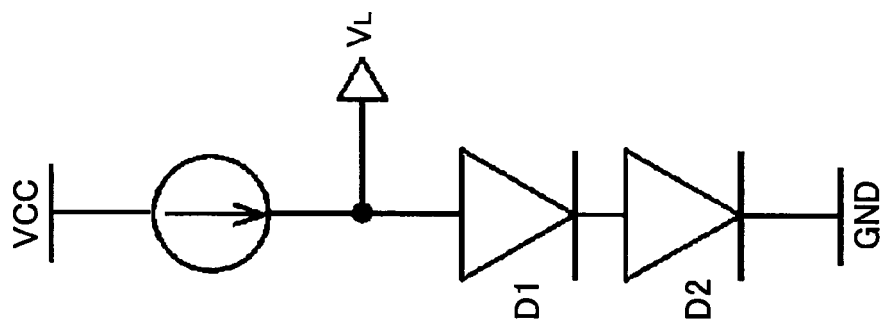
FIG. 26 shows an example of producing a low voltage shown in FIG. 23 and FIG. 24, which is used when producing a small swing differential signal.
Figure 26A:
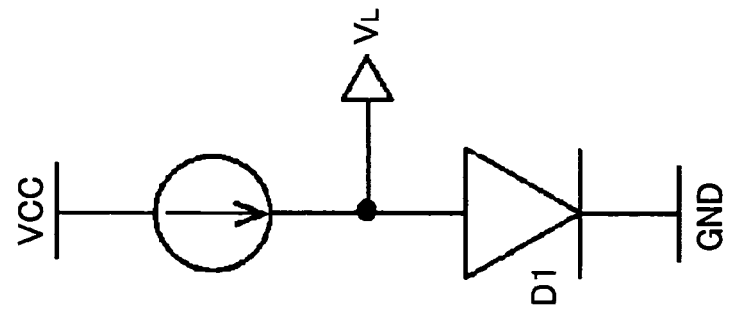

FIG. 26A and FIG. 26B show circuits for producing low voltage $V_L$ applied to the ground terminal of inverters N1 and N2 shown in FIG. 23 and FIG. 24. In FIG. 26A, the cathode of diode D1 is connected to GND, and the anode is connected to the current source. With this arrangement, a low voltage $V_L$ which is higher than GND by a voltage difference equal to the falling voltage of the diode D1 can be extracted in a stable manner. By adjusting the size and the diode D1 and by regulating the level of the current source, $V_L$ can be set to a desired level.

In FIG. 26B, two diodes D1 and D2 are connected in series, and a voltage $V_L$ which is higher than GND by a voltage difference equal to the falling voltage of the diode D1 and D2 can be extracted in a stable manner. Voltage $V_L$ produced by the circuit shown in FIG. 26B is higher than that of FIG. 26A with a single diode. By adjusting the size of each diode and by regulating the level of the current source, desired level of $V_L$ can be produced.

Figure 27:
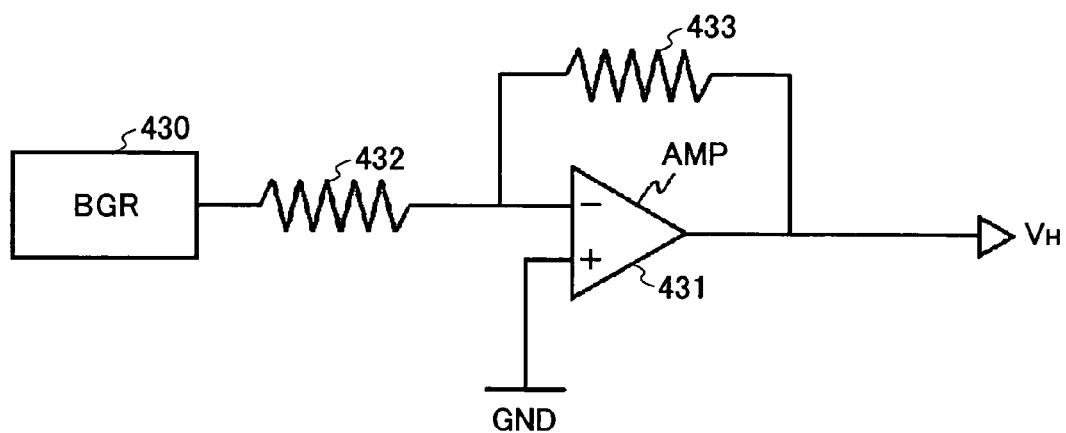
FIG. 27 shows another example of producing a high voltage used to generate a small swing differential signal.

FIG. 27 shows another example of the circuit for producing high voltage $V_H$, in which the output of the band gap reference (BGR) 430 is connected to one input terminal of the operational amplifier 431 via resistor 432. The other input terminal of the operational amplifier 431 is connected to GND. The output of the operational amplifier 431 is fed back to its input terminal via resistor 433. The operational amplifier 431 and the resistors 432 and 433 form an inverting amplifier, from which a desired level of high voltage $V_H$ is obtained in a stable manner.

Figure 28:
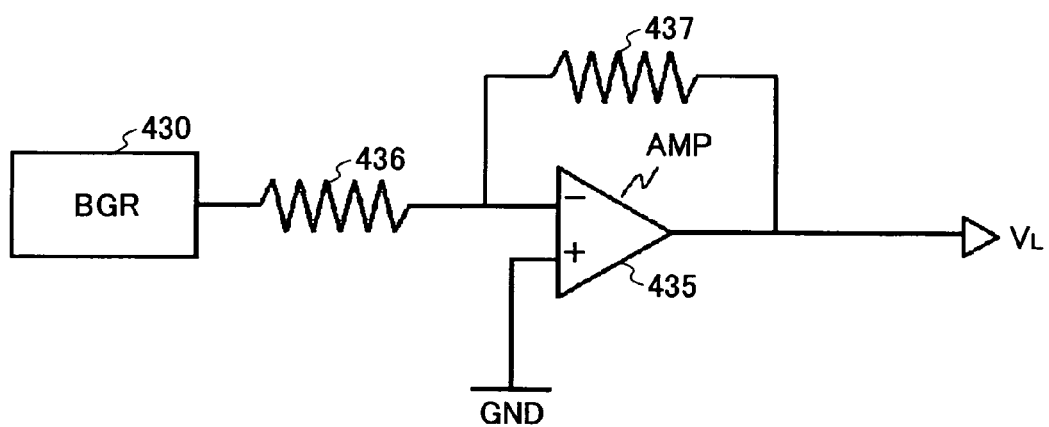
FIG. 28 shows another example of producing a low voltage used to generate a small swing differential signal.

FIG. 28 shows another example of the circuit for producing low voltage $V_L$. The output of the band gap reference (BGR) 430 is supplied to the inverting amplifier comprised of an operational amplifier 453 and resistors 436 and 437, and a desired level of low voltage $V_L$ is obtained from the inverting amplifier.

Figure 29:
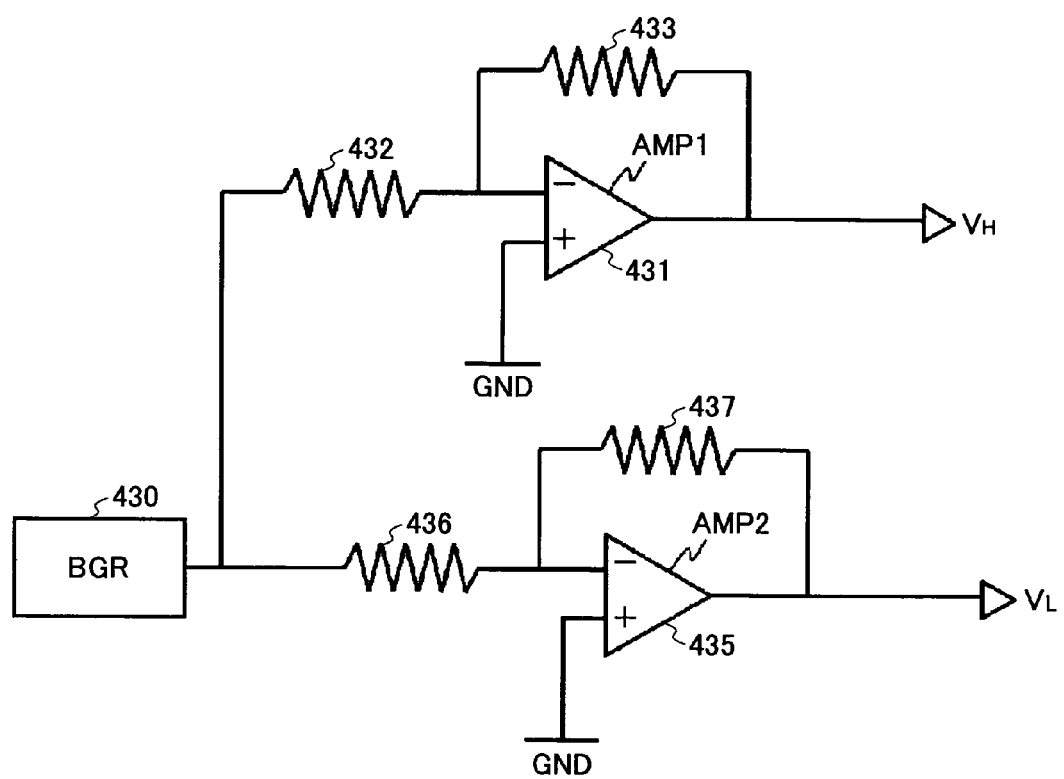
FIG. 29 shows still another example of producing a low voltage and a high voltage used to generate a small swing differential signal.

FIG. 29 shows still another circuit structure, in which the output of the band gap reference (BGR) 430 is connected to the inputs of the first and second inverting amplifiers connected in parallel. The first inverting amplifier comprises an operational amplifier 431 and resistors 432 and 433, from which high voltage $V_H$ is obtained in a stable manner, and the second inverting amplifier comprises an operational amplifier 435 and resistors 436 and 437, from which low voltage $V_L$ is obtained in a stable manner.

Figure 30:
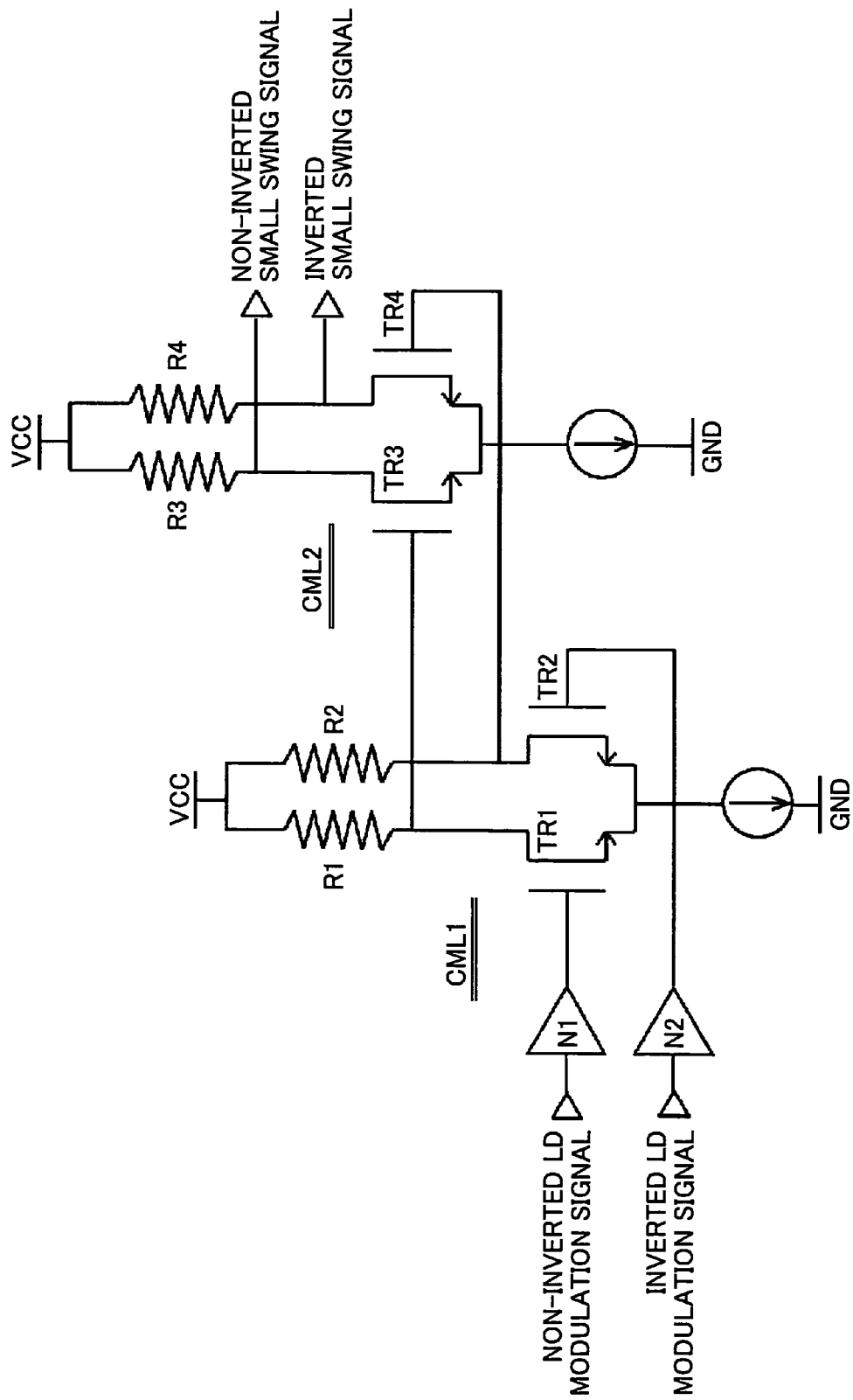
FIG. 30 is a circuit diagram showing still another example of producing a small swing differential signal.

FIG. 30 shows still another example of the small swing output circuit of CML type, which uses two CML circuits. The differential signal consisting of a non-inverted LD modulation signal and an inverted LD modulation signal is input to the first CML, and the output of the first CML is connected to the input of the second CML. This arrangement is capable of reducing the swing of the input signal to the second CML, and can prevent fluctuation of the current source due to switching of the input to the second CML. This arrangement achieves faster operation because of small swing input. The same applies to the structure including three or more CML circuits. By replacing transistors TR1 through TR4 with bipolar transistors, an ECL type small swing differential signal producing circuit can be formed.

Figure 31:
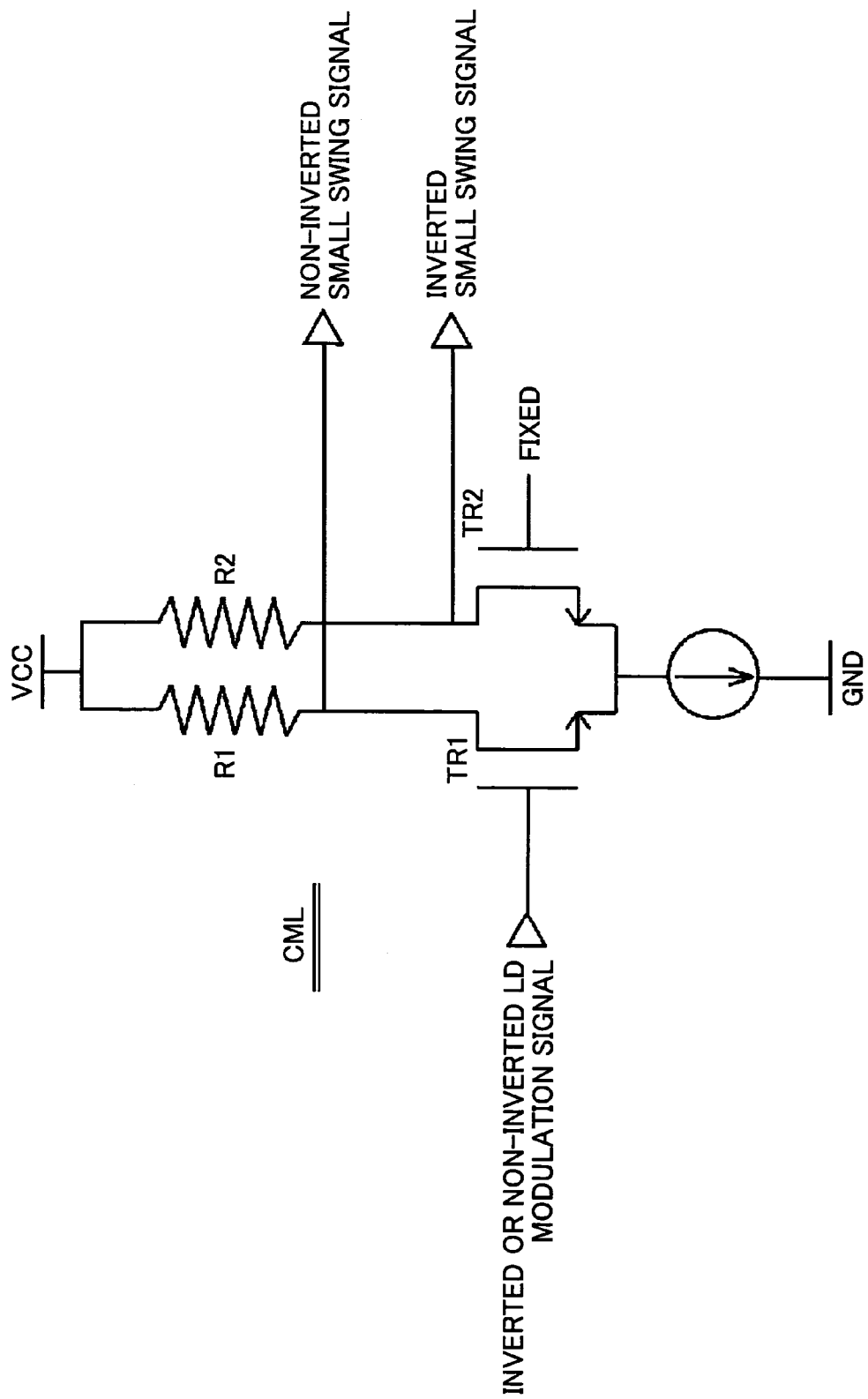
FIG. 31 is a circuit diagram showing still another example of producing a small swing differential signal.

FIG. 31 shows still another example of the small swing output circuit. In this example, the input of one transistor TR2 is connected to a fixed voltage, and a switching signal (an inverted or non-inverted LD modulation signal) is input to the other transistor TR1. The fixed voltage is set to a voltage between high voltage $V_H$ and low voltage $V_L$. This arrangement can also output a pair of small swing differential signals. The same applies to ECL using bipolar transistors.

Figure 32:
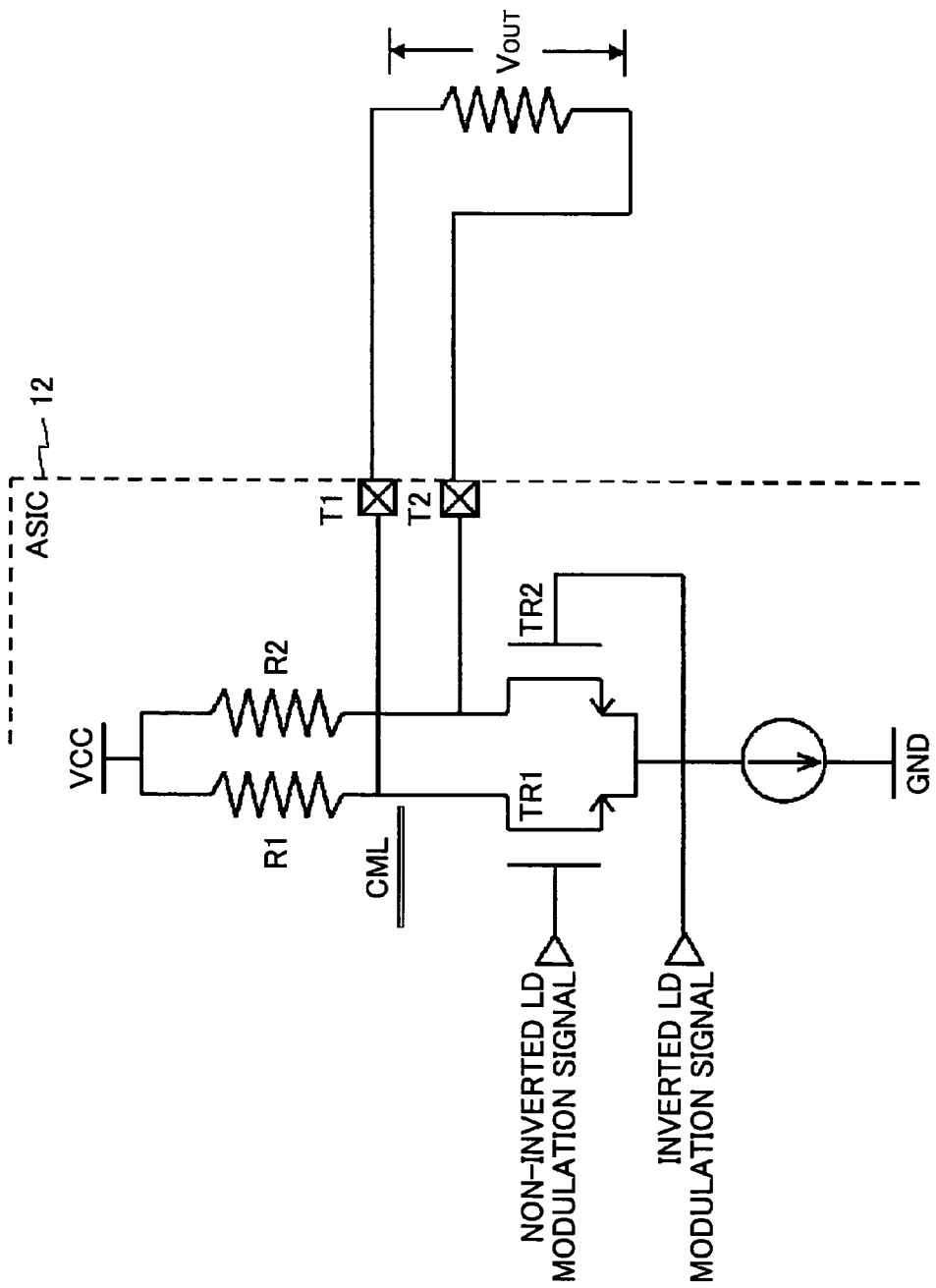
FIG. 32 illustrates an example in which small swing differential outputs are terminated at a resistor.

FIG. 32 shows still another example of the small swing output circuit. In this example, the output of CML, that is, a pair of small swing differential signals (consisting of a non-inverted small swing signal and an inverted small swing signal) is terminated by a resistor arranged outside the ASIC 12. The non-inverted and inverted small swing signals output from CML are connected to output pins T1 and T2 of the ASIC 12. This arrangement allows the receiving side (i.e., at the small swing differential signal input circuit) to take the small swing differential signal component. The same applies to ECL.

Figure 33:
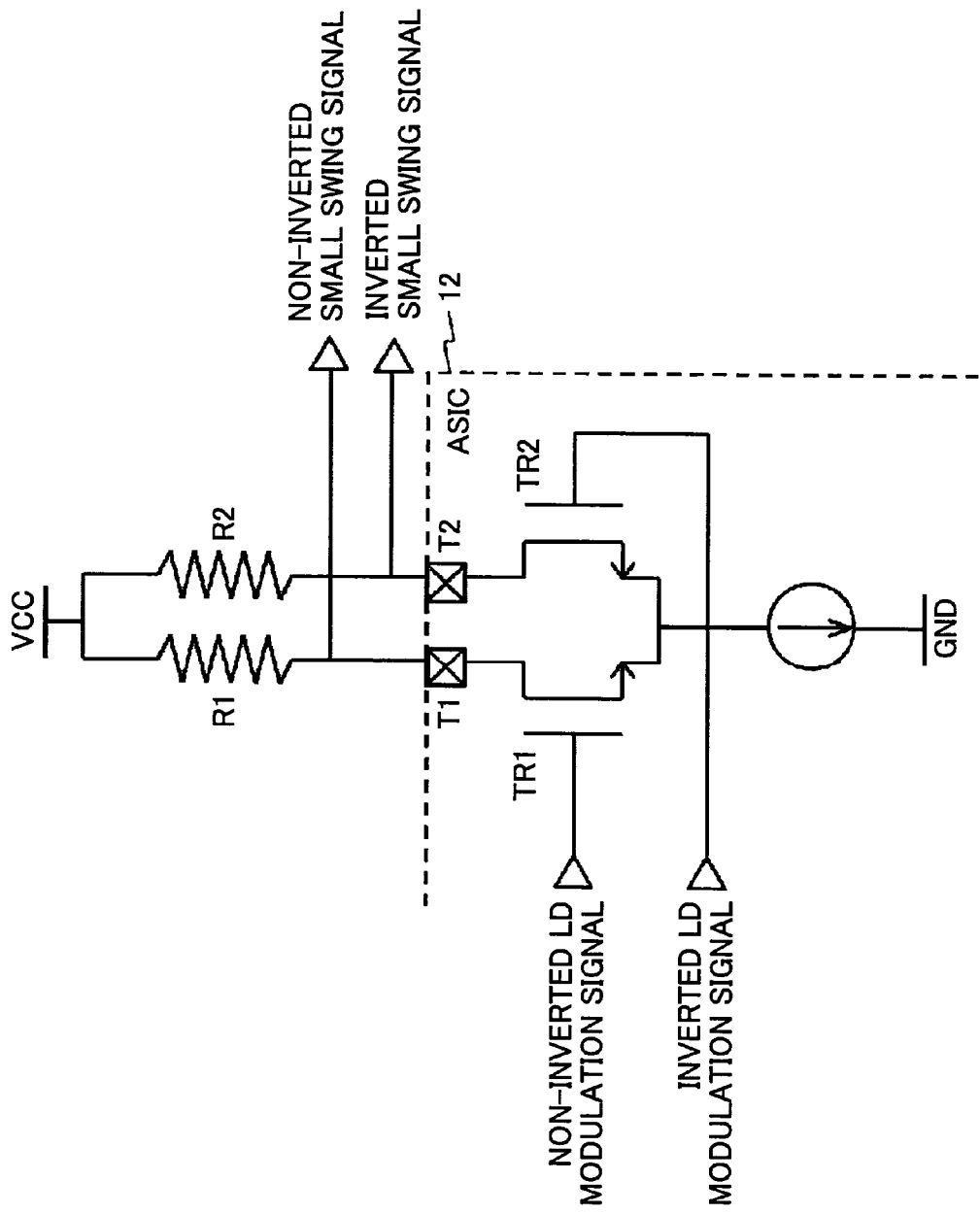
FIG. 33 is a circuit diagram showing still another example of producing a small swing differential signal.

FIG. 33 shows a modification of the small swing output circuit show in FIG. 14. In this modification, the resistors R1 and R2 of the CML, which are arranged outside the ASIC 12, are connected to the output pins T1 and T2, respectively. By arranging resistors R1 and R2 outside the ASIC 12, the resistance values can be set more accurately with less fluctuation. (Resistance accuracy is limited when arranged inside the ASIC 12. Accordingly, the output swing can be set precisely with this arrangement. The same applies to the ECL type small swing output circuit shown in FIG. 15.

Figure 34:
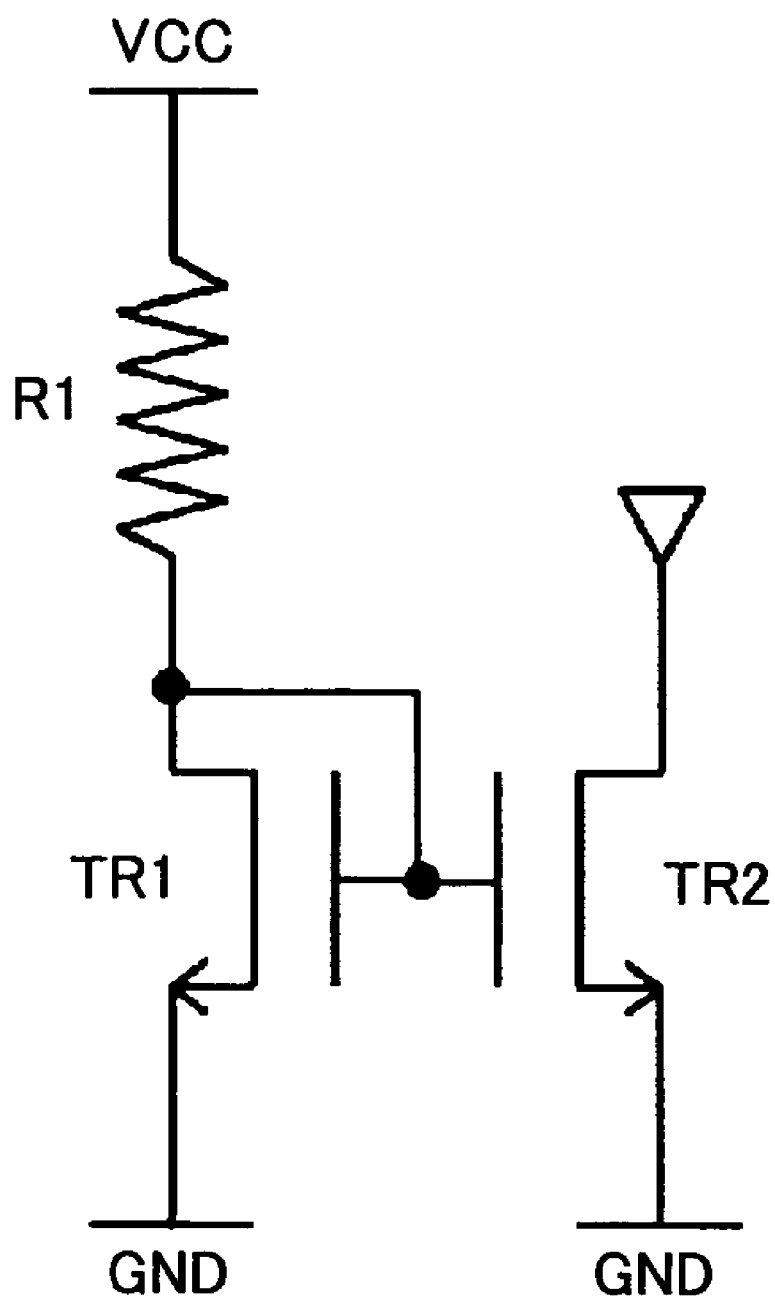
FIG. 34 shows a structural example of the electric current source used in the circuit for producing a small swing differential signal.

FIG. 34 shows an example of the current source used in the CML circuit. The electric current level of the current mirror circuit formed by the diode-connected transistors TR1 and TR2 is defined by the supply voltage VCC and the resistance value of resistor R1. This circuit forms a highly precise constant current source regardless of the load resistance of the CML. Accordingly, even if the load resistance of the CML is arranged in the integrated circuit, fluctuation of the output swing due to variation of the load resistance can be prevented.

Next, explanation is made of the interface between the small swing differential signal output circuit 130 and the small swing differential signal input circuit 160 of the LD driving unit 170, with reference to FIG. 35 through FIG. 40.

Figure 35:
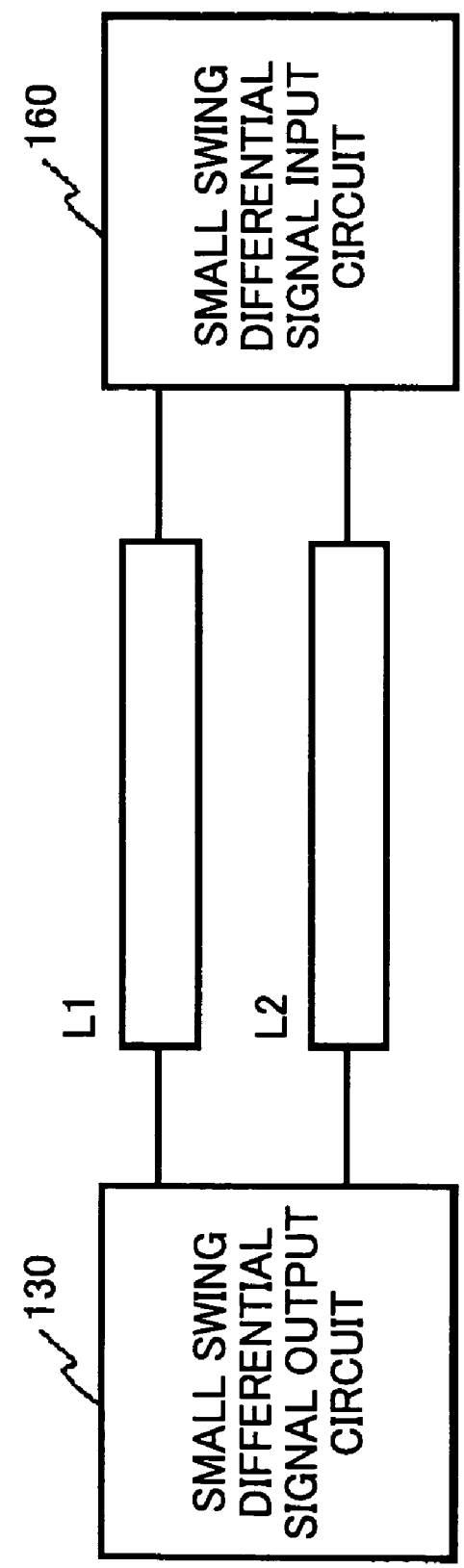
FIG. 35 is a schematic diagram illustrating the interface between the small swing differential signal output circuit and the small swing differential signal input circuit.

FIG. 35 illustrates the small swing differential signal output circuit 130 and the small swing differential signal input circuit 160 connected via a pair of signal transmission lines L1 and L2.

Figure 36:
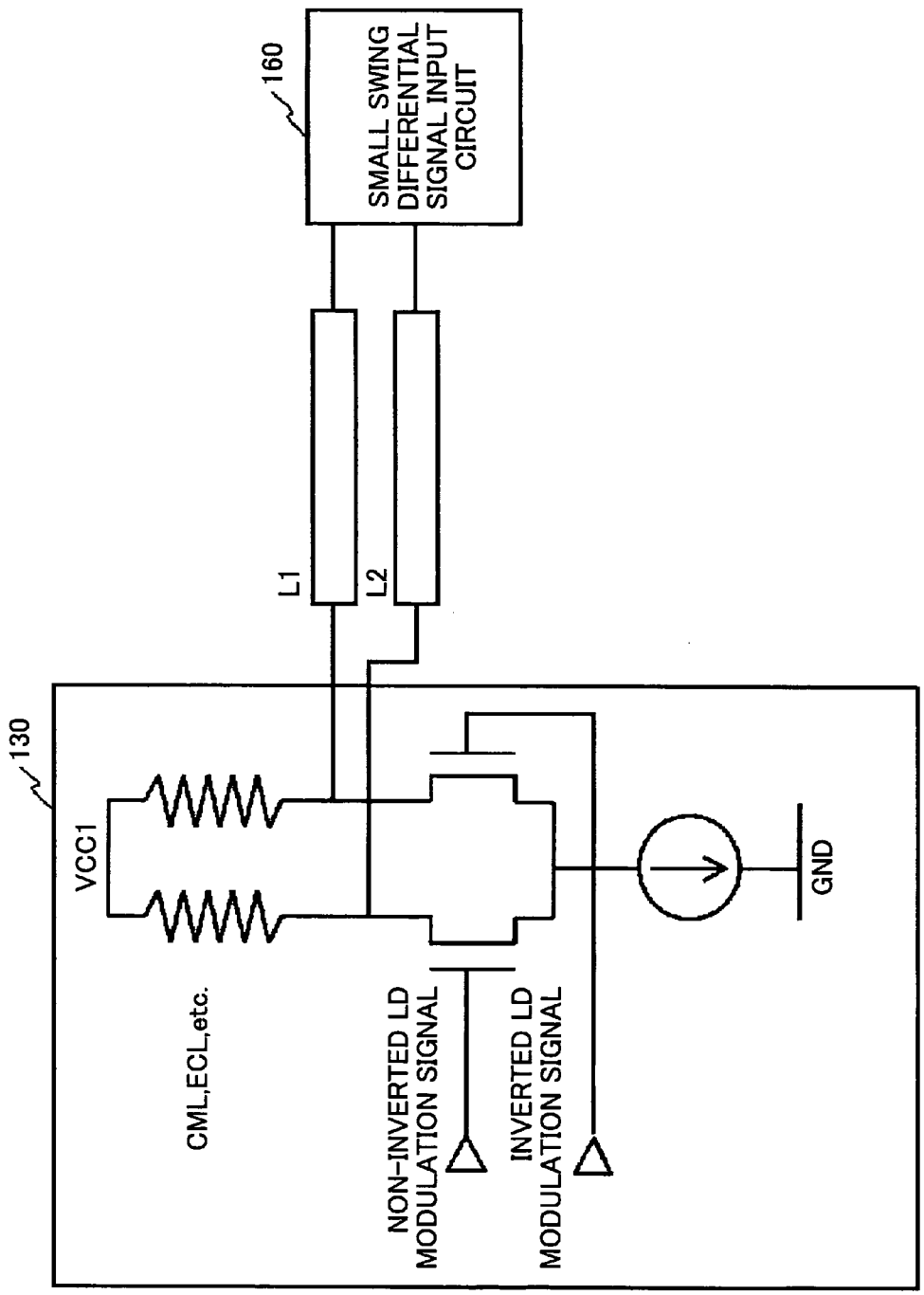
FIG. 36 shows a structural example of the interface between the small swing differential signal output circuit and the small swing differential signal input circuit.

In FIG. 36, the output stage (i.e., the small swing output circuit 132 in this example) of the small swing differential signal output circuit 130 is formed by a CML or ECL circuit in order to achieve high speed signal transmission. Of course, the output stage of the small swing differential signal output circuit 130 may be formed of a LVDS circuit, as will be described in the second embodiment.

Figure 37:
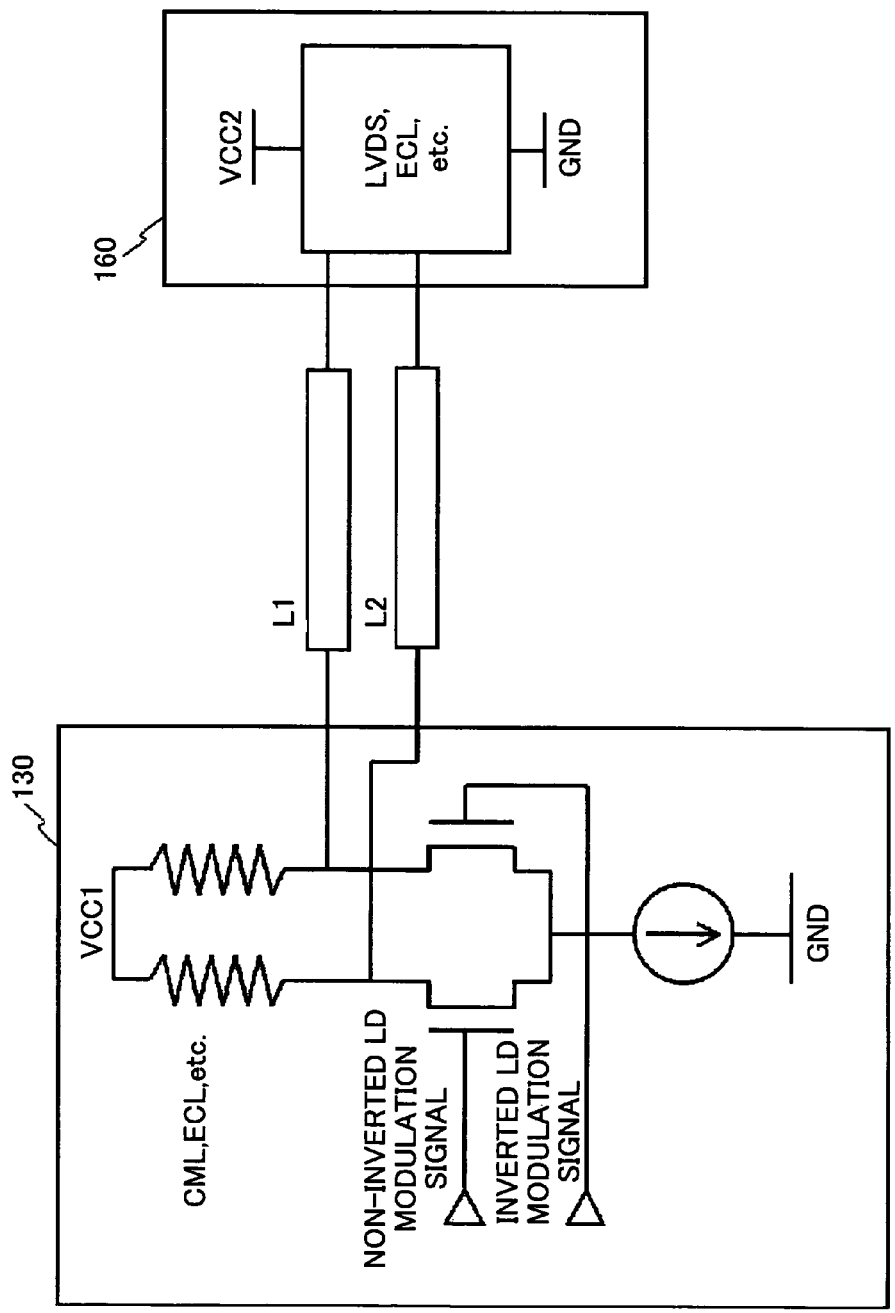
FIG. 37 shows another structural example of the interface between the small swing differential signal output circuit and the small swing differential signal input circuit.

FIG. 37 shows another example of the interface between the small swing differential signal output circuit 130 and the small swing differential signal input circuit 160. The output stage of the small swing differential signal output circuit 130 is formed by a CML or ECL circuit with a supply voltage VCC1, and the small swing differential signal input circuit 160 is formed of a circuit of a different type (for example, an LVDS or ECL type) from that of the output stage of the small swing differential output circuit 130, with a supply voltage of VCC2. VCC1 is set to 1.8 V, and VCC2 is set to 5 V, for example. By separating the supply voltages VCC1 and VCC2, the small swing differential signal output circuit 130 and the modulation circuit 125, which form the high-speed operative LD modulation signal generating unit 120, can be integrated densely on a chip, while a voltage sufficient to drive the semiconductor laser (LC) is supplied to the LD driving unit 170.

Figure 38:
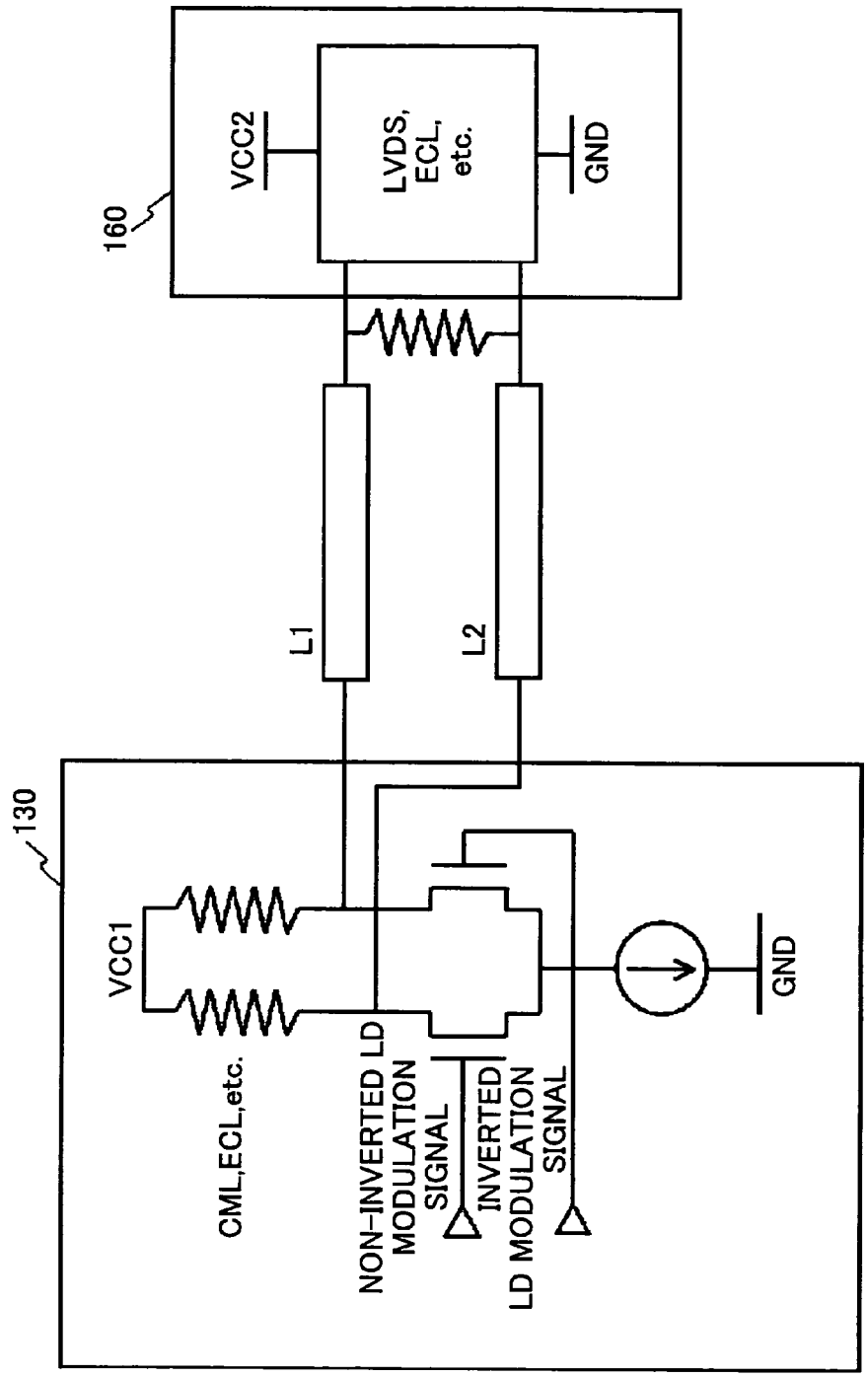
FIG. 38 shows still another structural example of the interface between the small swing differential signal output circuit and the small swing differential signal input circuit.

FIG. 38 shows still another example of the interface between the small swing differential signal output circuit 130 and the small swing differential signal input circuit 160, in which the output ends of the signal transmission lines L1 and L2 are terminated by a resistor, and differential signal output is obtained as current output.

Figure 39:
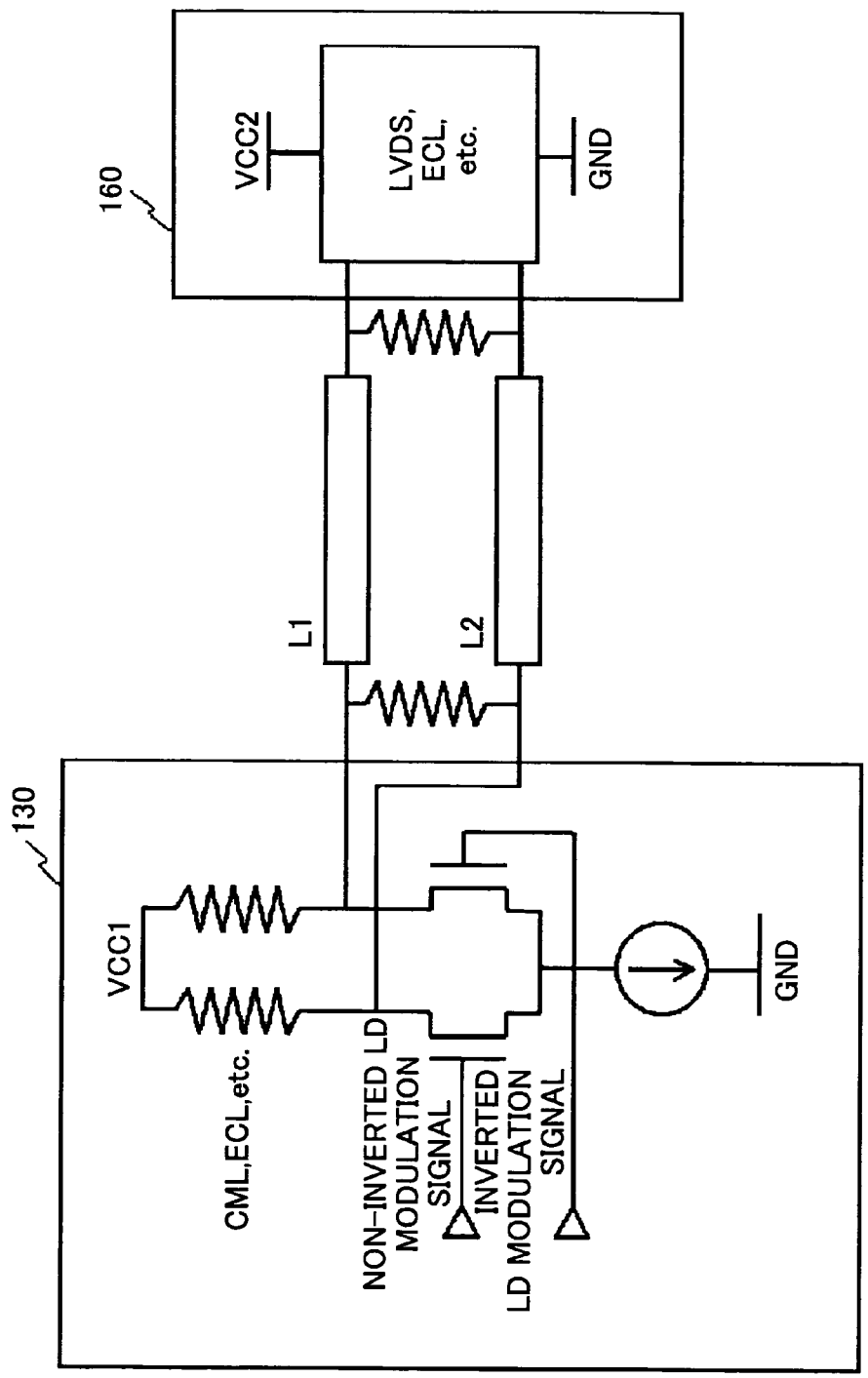
FIG. 39 shows still another structural example of the interface between the small swing differential signal output circuit and the small swing differential signal input circuit.

In FIG. 39, the output ends of the signal transmission lines L1 and L2 are terminated by resistor, and at the same time, another resistor is coupled to the input ends of the signal transmission lines L1 and L2 in parallel. This arrangement is more effective for high-speed operation because electric current obtained through charging and discharging of the parasitic capacitance of the signal transmission lines L1 and L2 can be supplied.

Figure 40:
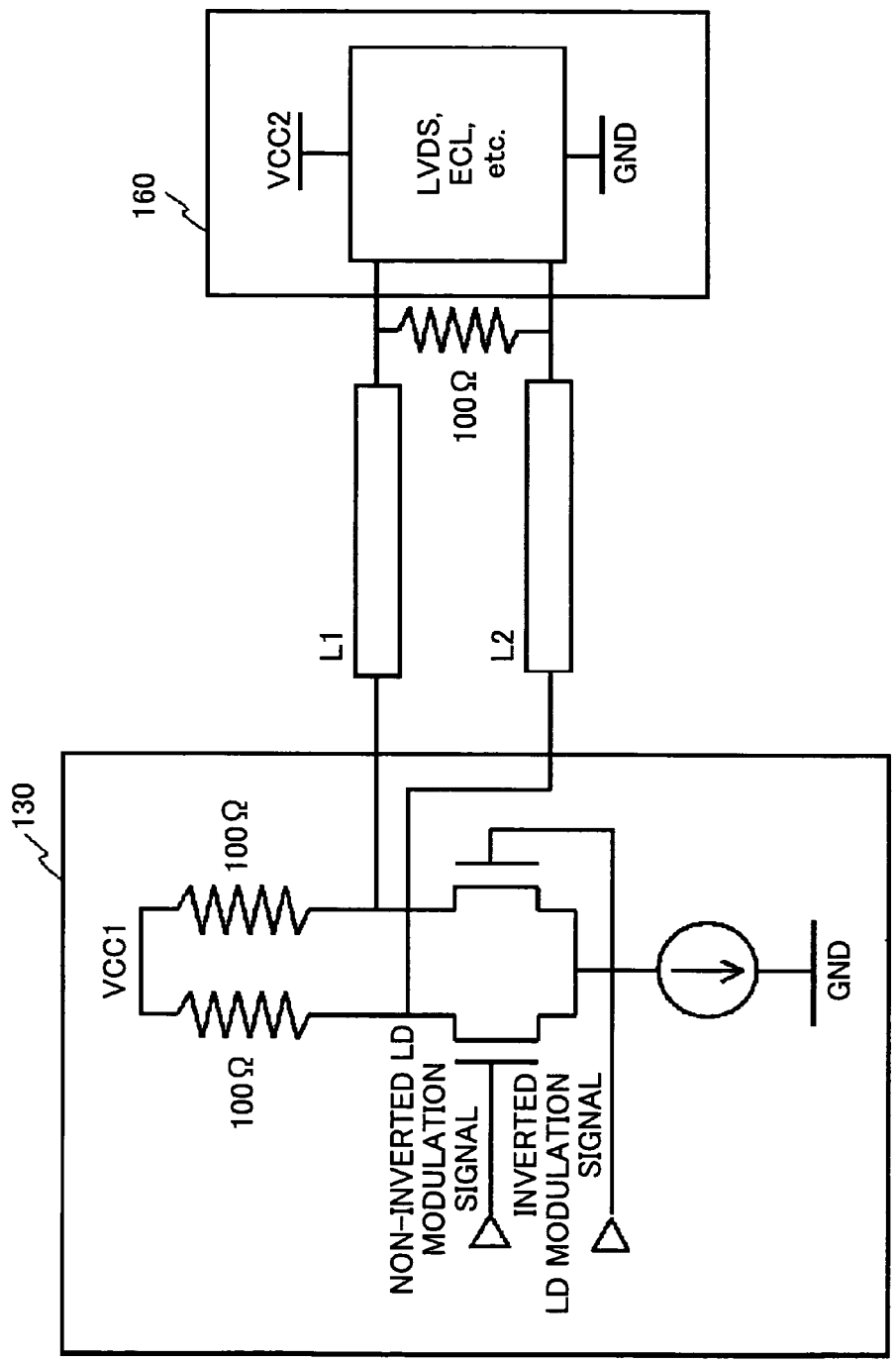
FIG. 40 shows still another structural example of the interface between the small swing differential signal output circuit and the small swing differential signal input circuit.

FIG. 40 shows impedance matching with the signal transmission line in the interface structure shown in FIG. 38. For example, when the impedance of the signal transmission line is 100 Ω, then all the resistance values are set to 100 Ω to achieve highly precise signal transmission with less noise.

FIG. 41 through FIG. 44 show structural examples of LD driving unit 170 including the small swing differential signal input circuit 160. The structure of the small swing differential signal input circuit 160 is basically the same as that of the small swing differential signal output circuit 130, except for the supply voltage level. A pair of small swing differential signals (non-inverted and inverted small swing signals) are input to the gates of transistors TR1 and TR2, and a pair of differential signals are output between resistor R1 and transistor TR1 and between resistor R2 and transistor TR2. If transistors TR1 and TR2 are CMOS transistors, low voltage differential signaling (LVDS) is carried out. If transistor TR1 and TR2 are bipolar transistor, emitter coupled logic (ECL) is performed.

Figure 41:
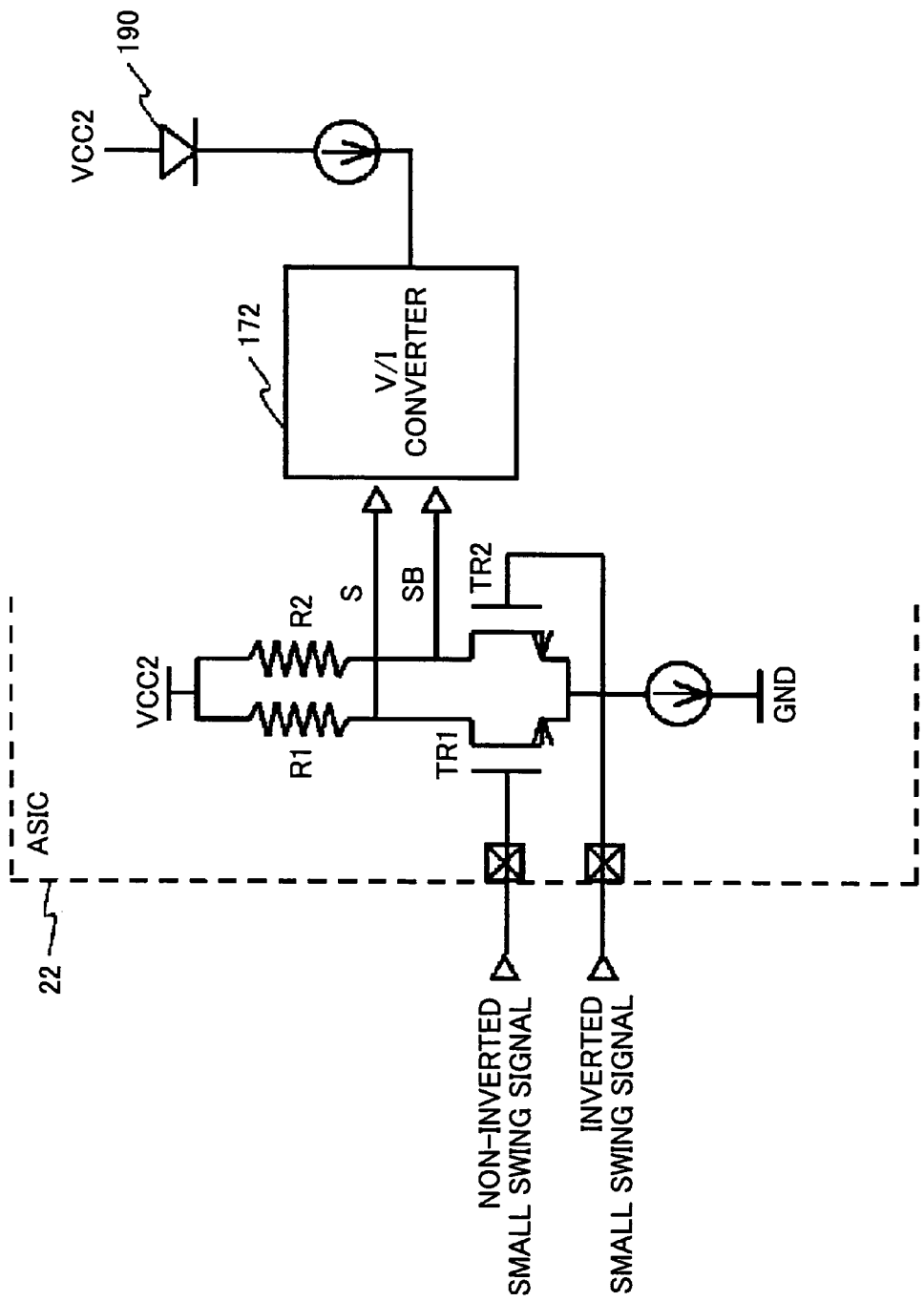
FIG. 41 shows a structural example of the LD driving unit, which includes a small swing differential signal input circuit and a driving circuit.
Figure 42:
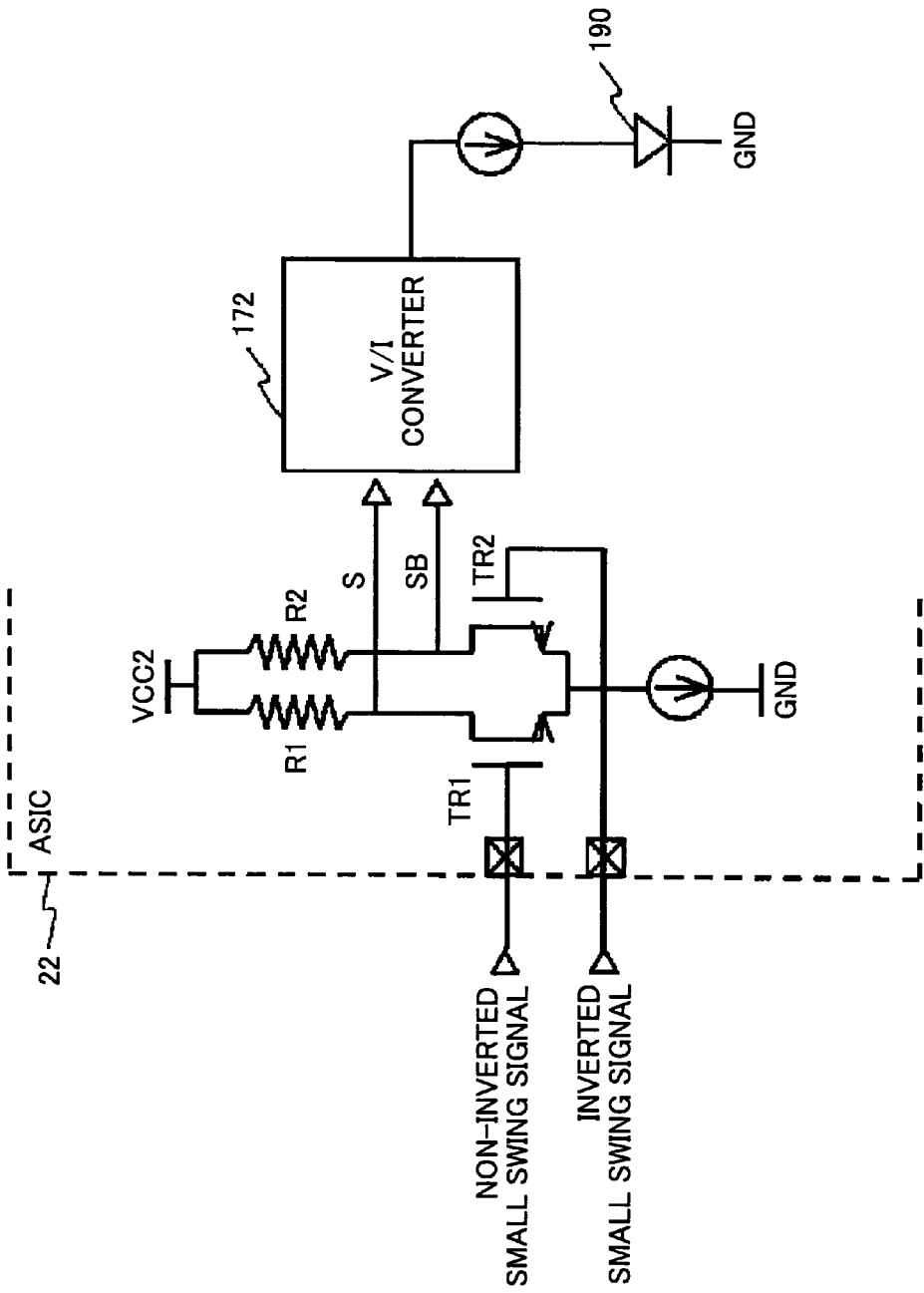
FIG. 42 shows another structural example of the LD driving unit including a small swing differential signal input circuit and a driving circuit.

In FIG. 41 and FIG. 42, a voltage to current converter 172 is used to drive the semiconductor laser (LD) 190. One or both of differential signal pair S and SB is/are synthesized, and the voltage is converted into current to drive the LD 190 with electric current. LD 190 of FIG. 41 is a common anode LD, and LD 190 of FIG. 42 is a common cathode LD.

Figure 43:
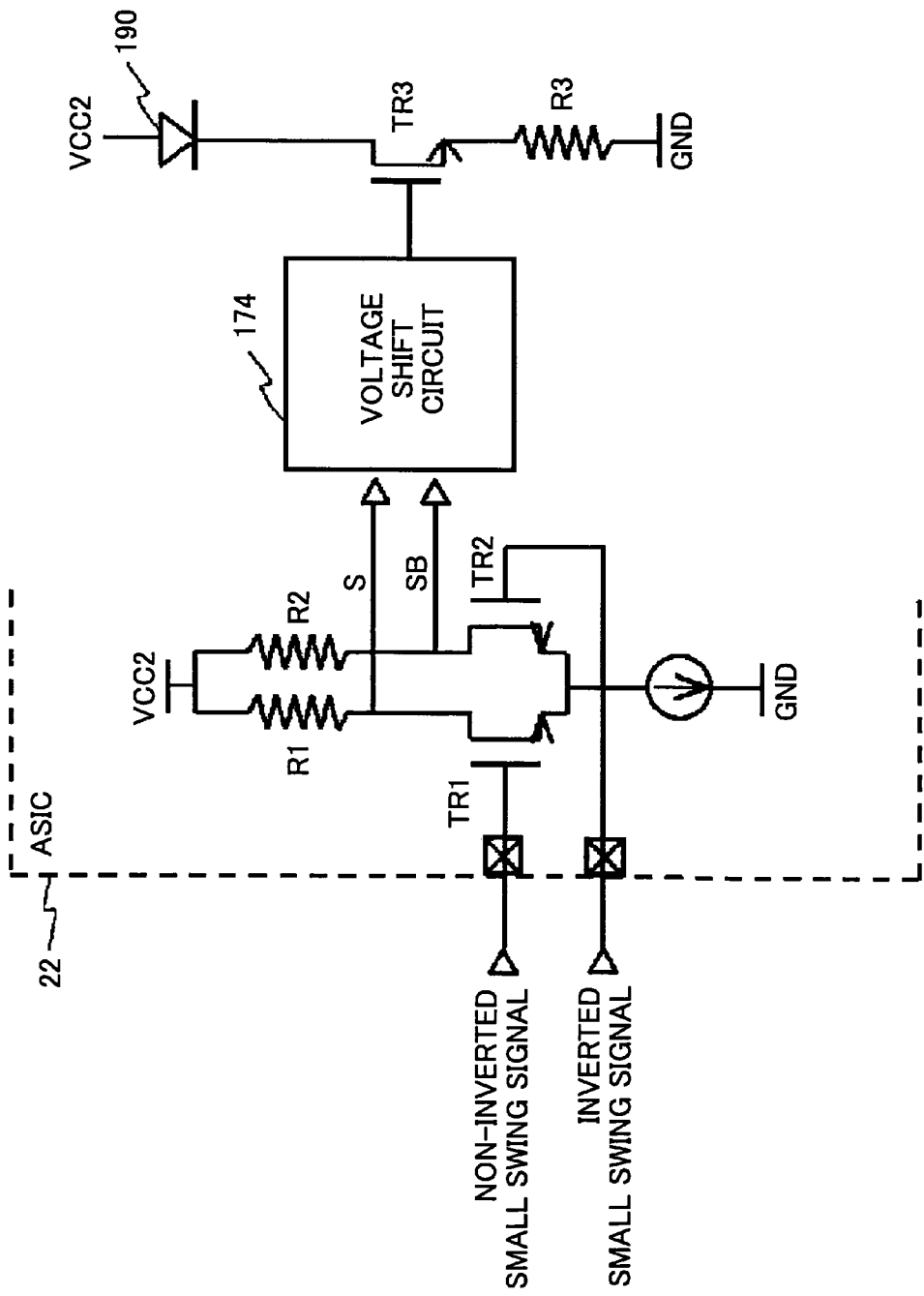
FIG. 43 shows still another structural example of the LD driving unit including a small swing differential signal input circuit and a driving circuit.
Figure 44:
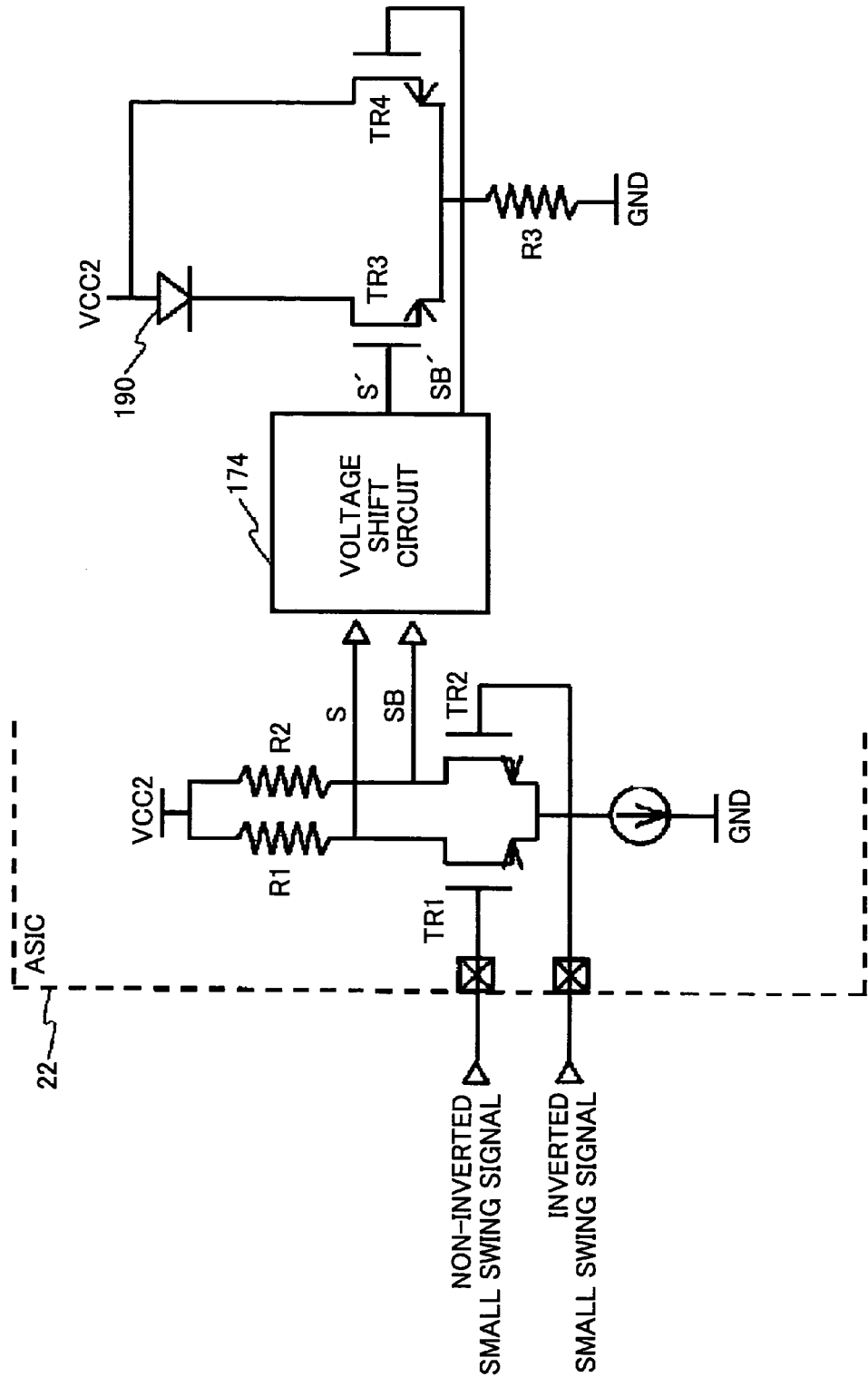
FIG. 44 shows still another structural example of the LD driving unit including a small swing differential signal input circuit and a driving circuit.

In FIG. 43 and FIG. 44, a voltage shift circuit 174 is used to drive the semiconductor laser (LD) with a voltage. In FIG. 43, one of the differential signal outputs S and SB is level-shifted by the voltage shift circuit 174. The output of the voltage shift circuit 174 is connected to the gate of the transistor TR3 in order to drive the LD 190. In FIG. 44, both of the differential outputs S and SB are level-shifted by the voltage shift circuit 174. The outputs S' and SB' of the voltage shift circuit 174 are connected to the gates of transistor TR3 and TR4, respectively, to drive the LD 190. The arrangement shown in FIG. 44 can increase the switching rate.

In FIG. 41 through FIG. 44 supply voltage of the small swing differential signal input circuit is set equal to the LD driving voltage VCC2. However, separate supply voltages may be used as illustrated in FIG. 10.

Next, the second embodiment of the present invention is explained with reference to FIG. 45 through 56. In the second embodiment, the swing of signal is reduced using a voltage-output circuit.

Figure 45:
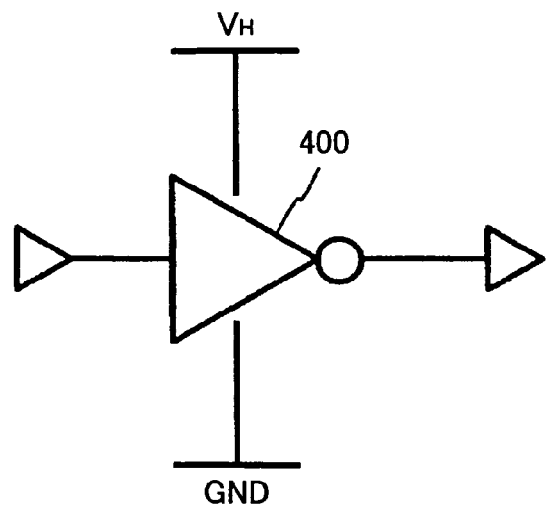
FIG. 45 shows an example of producing a small swing output according to the second embodiment of the invention.
Figure 46:
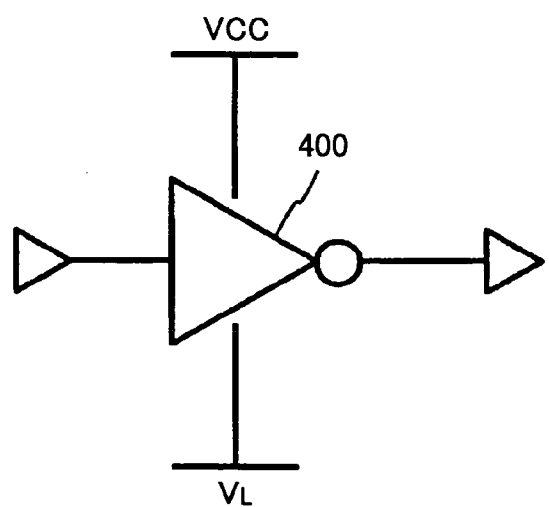
FIG. 46 shows another example of producing a small swing output according to the second embodiment of the invention.
Figure 47:
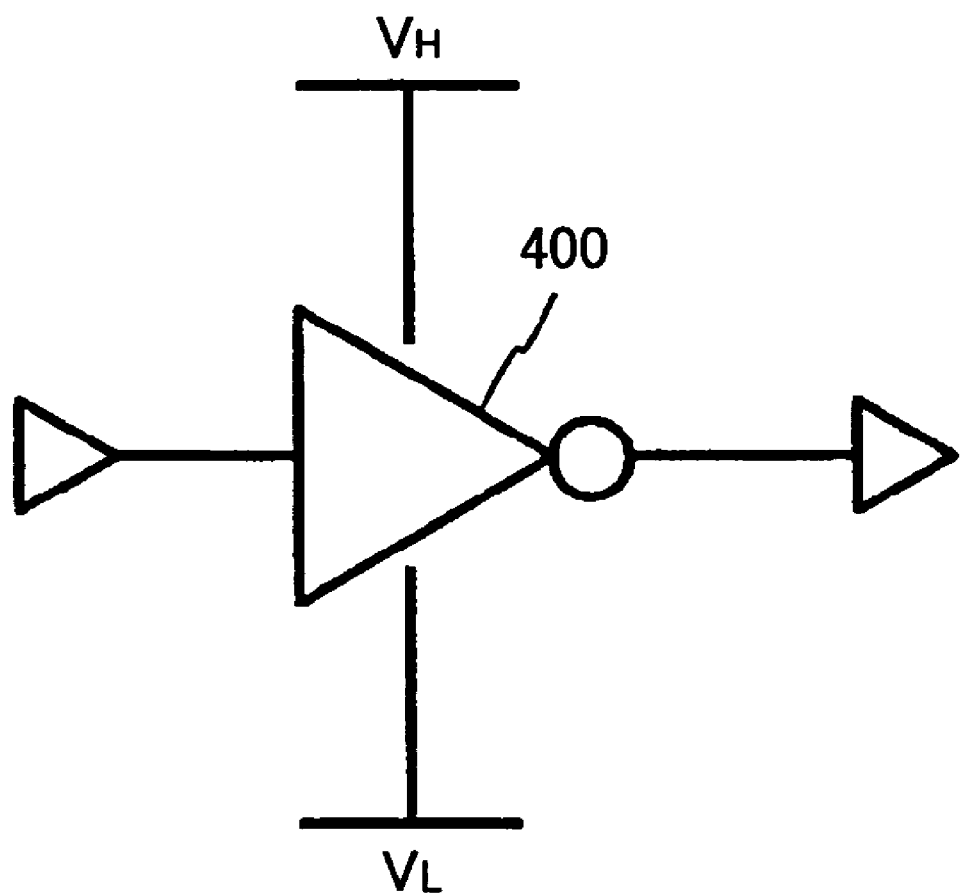
FIG. 47 shows still another example of producing a small swing output according to the second embodiment of the invention.

FIGS. 45, 46 and 47 illustrate how a small swing output is produced at the output-stage of the small swing differential signal output circuit 130. Although in FIGS. 45-47 a single inverter is used, multiple inverters or a buffer may be used to produce a small swing output.

In the example shown in FIG. 45, voltage $V_H$ that is lower than the supply voltage VCC is applied to the supply terminal of the inverter 400 of the output stage, and the ground terminal of the inverter 400 is connected to the ground potential GND. The high voltage of the output of the inverter 400 becomes $V_H$, which is lower than the supply voltage VCC. Consequently, the swing height is the potential difference between $V_H$ and GND, which is smaller than the potential difference between VCC and GND. This arrangement can reduce the output energy and increase the switching rate.

In FIG. 46, supply voltage VCC is applied to the supply terminal of the inverter 400 of the output stage, and voltage $V_L$ that is higher than the ground potential GND is applied to the ground terminal. The low voltage of the output of the inverter 400 becomes $V_L$, which is higher than the ground potential GND. Consequently, the swing height is the potential difference between VCC and $V_L$, which is smaller than the potential difference between VCC and GND. This arrangement can reduce the output energy and increase the switching rate.

IN FIG. 47, voltage $V_H$, which is lower than the supply voltage VCC, is applied to the supply terminal of the inverter 400 of the output stage, and voltage $V_L$, which is higher than the ground potential GND, is applied to the ground terminal of the inverter 400. The high voltage of the output of the inverter 400 becomes $V_H$ that is lower than VCC, and the low voltage of the output of the inverter 400 becomes $V_L$ that is higher than GND. Consequently, the swing height is reduced to the potential difference between $V_H$ and $V_L$. This arrangement can reduce the output energy, and increase the switching rate.

To realize the arrangement shown in FIG. 45 through 47, the LD modulation signal generating unit 120 includes means for producing the high voltage $V_H$ and the low voltage $V_L$ applied to the supply terminal and the ground terminal of the inverter 400. Such means for producing $V_H$ and $V_L$ may be realized using the circuit shown in FIG. 25 through FIG. 29 illustrated in the first embodiment.

In FIG. 25A and 25B, Voltage $V_H$ that is lower than VCC by the voltage drop of the diode D1 (or serially connected diodes D1 and D2) is taken from the cathode side of the diode(s) in a stable manner, as illustrated in the first embodiment. The level of $V_H$ can be set to a desired level by adjusting the size of the diode and the current level of the current source (constant current supply).

In FIG. 26, voltage $V_L$ that is higher than GND by the voltage drop of the diode D1 (or serially connected diodes D1 and D2) is taken from the anode side of the diode(s) in a stable manner, as illustrated in the first embodiment. The level of $V_L$ can be set to a desired level by adjusting the size of the diode and the current level of the current source (constant current supply).

In FIG. 27 through FIG. 28, the output of a band gap reference (BGR) 430, which is a high-precision power supply source, is connected to the input of the inverting amplifier comprising an operational amplifier and two resistors, in order to obtain $V_H$ and $V_L$.

FIG. 48 through FIG. 51 show other structural examples of the small swing differential signal output circuit 130 according to the second embodiment.

In these examples, a modulation signal is supplied from the modulation circuit 125 (see FIG. 8) to the small swing differential signal output circuit 130. A non-inverted signal is produced through two inverters 504 and 505, and the swing of the non-inverted signal is reduced by the voltage output circuit formed by resistors 512 and 513 serially connected between VCC and GND. A non-inverted small swing differential signal S1 is output between the resistors 512 and 513. An inverted signal, which is another signal of the differential signal pair, is produced through three inverters 501, 502, and 503, and the swing of the inverted signal is reduced by the voltage output circuit formed by resistors 510 and 511 serially connected between VCC and GND. An inverted small swing differential signal S2 is output between the resistors 510 and 511.

Figure 48:
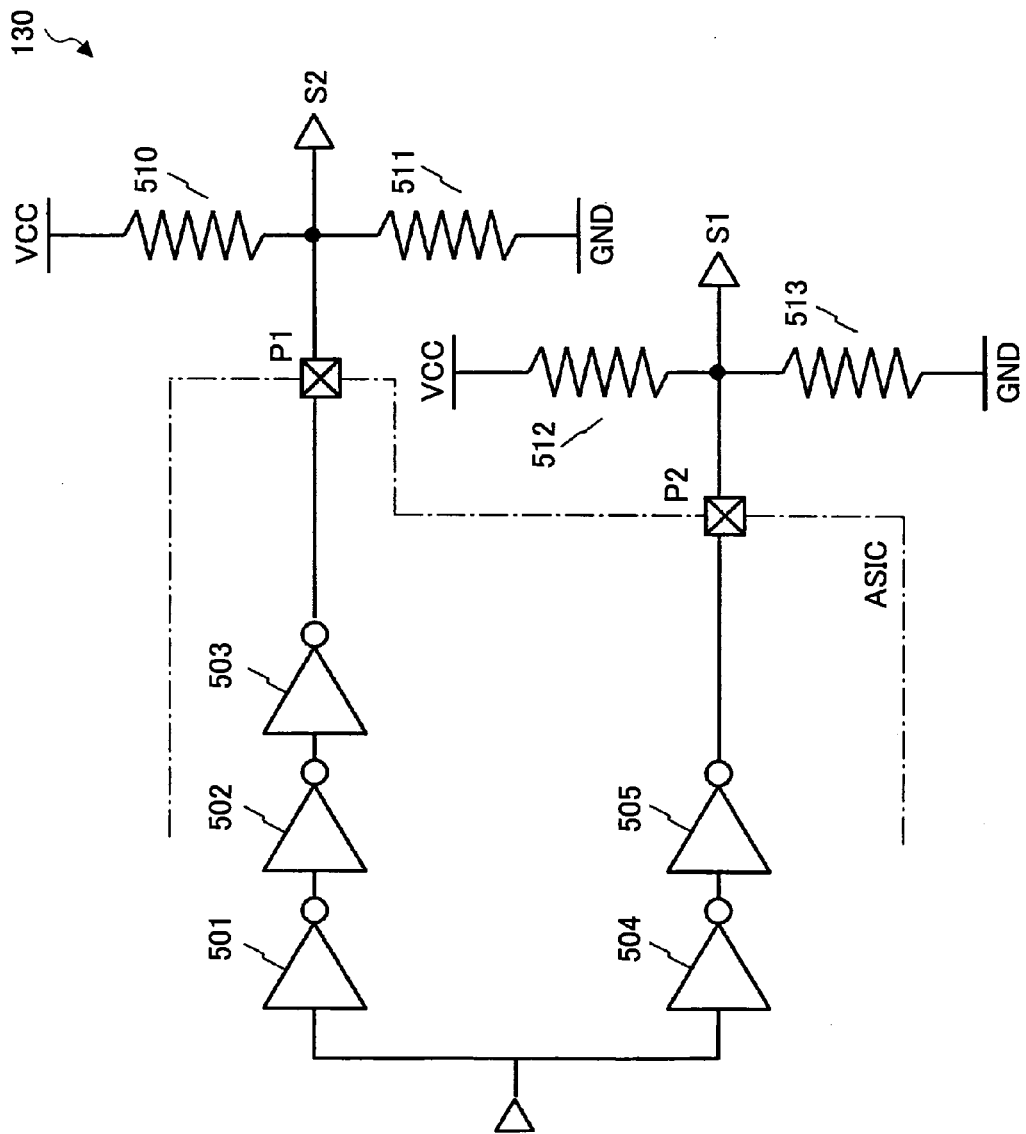
FIG. 48 is a circuit diagram showing an example of the small swing differential signal output circuit according to the second embodiment of the invention.

As shown in FIG. 48, the set of inverters can be formed in an integrated circuit. The output of the three inverters 501 through 503 is supplied via the output pin P1 of the integrated circuit to the voltage output circuit comprising resistors 510 and 511. Similarly, the output of the two inverters 504 and 505 is supplied via the output pin P2 of the integrated circuit to the voltage output circuit comprising resistors 512 and 513. By arranging the resistors 510 through 513 outside the integrated circuit, the resistance values can be set accurately with less fluctuation.

By adjusting the size of the transistors (not shown) of the last inverters 503 and 505, the ON resistance of the transistors can be set to appropriate values. Consequently, small swing differential signals S1 and S2 having desired levels of high voltage $V_H$ and low voltage $V_L$ can be obtained.

Figure 49:
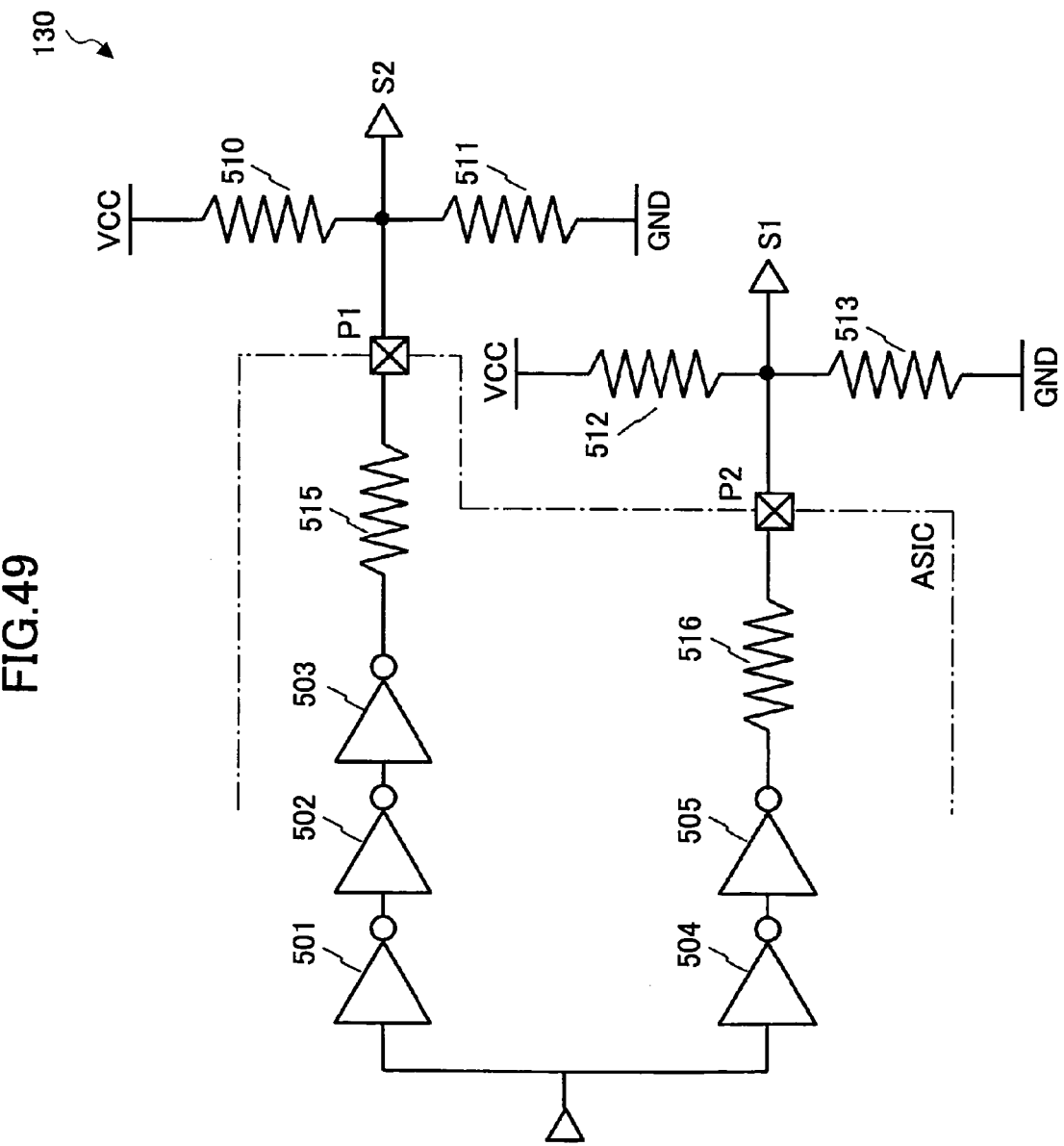
FIG. 49 is a circuit diagram showing another example of the small swing differential signal output circuit according to the second embodiment of the invention.

In FIG. 49, a resistor 515 is inserted between the output-stage inverter 503 and the output pin P1 in order to reduce the swing of the output signal. Similarly, a resistor 516 is inserted between the output-stage inverter 505 and the output pin P2. By inserting resistors 515 and 516, the swing of the small swing differential signals S1 and S2 can be set to desired level.

Figure 50:
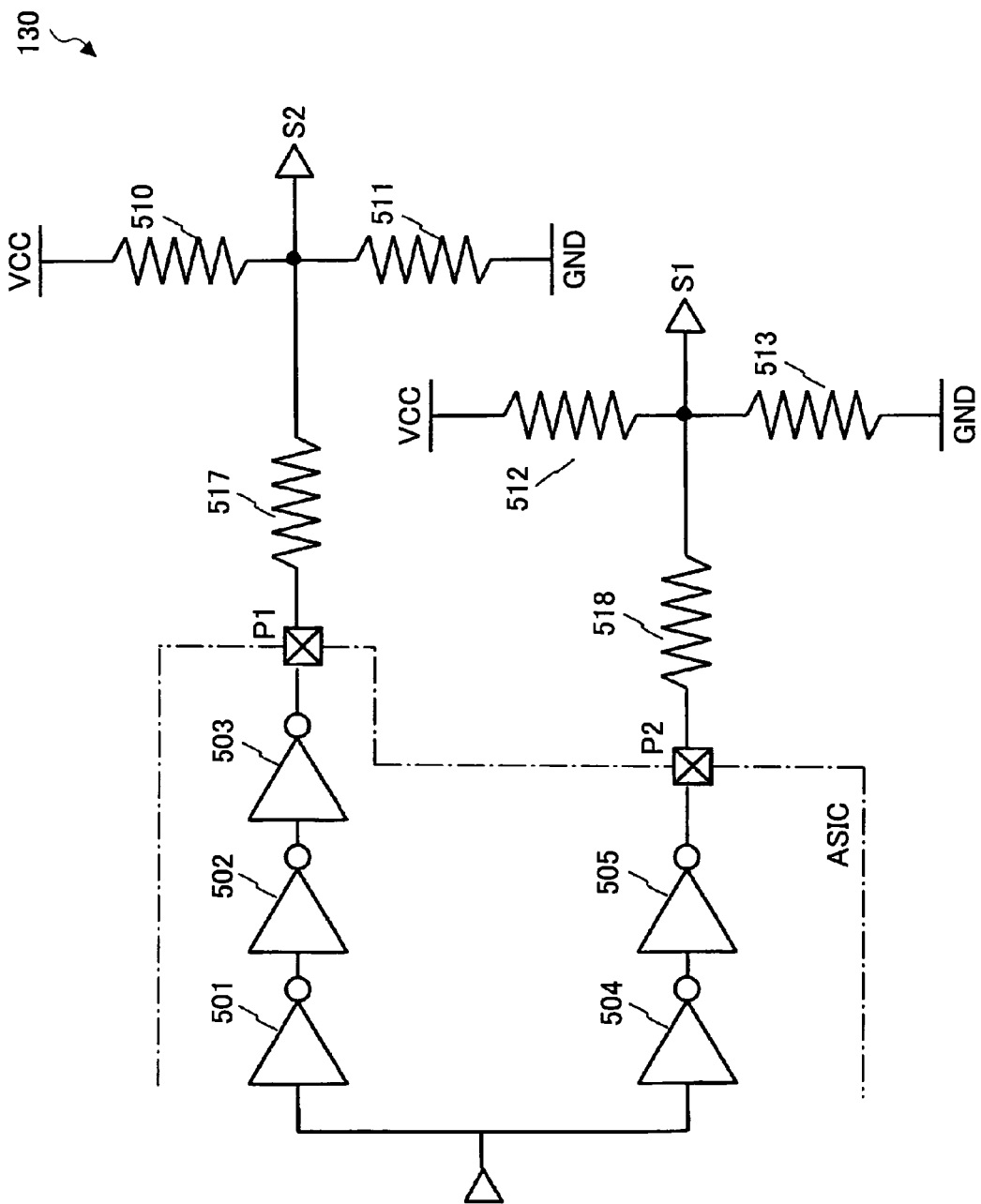
FIG. 50 is a circuit diagram showing still another example of the small swing differential signal output circuit according to the second embodiment of the invention.

In FIG. 50, swing reducing resistors 517 and 518 connected in series with the output pint P1 and P2, respectively, are arranged outside the integrated circuit. With this arrangement, the swing height of the small swing differential signals S1 and S2 can be reduced precisely to a desired level by adjusting the resistance values of the externally arranged resistors 517 and 518.

Figure 51:
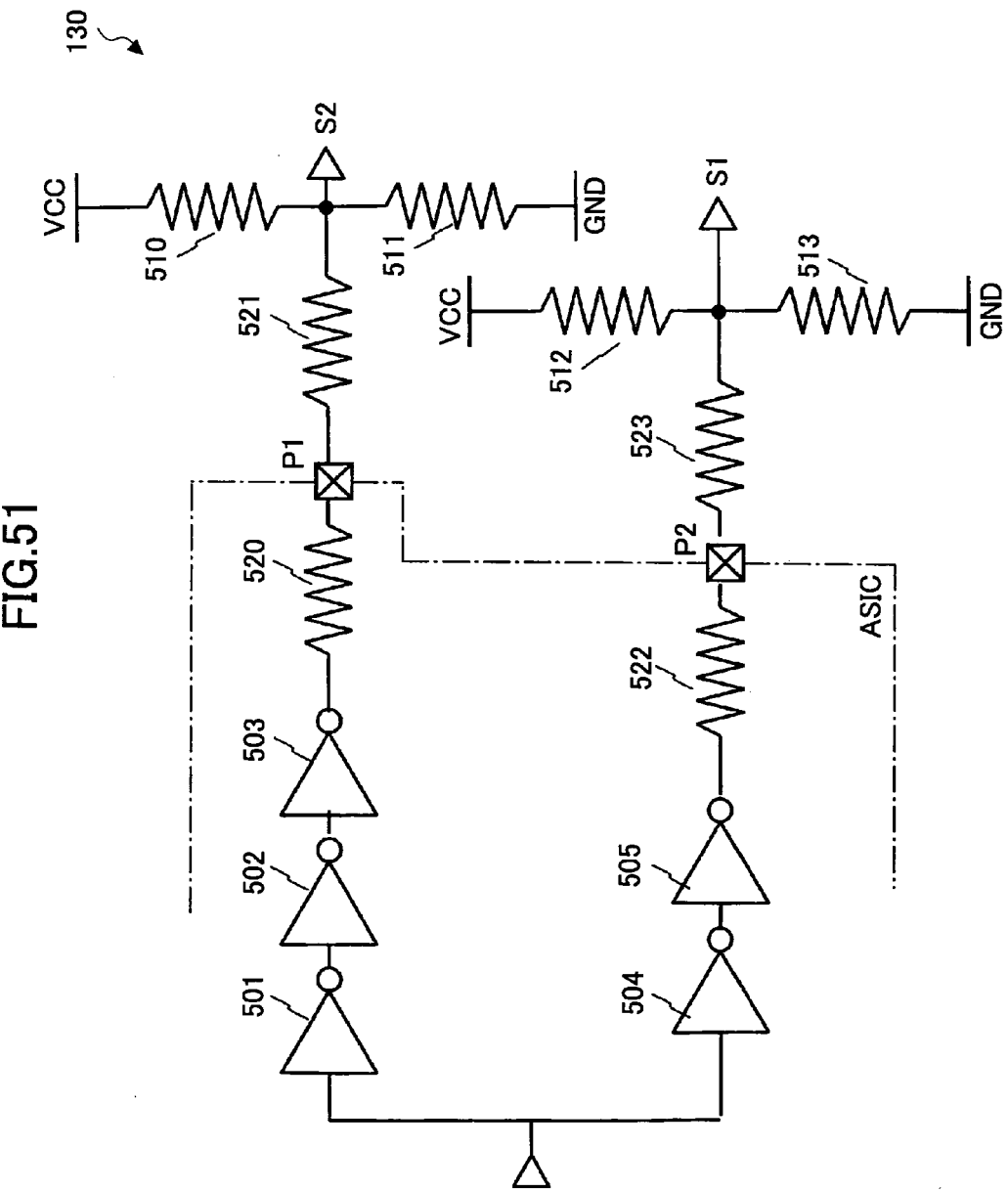
FIG. 51 is a circuit diagram showing still another example of the small swing differential signal output circuit.

In FIG. 51, swing reducing resistors 520 and 522 are connected in series with the output pins P1 and P2, respectively, inside the integrated circuit, and swing reducing resistors 521 and 523 are connected in series with the output pins P1 and P2, respectively, outside the integrated circuit, to produce small swing differential signals S1 and S2. By adjusting the resistance values of the built-in resistors 520 and 522 and the external resistors 521 and 523, the swing of the differential signals can be set to a precise swing height.

The last-stage inverters 503 and 505 may be replaced by buffers in the structure shown in FIG. 48 through FIG. 51.

FIG. 52 through FIG. 56 illustrate examples of the interface between the small swing differential signal output circuit 130 of the LD modulation signal generating unit 120 and the small swing differential signal input circuit 160 of the LD driving unit 170. In these examples, the small swing differential signal output circuit 130 is configured to provide an output of the inverters 550 and 551 and an output of the inverter 552. Resistors 554 and 555 are inserted to reduce the swing of the output of the inverters and produce small swing differential signals S1 and S2. The small swing differential signals S1 and S2 are transmitted through a pair of signal transmission lines 530 and 531.

Figure 52:
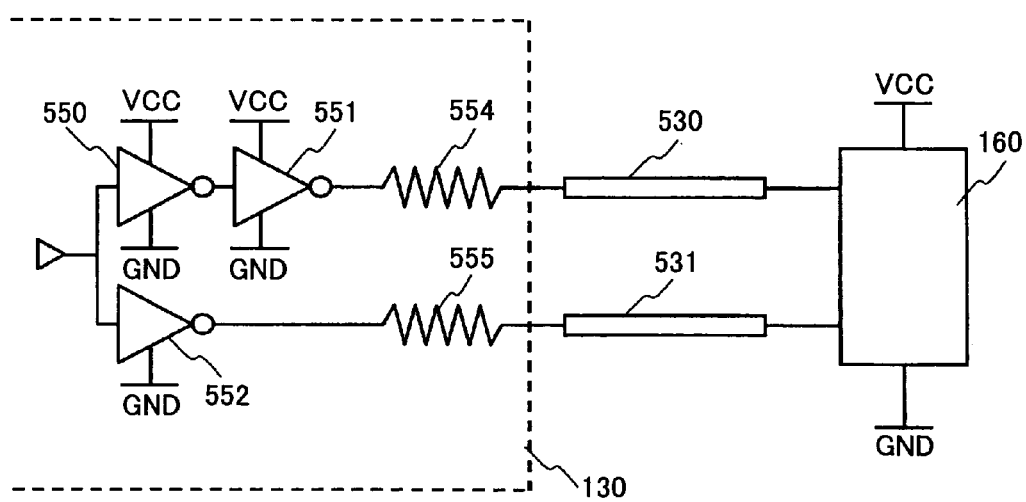
FIG. 52 shows an example of the interface between the small swing differential signal output circuit and the small swing differential signal input circuit according to the second embodiment of the invention.

In the example shown in FIG. 52, a common supply voltage VCC is used in the LD modulation signal generating unit 120 having the small swing differential signal output circuit 130, and in the LD driving unit 170 having the small swing differential input circuit 160. The small swing differential signal input circuit 160 is formed by, for example, a low voltage differential signaling circuit or an emitter coupled logic (ECL) circuit shown in FIG. 9B.

Figure 53:
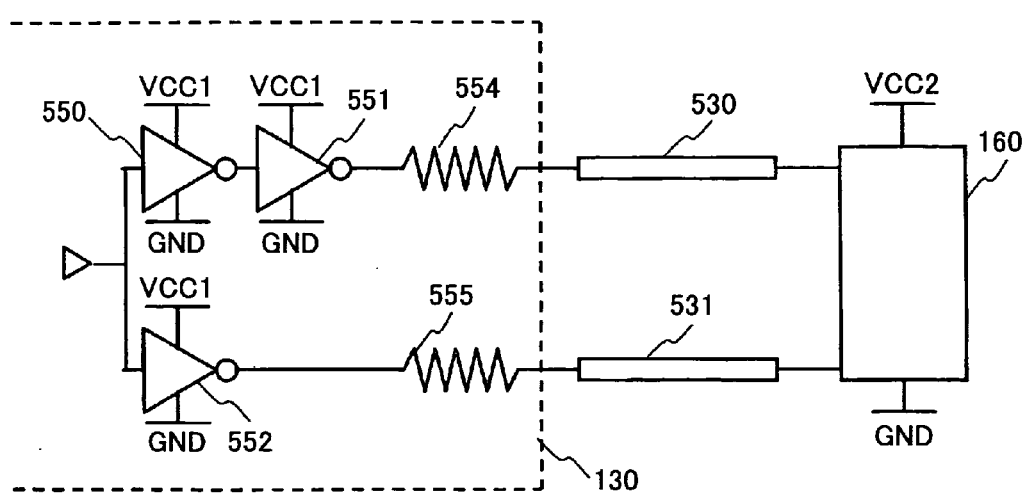
FIG. 53 shows another example of the interface between the small swing differential signal output circuit and the small signal differential signal input circuit.

In the example s shown in FIG. 53, a voltage VCC1 is used in the in the LD modulation signal generating unit 120 having the small swing differential signal output circuit 130, and a separate voltage VCC2 is used in the LD driving unit 170 having the small swing differential input circuit 160. VCC1 is set to 1.8 V, and VCC2 is set to 5 V. By using separate supply voltages, the small swing differential signal output circuit 130 can be formed as a high-speed and high-density integrated circuit, while a sufficient voltage to drive the semiconductor laser (LD) is supplied to the LD driving unit 170. The small swing differential signal input circuit 160 is formed by, for example, a low voltage differential signaling circuit or an emitter coupled logic (ECL) circuit shown in FIG. 9B.

Figure 54:
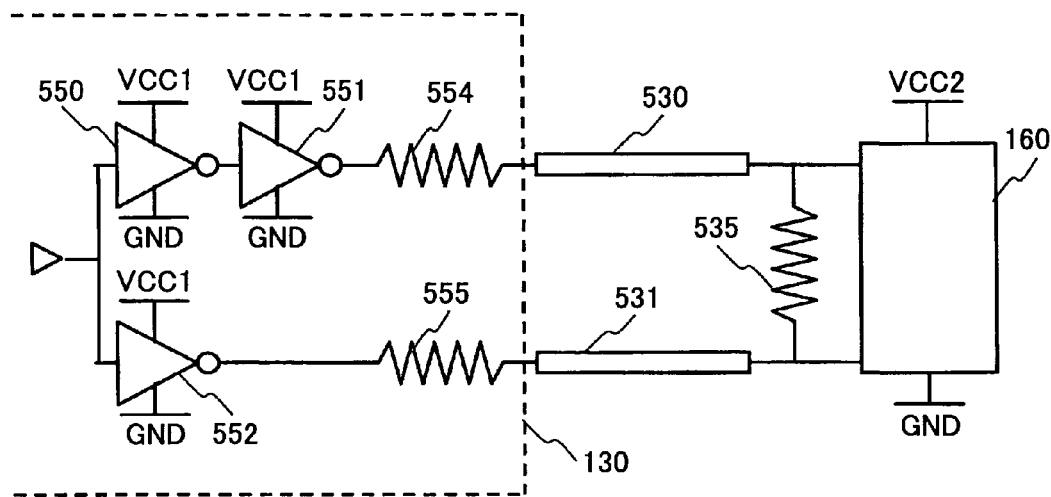
FIG. 54 shows still another example of the interface between the small swing differential signal output circuit and the small swing differential signal input circuit.

In the example shown in FIG. 54, the output ends of the signal transmission lines 530 and 531 are terminated by a resistor 535, and the differential signal output is obtained as current output. By terminating the signal transmission lines 530 and 531, undesirable reflection is prevented, and the waveform can be maintained.

Figure 55:
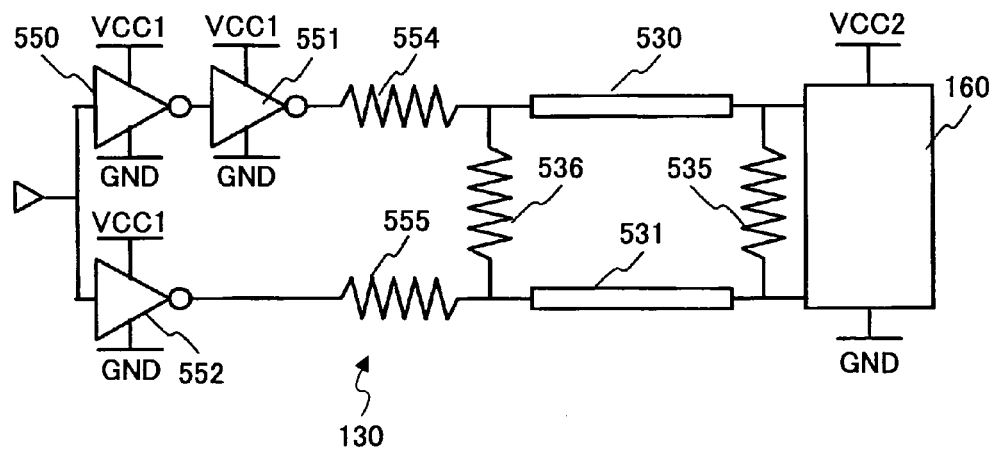
FIG. 55 shows still another example of the interface between the small swing differential signal output circuit and the small swing differential signal input circuit.

In the example shown in FIG. 55, the output ends of the signal transmission lines 530 and 531 are terminated by resistor 535, and at the same time, another resistor 536 is coupled to the input ends of the signal transmission lines 530 and 531 in parallel. This arrangement is more effective for high-speed operation because electric current obtained through charging and discharging of the parasitic capacitance of the signal transmission lines 530 and 531 can be supplied.

Figure 56:
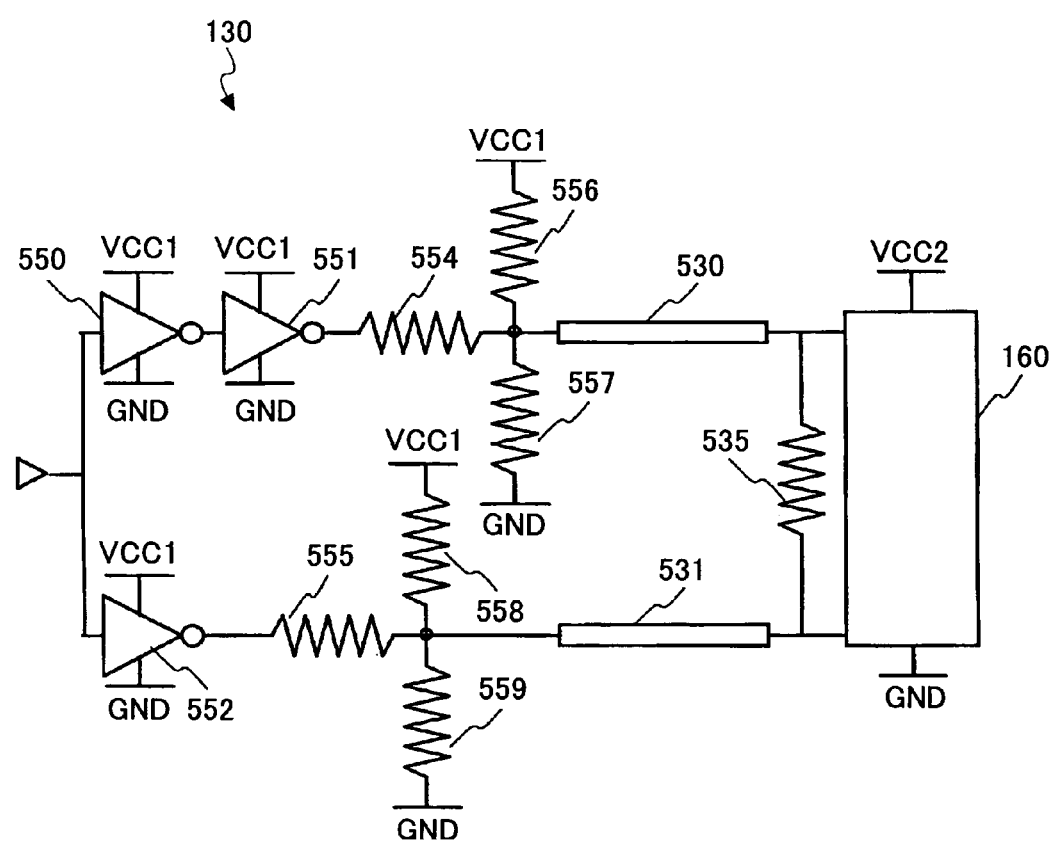
FIG. 56 shows still another example of the interface between the small swing differential signal output circuit and the small swing differential signal input circuit.

In the example shown in FIG. 56, a voltage divider formed by resistors 556 and 557 is inserted between resistor 554 and the signal transmission line 530 to produce a small swing differential output S1. Similarly, a voltage divider formed by resistor 558 and 559 is inserted between resistor 555 and the signal transmission line 531 to produce another small swing differential output S2.

Figure 57:
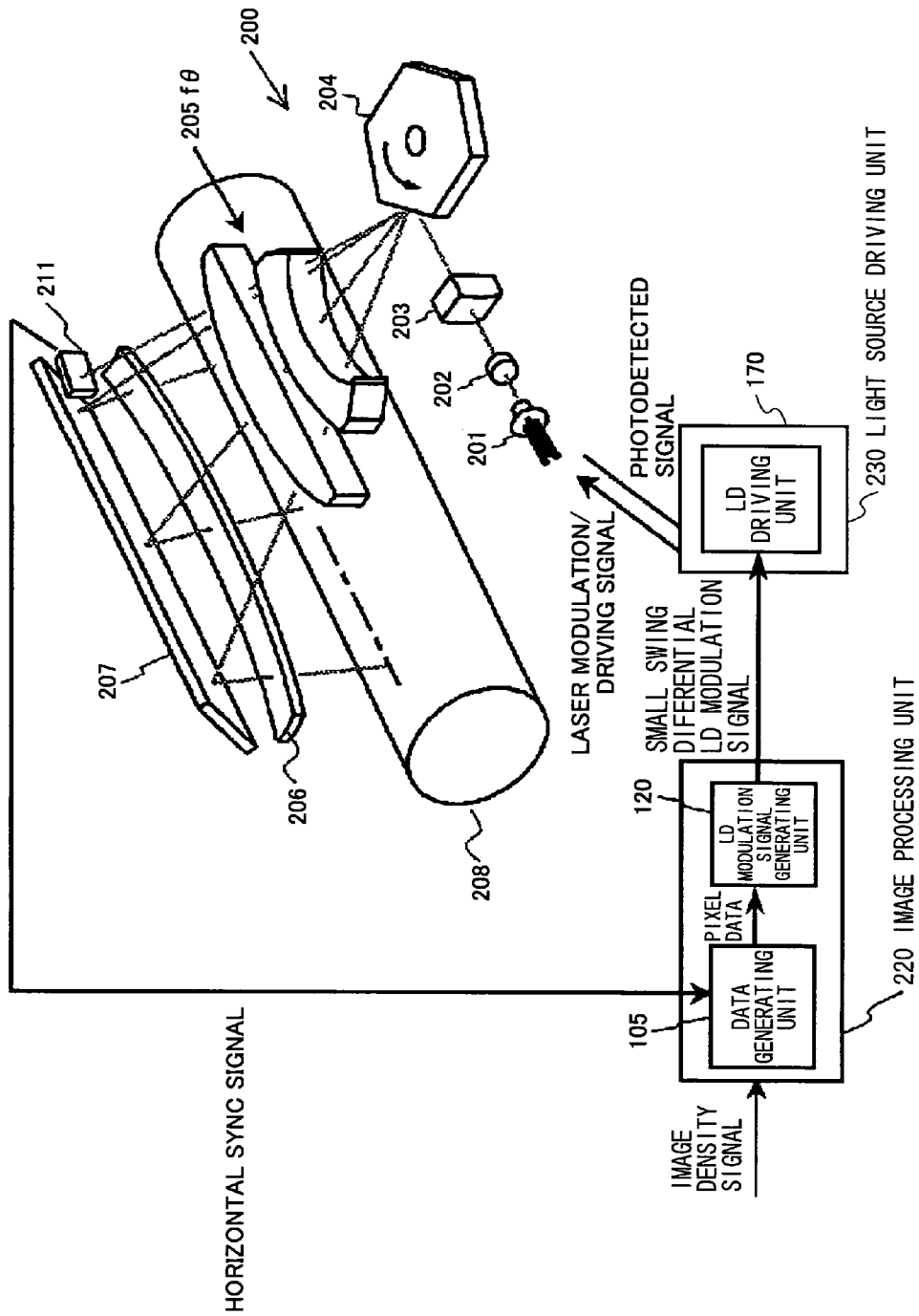
FIG. 57 illustrates an example of a single beam scanning system used in an image reproducing apparatus to which the laser modulating and driving device of the invention is applied.

FIG. 57 illustrates an optical writing part of the image reproducing apparatus in which the laser modulating and driving device 100 described above is applied. The image reproducing apparatus includes an optical laser scanning system 200, an image processing unit 220 formed as a PCB or ASIC, and a light source driving unit 230 formed as another PCB or ASIC. In the example shown in FIG. 57, the optical scanning system 200 is of a single beam scanning type. The image processing unit 220 includes a data generating unit 105 and an LD modulation signal generating unit 120. The data generating unit 105 includes the pixel data generating unit 110, the high-frequency clock generator 140 and the pixel clock generator 151 shown in FIG. 12 and FIG. 13. Accordingly, the data generating unit 103 produces not only pixel data, but also data used to control the writing operation. Although not shown in FIG. 57, the LD modulation unit 120 includes a modulation circuit 125 and a small swing differential signal output circuit 130, as illustrated in FIG. 8. Although not shown in FIG. 57, the LD driving unit 170 includes a small swing differential signal input circuit 160, as illustrated in FIG. 8.

A modulated laser beam emitted from the semiconductor laser (LD) 201 passes through the collimator lens 202 and the cylindrical lens 203, and is deflected by the polygonal mirror 204. The deflected beam passes through the fθ lens 205, and is reflected from the mirror 208. The reflected beam strikes the photosensitive unit 208 via the toroidal lens 206 to form a latent electrostatic image thereon. The writing start position is detected by the horizontal synchronization sensor 211 for each scan, and the detection result is supplied as a horizontal sync signal to the data generating unit 105 of the image processing unit 220.

The data generating unit 105 produces pixel click in synchronization with the horizontal sync signal. The data generating unit 105 also receives image information read by an image reader or a scanner (not shown), and produces pixel data in synchronization with the horizontal sync signal and the pixel clock, taking into account the photosensitive characteristic of the photosensitive drum 208. The data generating unit 105 has a counter function for counting in the fast scanning direction and the slow scanning direction, and produces control signals required for the writing operation.

The LD modulation signal generating unit 120 generates a small swing differential LD modulation signal consisting of a non-inverted small swing signal and an inverted small swing signal, which is transmitted to the LD driving unit 170. The LD driving unit 170 produces a laser modulation/driving signal, based on the small swing differential LD modulation signal to drive and modulate the output of the semiconductor laser (LD) 201. The LD driving unit 170 also receives the monitoring result of the laser output of the semiconductor laser 201, and controls the current supply to the semiconductor laser 201 so as to bring the output of the semiconductor laser 201 to a prescribed level.

If the laser modulating and driving device is applied to a multi-beam scanning apparatus, a plurality of LD modulation signal generating units 120 are provided in the image processing unit 220 in order to carry out parallel processing on the pixel data of multiple scanning lines supplied from the data generating unit 105. In this case, a plurality of LD driving units 170 are provided in the light source driving unit 230 to receive a set of small swing differential LD modulation signals from the image processing unit 220 and drive the associated semiconductor lasers.

Figure 59:
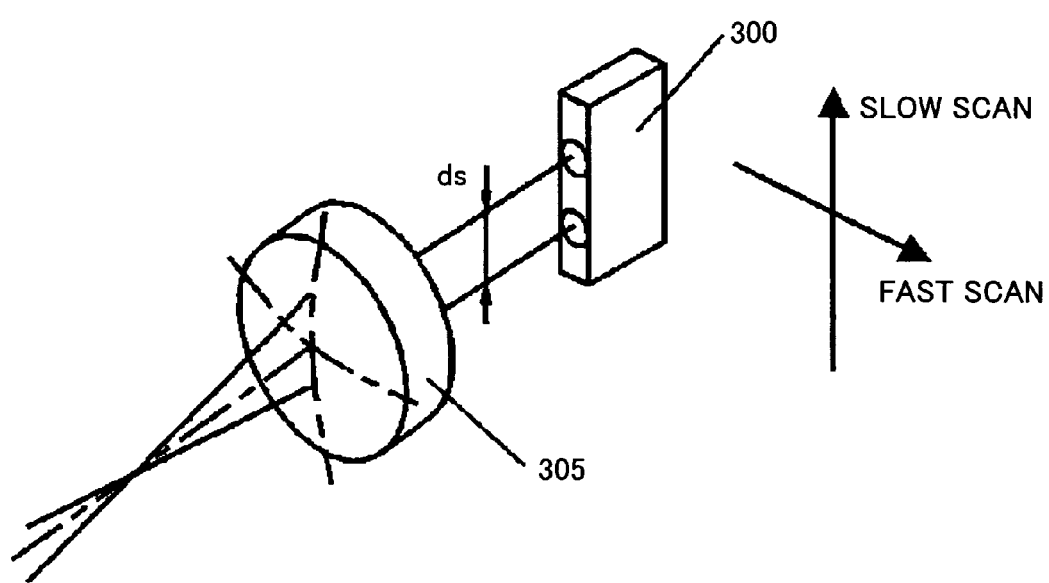
FIG. 59 illustrates the structure of a two-channel semiconductor laser array.

FIG. 58 illustrates an example of the multi-beam scanning optical system. In this example, two semiconductor arrays 301 and 302 are used as the light source. Each of the semiconductor arrays is formed as, for example, a monolithic semiconductor laser array 300 shown in FIG. 59. The semiconductor laser array 300 has monolithically formed two light sources, which are arranged at a separation "ds" of 25 µm in the slow scan direction symmetrically with respect to the optical axis of the collimation lens 305.

Returning to FIG. 58, two semiconductor arrays 301 and 302 are arranged with their optical axes coincident with the optical axes of the collimation lenses 303 and 304, respectively. Each of the semiconductor arrays 301 and 302 is tilted by 1.5 degrees, such that the light emitting axes of the semiconductor arrays 301 and 302 are symmetrical in the fast scan direction and cross each other at a reflecting point on the polygonal mirror 307. The laser beams emitted from the semiconductor laser arrays 301 and 302 pass through the cylindrical lens 308, and are deflected by the polygonal mirror 307. The deflected beams are guided onto the photosensitive drum 313 through the fθ lens 310, mirror 312, and the troidal lens 311. Although not shown in FIG. 58, two sets of LD modulation signal generating units and the LD driving units are prepared.

The data generating unit 105 of the image processing unit 220 has a buffer memory (not shown) that stores a line of printing data (pixel data) for each of the light sources. The printing data are read for each facet of the polygonal mirror 307, and four lines of printing data are recorded simultaneously via the associated LD modulation signal generating units and the LD driving units.

Figure 60:
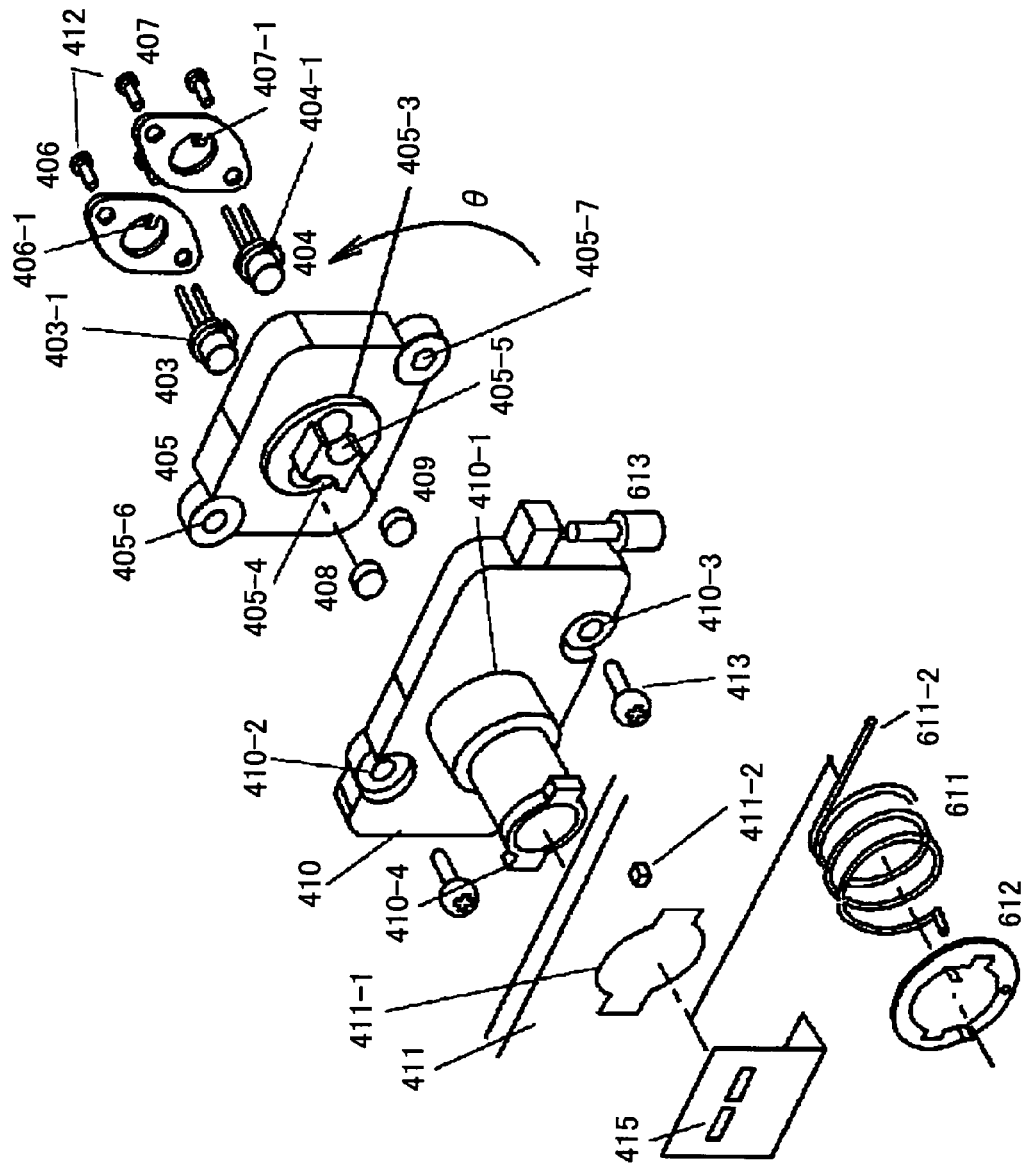
FIG. 60 is an exploded view of the light source unit of the multi-beam scanning system.

FIG. 60 illustrates the light source unit of the multi-beam scanning apparatus. The semiconductor arrays 403 and 404 have cylindrical heat sinks 403-1 and 404-1, respectively, which are fit into holes (not shown) formed in the rear face of the base 405. The holes for receiving the heat sinks 403-1 and 404-1 are inclined by 1.5 degrees in this embodiment. The projections 406-1 and 407-1 of pressing pieces 406 and 407 are fit into cutaways (not shown) of the heat sinks 403-1 and 404-1 to position the light source. The pressing pieces 406 and 407 are fixed by screws 412 from the rear faces. The positions of the collimation lenses 408 and 409 are adjusted in the half round guide recesses 405-4 and 405-5 formed in the base 405 along the optical axis. When the collimation lenses 408 and 409 are correctly positioned such that the diverging light beams emitted form the light sources become parallel light fluxes, they are bonded to the base 405.

In order to allow the laser beams emitted from the semiconductor array to cross each other on the fast scanning plane, the half round guide recesses 405-4 and 4-5 are also inclined, like the heat sink receiving holes.

The base 405 is held by the holder 410 by the engaging section 405-3 and screws 413 inserted via the penetrating holes 410-2 and 410-3 in the screwed holes 405-6 and 405-7, respectively. Then, the light source unit is formed.

The cylindrical projection 410-1 of the holder 410 is fit into the reference hole 411-1 of the wall 411 of the optical housing. The stopper 612 is fit into the front face 410-4 of the cylindrical projection with a spring 611 inserted between them. In this manner, the holder 410 of the light source unit is fixed to the rear face of the wall 411. One end 611-2 of the spring 611 is hooked to the projection 411-2 of the wall 411, and a rotational force is produced about the center of the cylindrical projection. The rotational force is stopped by an adjusting screw (see FIG. 61) so that the entire unit rotates about the optical axis by angle θ. The rotation of the unit is adjusted such that the beam spots of the laser beams are positioned alternately with one line offset from the adjacent beam spots, as illustrated in FIG. 62A. Aperture 415 having slits corresponding to the semiconductor laser arrays 403 and 404 is attached to the optical housing to define the shapes of the laser beams.

Figure 61:
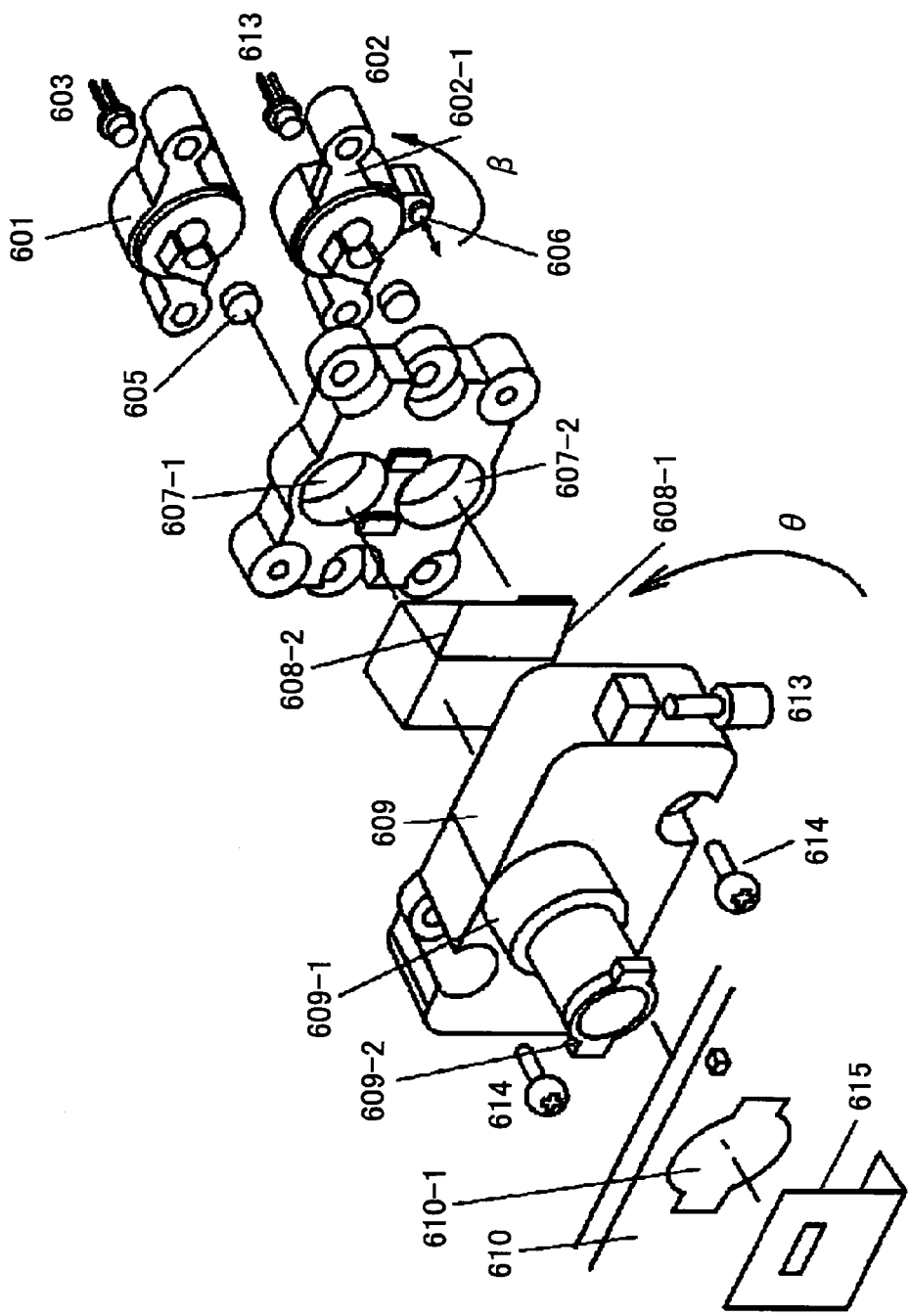
FIG. 61 is an exploded view of another type of light source unit of the multi-beam scanning system.
Figure 62A:
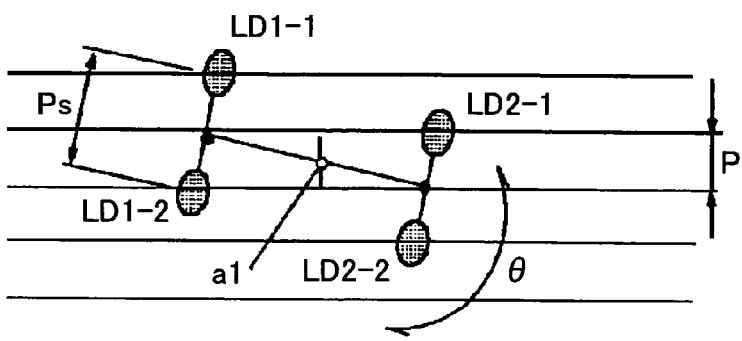
FIGS. 62A and 62B illustrate the beam spot positions using the light source units shown in FIG. 60 and FIG. 61, respectively.
Figure 62B:
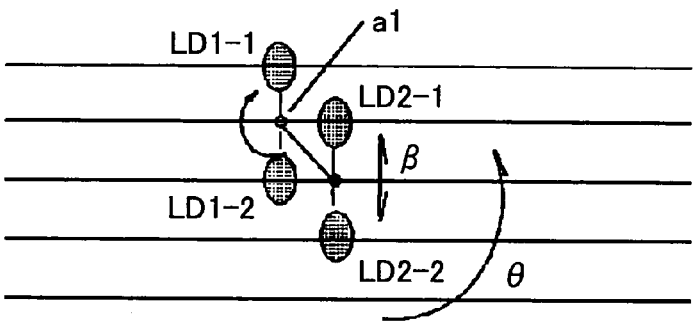

FIG. 61 illustrates another example of the light source unit, in which the laser beams from two semiconductor laser arrays 603 and 613 are synthesized. The semiconductor array 603 and a collimation lens 605 are held by the first base 601 to form the first light source. Similarly, the semiconductor array 613 and collimation lens 606 are held by the second base 602 to form the second light source. The first and second bases 601 and 602 are fit into the holes 607-1 and 607-2 formed in a common flange 607, and screwed to the flange 607. An adjusting screw 606 is inserted to the second base 602, and the amount of projection of the adjusting screw 606 is adjusted from the rear face to rotate the arms 602-1 in order to incline only the part holding the semiconductor array and the collimation lens by angle β in the slow scan direction. With this arrangement, the beam spots are arranged alternately, as illustrated in FIG. 62B.

Prism 608 is formed by a triangular prism and a parallelogrammic prism. The prism 608 reflects each laser beam emitted from the second light source at the inclined face 608-1, such that the reflected beam exits from the prism 608 in close proximity to the laser beam emitted from the first light source, which has passed through the beam splitting face 608-2. Multiple beams brought close to each other by the prism 608 are deflected by the polygonal mirror at once, and forms the associated spots on the photosensitive drum.

An aperture 615 is attached to the optical housing. Since in this example the beams from the semiconductor laser arrays substantially overlap each other, a single slit forms the aperture 615. The flange 607 is held by the holder 609. The cylindrical part 609-1 of the holder 609 is fit into the reference hole 610-1 of the wall 610. The entire unit is rotated to adjust the tilt of the beam spot line.

Figure 63:
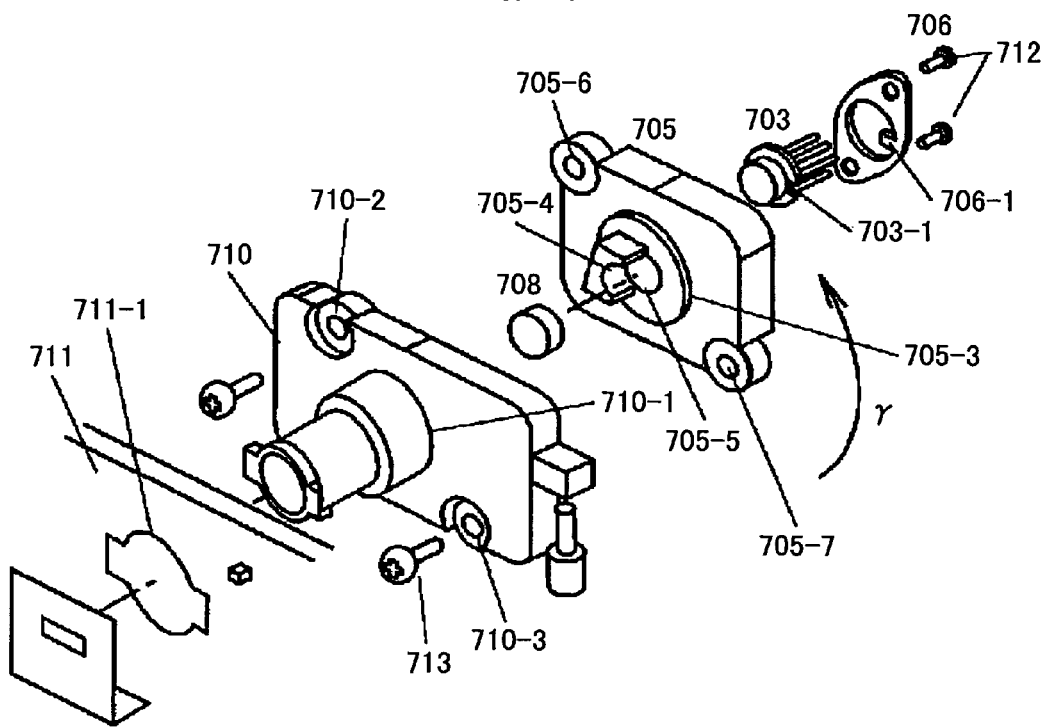
FIG. 63 is an exploded view of still another type of light source unit of the multi-beam scanning system.
Figure 64:
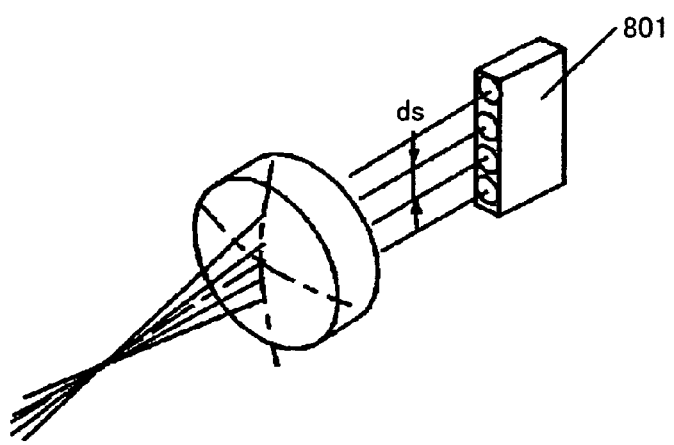
FIG. 64 illustrates the structure of a four-channel semiconductor laser array.

FIG. 63 illustrates another example of the light source unit of the multi-beam scanning apparatus, using a plurality of four-channel semiconductor arrays 801 with four light sources shown in FIG. 64. Since the structure of the light source unit shown in FIG. 63 is similar to those shown in FIG. 60 and FIG. 61, explanation for it is omitted.

Figure 65:
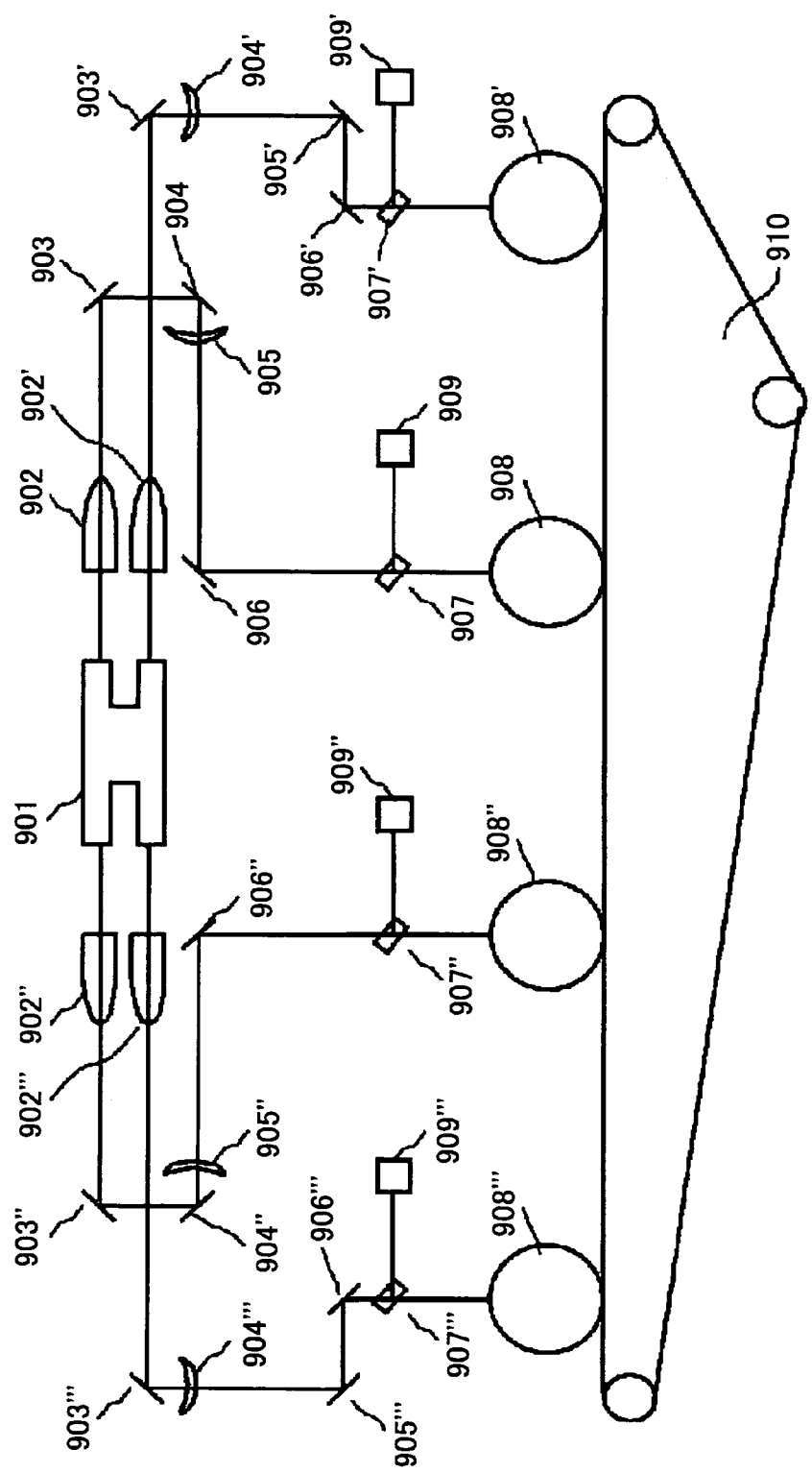
FIG. 65 illustrates the major part of a tandem color copying machine.

FIG. 65 illustrates a tandem color image reproducing apparatus to which the optical scanning apparatus and the laser modulating and driving device described above are applied. In FIG. 65, only a cross-sectional view in the slow scan direction is shown. The beams deflected by the polygonal mirror 901 are guided to the respective scan lens 902-902'''. The first beam having passed through the scan lens 902 is reflected by the mirrors 903 and 904, passes through the scan lens 905, is further reflected by the mirror 906, and strikes the photosensitive unit 908 via a semitransparent member 907. A portion of the beam is detected by the photodetector 909. The other beams follow similar light paths guided by similar optical systems. The latent electrostatic images written on the photosensitive units 908-908''' are transferred to the intermediate transfer belt 910.

In the example shown in FIG. 65, the polygonal mirror 901 is formed by a combination of two polygons arranged in the vertical direction, and scanning optical systems corresponding to four scanned planes are arranged on both sides of the polygonal mirror (i.e., the deflecting means) 901 so as to face each other. Each of the beams is guided to the associated photodetector by a mirror placed outside the effective angle of view. A monitor pattern is formed on the intermediate transfer belt 910 to measure the dot position of each color using multiple sensors provided for each scanning optical system. The dot position is corrected by adjusting the rotational angles θ and/or β, as shown in FIG. 60 rough FIG. 62, to correct moment-to-moment change.

In the tandem color image reproducing apparatus, multiple photosensitive units 908-908''' are provided, each corresponding to one of cyan, magenta, yellow, and black. Separate scanning optical paths are formed to the associated photosensitive units to form latent images on the photosensitive units. Dot offset in the fast scan direction on the respective photosensitive units is corrected independently.

Since the image reproducing apparatuses shown in FIG. 57 through 63 use the laser modulating and driving device that transmits a pair of small swing differential signals for pulsewidth modulation from the LD modulation signal generating unit to the LD driving unit, high-speed operation with improved EMI characteristic is realized, while maintaining the pulse shape of LD modulation signal accurately.

This patent application is based on and claims the benefit of the earlier filing dates of Japanese Patent Applications No. 2003-077457, 2003-077458, and 2003-077459 filed Mar. 20, 2003, and Japanese Patent Application No. 2003-307554 filed Aug. 29, 2003, the entire contents of which are hereby incorporated by reference.

The invention claimed is:

1. A laser modulating and driving device comprising:
    a modulation signal generating unit provided in a first substrate and configured to generate and output a laser modulation signal consisting of a pair of symmetrical small swing differential signals based on pixel data, the pair of symmetrical small swing differential signals swinging between a predetermined high voltage and a predetermined low voltage, wherein
    the predetermined high voltage is less than a supply voltage of a small swing differential signal output circuit of the modulation signal generating unit, and the predetermined low voltage is more than a ground voltage of the small swing differential signal output circuit and less than the predetermined high voltage,
    the modulation signal generating unit includes a modulation circuit configured to produce a modulation signal and the small swing differential signal output circuit configured to convert the modulation signal to the pair of small swing differential signals,
    the modulation signal generating unit has an output-stage inverter or buffer using a transistor, and
    at least one of a high potential and a low potential that defines a swing of said pair of small swing differential signals is generated by an ON resistance of the transistor; and
    a driving unit provided in a second substrate spatially separated and distinct from the first substrate and configured to drive a laser according to the laser modulation signal output and supplied from the modulation signal generating unit, the driving unit including a small swing differential signal input circuit configured to receive the pair of small swing differential signals.

2. The laser modulating and driving device of claim 1, wherein the small swing differential signal output circuit includes:
    a non-inverted and inverted signal generating circuit configured to produce a non-inverted signal having the same phase as the modulation signal and an inverted signal with the phase shifted by 180 degrees from the modulation signal; and
    a small swing output circuit configured to reduce swings of the non-inverted signal and the inverted signal to output said pair of small swing differential signals as the laser modulation signal.

3. The laser modulating and driving device of claim 2, wherein the small swing output circuit is formed as current mode logic (CML) or emitter coupled logic (ECL).

4. The laser modulating and driving device of claim 3, wherein a reference potential of the CML or ECL is a supply voltage VCC of the modulation signal generating unit.

5. The laser modulating and driving device of claim 3, wherein a reference potential of the CML or ECL is an intermediate potential lower than a supply voltage VCC of the modulation signal generating unit.

6. The laser modulating and driving device of claim 3, wherein the small swing differential signal output circuit further includes swing reducing means arranged before the CML or ECL to decrease the swing of the non-inverted and inverted signals input to the CML or ECL.

7. The laser modulating and driving device of claim 1, wherein the small swing differential signal output circuit has a first supply voltage, and the small swing differential signal input circuit has a second supply voltage different from the first supply voltage.

8. The laser modulating and driving device of claim 1, wherein the small swing differential signal input circuit has a differential signaling circuit using transistors.

9. The laser modulating and driving device of claim 1, further comprising:
    a signal transmission line configured to connect the modulation signal generating unit and the driving unit, through which said pair of small swing differential signals propagate; and
    a first resistor that terminates said pair of small swing differential signals at an output end of the signal transmission line.

10. The laser modulating and driving device of claim 9, further comprising:
    a second resistor connected parallel to the first resistor and arranged at an input end of the signal transmission line to couple said pair of small swing differential signals.

11. The laser modulating and driving device of claim 1, further comprising:
    a signal transmission line for connecting the first and second substrates to transmit the laser modulation signal from the modulation signal generating unit to the driving unit.

12. The laser modulating and driving device of claim 11, further comprising:
    a pixel data generating unit configured to supply the pixel data to the modulation signal generating unit, wherein the pixel data generating unit and the modulation signal generating unit are formed on the same board.

13. The laser modulating and driving device of claim 11, further comprising:
    a pixel data generating unit configured to supply the pixel data to the modulation signal generating unit, wherein the pixel data generating unit and the modulation signal generating unit are formed as a single integrated circuit.

14. The laser modulating and driving device of claim 1, wherein the modulation signal generating unit has an output-stage inverter or buffer having a supply terminal, to which a first voltage lower than a supply voltage of the modulation signal generating unit is applied.

15. The laser modulating and driving device of claim 1, wherein the modulation signal generating unit has an output-stage inverter or buffer having a ground terminal, to which a second voltage higher than a ground voltage is applied.

16. The laser modulating and driving device of claim 1, wherein the modulation signal generating unit has an output-stage inverter or buffer having a supply terminal, to which a first voltage lower than a supply voltage of the modulation signal generating unit is applied, and a ground terminal, to which a second voltage higher than a ground voltage is applied.

17. The laser modulating and driving device of claim 1, wherein the modulation signal generating unit has an output-stage inverter or buffer and a resistor connected in series with the output-stage inverter or buffer to reduce a swing of an output of the output-stage inverter or buffer.

18. The laser modulating and driving device of claim 1, wherein the modulation signal generating unit is formed in a block spatially separated from the driving unit, and has an output-stage inverter or buffer and a resistor arranged outside the block to reduce a swing of an output of the output-stage inverter or buffer.

19. The laser modulating and driving device of claim 1, wherein the modulation signal generating unit has an output-stage inverter or buffer and a resistor connected to an output from the output-stage inverter of buffer to reduce a swing of the output from the output-stage inverter or buffer, and the driving unit has an input-stage differential signaling circuit using a transistor.

20. The laser modulating and driving device of claim 1, wherein the modulation signal generating unit has a first supply voltage, and the driving unit has a second supply voltage higher than the first supply voltage.

21. A laser modulating and driving device comprising:
a pixel data generating unit configured to produce pixel data and formed in a first substrate;
a modulation signal generating unit configured to generate a low-voltage laser modulation signal consisting of a pair of small swing differential signals from the pixel data, the modulation signal generating unit formed in the first substrate together with the pixel data generating unit and the pair of symmetrical small swing differential signals swinging between a predetermined high voltage and a predetermined low voltage, wherein the predetermined high voltage is less than a supply voltage of a small swing differential signal output circuit of the modulation signal generating unit, and the predetermined low voltage is more than a ground voltage of the small swing differential signal output circuit and less than the predetermined high voltage, wherein
the modulation signal generating unit has a small swing differential signal output circuit configured to output a pair of small swing differential signals as the laser modulation signal, the driving unit has a small swing differential signal input circuit configured to receive said pair of small swing differential signals, and the signal transmission line is configured to transmit said pair of small swing differential signals, and
the small swing differential signal output circuit has a first supply voltage, and the small swing differential signal input circuit has a second supply voltage different from the first supply voltage;
a driving unit configured to drive a laser according to the laser modulation signal supplied from the modulation signal generating unit and formed in a second substrate, spatially separate and distinct from the first substrate; and
a signal transmission line connecting between the first substrate and the second substrate and transmitting the laser modulation signal.

22. The laser modulating and driving device of claim 21, wherein the first substrate and the second substrate are independent printed circuit boards (PCB) or application specific integrated circuits (ASIC).

23. The laser modulating and driving device of claim 21, wherein the small swing differential signal output circuit has an output-stage circuit configured by a first logic, and the small swing differential signal input circuit is configured by a second logic different from the first logic.

24. The laser modulating and driving device of claim 23, wherein the first logic is current mode logic or emitter coupled logic.

25. The laser modulating and driving device of claim 23, wherein the second logic is differential signaling using a pair of transistors.

26. An image reproducing apparatus comprising:
a photosensitive unit;
a light source using a laser;
a laser modulation signal generating unit formed in a first substrate and configured to produce a laser modulation signal consisting of a pair of small swing differential signals based on pixel data, the pair of symmetrical small swing differential signals swinging between a predetermined high voltage and a predetermined low voltage, wherein
the predetermined high voltage is less than a supply voltage of a small swing differential signal output circuit of the modulation signal generating unit, and the predetermined low voltage is more than a ground voltage of the small swing differential signal output circuit and less than the predetermined high voltage,
the laser modulation signal generating unit has an output-stage inverter or buffer using a transistor, and
at least one of a high potential and a low potential that defines a swing of said pair of small swing differential signals is generated by an ON resistance of the transistor;
a driving unit formed in a second substrate spatially separated and distinct from the first substrate and configured to drive the laser according to the laser modulation signal;
a signal transmission line connecting between the first substrate and the second substrate for transmitting the laser modulation signal to the driving unit; and
a deflecting optical system for guiding and deflecting a laser beam emitted from the light source onto the photosensitive unit to form a latent image thereon.

27. The image reproducing apparatus of claim 26, wherein the first substrate and the second substrate are formed as independent printed circuit boards (PCB) or application specific integrated circuits (ASIC).

* * * * *